(12) United States Patent
Faber et al.

(10) Patent No.: US 11,242,290 B2
(45) Date of Patent: Feb. 8, 2022

(54) FREEZE-CAST CERAMIC MEMBRANE FOR SIZE BASED FILTRATION

(71) Applicant: California Institute of Technology, Pasadena, CA (US)

(72) Inventors: Katherine T. Faber, Pasadena, CA (US); Julia A. Kornfield, Pasadena, CA (US); Noriaki Arai, Pasadena, CA (US); Orland Bateman, Pasadena, CA (US); Rustem F. Ismagilov, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 48 days.

(21) Appl. No.: 16/549,954

(22) Filed: Aug. 23, 2019

(65) Prior Publication Data
US 2020/0115291 A1    Apr. 16, 2020

Related U.S. Application Data

(60) Provisional application No. 62/722,689, filed on Aug. 24, 2018.

(51) Int. Cl.
*C04B 38/06* (2006.01)
*B01D 67/00* (2006.01)
(Continued)

(52) U.S. Cl.
CPC ...... *C04B 38/0605* (2013.01); *B01D 67/0051* (2013.01); *B01D 69/02* (2013.01);
(Continued)

(58) Field of Classification Search
CPC ......... F01N 3/28; B01D 71/024; B01D 69/02; B01D 67/0051; B01D 67/0093;
(Continued)

(56) References Cited

U.S. PATENT DOCUMENTS

2016/0368047 A1   12/2016   Bagge-Hansen et al.

FOREIGN PATENT DOCUMENTS

KR   10-2009-0044628   5/2009

OTHER PUBLICATIONS

Akamatsu et al. (1998) "Anisotropy-driven dynamics of cellular fronts in directional solidification in thin samples," Phys. Rev. E 58(3): 3302-3315.

(Continued)

*Primary Examiner* — Vishal V Vasisth
(74) *Attorney, Agent, or Firm* — Leydig, Voit & Mayer, Ltd.

(57) ABSTRACT

Provided herein are methods for making a freeze-cast material having a internal structure, the methods comprising steps of: determining the internal structure of the material, the internal structure having a plurality of pores, wherein: each of the plurality of pores has directionality; and the step of determining comprises: selecting a temperature gradient and a freezing front velocity to obtain the determined internal structure based on the selected temperature gradient and the selected freezing front velocity; directionally freezing a liquid formulation to form a frozen solid, the step of directionally freezing comprising: controlling the temperature gradient and the freezing front velocity to match the selected temperature gradient and the selected freezing front velocity during directionally freezing; wherein the liquid formulation comprises at least one solvent and at least one dispersed species; and subliming the at least one solvent out of the frozen solid to form the material.

35 Claims, 64 Drawing Sheets

(51) Int. Cl.

| | |
|---|---|
| *B01D 69/02* | (2006.01) |
| *B01D 71/02* | (2006.01) |
| *B01J 35/04* | (2006.01) |
| *B01J 35/10* | (2006.01) |
| *C04B 38/00* | (2006.01) |
| *H01B 1/14* | (2006.01) |
| *H01B 1/16* | (2006.01) |

(52) U.S. Cl.
CPC ............ *B01D 71/024* (2013.01); *B01J 35/04* (2013.01); *B01J 35/1071* (2013.01); *B01J 35/1076* (2013.01); *C04B 38/007* (2013.01); *C04B 38/0038* (2013.01); *C04B 38/0054* (2013.01); *C04B 38/0093* (2013.01); *H01B 1/14* (2013.01); *H01B 1/16* (2013.01); *B01D 2325/021* (2013.01); *B01D 2325/26* (2013.01)

(58) Field of Classification Search
CPC ................ B01D 67/0041; B01D 71/02; B01D 2325/26; B01D 2325/36; B01D 2323/02; B01D 2325/021; B01D 61/147; C04B 38/007; C04B 38/0093; C04B 38/0054; C04B 38/0038; C04B 38/0605; B01J 35/1076; B01J 35/04; B01J 35/1071; H01B 1/14; H01B 1/16
See application file for complete search history.

(56) References Cited

OTHER PUBLICATIONS

Alkemper et al. (2001) "Quantitative serial sectioning analysis," J. Microsc. 201(3): 388-394.
Arai et al. "Pore Morphologies Tailored for Flow and Filtration," 43rd International Conference and Exposition on Advanced Ceramics and Composites, Jan. 27-Feb. 1, 2019, 22 pages.
Arai et al. (publicly available Nov. 2018) "Hierarchical porous ceramics via two-stage freeze casting of preceramic polymers," Scr. Mater. (Mar. 2019) 162: 72-76.
Araki et al. (2005) "Porous Ceramic Bodies with Interconnected Pore Channels by a Novel Freeze Casting Technique," J. Am. Ceram. Soc. 88(5): 1108-1114.
Attard et al. (1995) "Liquid-crystalline phases as templates for the synthesis of mesoporous silica," Nature 378: 366-368.
Bai et al. (2015) "Bioinspired large-scale aligned porous materials assembled with dual temperature gradients," Sci. Adv. 1(11):e1500849, pp. 1-8.
Bernard et al. (2004) "Evolution of structural features and mechanical properties during the conversion of poly[(methylamino)borazine] fibers into boron nitride fibers," J. Solid State Chem. 177(6): 1803-1810.
Blin et al. (2013) "Mechanism of self-assembly in the synthesis of silica mesoporous materials: In situ studies by X-ray and neutron scattering," Chem. Soc. Rev. 42(9): 4071-4082.
Cheng et al. (publicly available Aug. 2017) "Freeze Casting for Assembling Bioinspired Structural Materials," Adv. Mater. (Dec. 2017) 29(45): 1703155, 11 pages.
Chevalier et al. (2009) "The Tetragonal-Monoclinic Transformation in Zirconia: Lessons Learned and Future Trends," J. Am. Ceram. Soc. 92(9): 1901-1920.
Colombo et al. (2010) "Polymer-derived ceramics: 40 Years of research and innovation in advanced ceramics," J. Am. Ceram. Soc. 93(7): 1805-1837.
Danks et al. (2016) "The evolution of 'sol-gel' chemistry as a technique for materials synthesis," Mater. Horiz. 3: 91-112.
Deville (2008) "Freeze-Casting of Porous Ceramics: A Review of Current Achievements and Issues," Adv. Eng. Mater. 10(3): 155-169.
Du et al. (2015) "Size effects and shape memory properties in $ZrO_2$ ceramic micro- and nano-pillars," Scr. Mater. 101: 40-43.
Du et al. (publicly available Oct. 2016) "Superelasticity in microscale shape memory ceramic particles," Acta Mater. (Jan. 2017) 123: 255-263.
Du et al. (publicly available May 2017) "Synthesis of monodisperse $CeO_2$-$ZrO_2$ particles exhibiting cyclic superelasticity over hundreds of cycles," J. Am. Ceram. Soc. (Sep. 2017) 100(9): 4199-4208.
Edler (2005) "Current Understanding of Formation Mechanisms in Surfactant-Templated Materials," Aust. J. Chem. 58(9): 627-643.
Ender et al. (2012) "Quantitative Characterization of $LiFePO_4$ Cathodes Reconstructed by FIB/SEM Tomography," J. Electrochem. Soc. 159(7): A972-A980.
Faber (2013) "Small Volumes Create Super(elastic) Effects," Science 341(6153): 1464-1465.
Faridi et al. (Jan. 2017) "Elasto-Inertial Microfluidics for Bacteria Separation from Whole Blood for Sepsis Diagnostics," J. Nanobiotechnology 15(1): 3, pp. 1-9.
Flodström et al. (2004) "Mechanism of Mesoporous Silica Formation. A Time-Resolved NMR and TEM Study of Silica-Block Copolymer Aggregation," Langmuir 20(3): 680-688.
Gao et al. (2006) "Formation Mechanism of Anionic Surfactant-Templated Mesoporous Silica," Chem. Mater. 18(16): 3904-3914.
Glicksman (2011) "Constitutional Supercooling," Chapter 9 In: Principles of Solidification: An Introduction to Modern Casting and Crystal Growth Concepts, Springer-Verlag, New York, 213-235.
Hollamby et al. (2012) "Growth of Mesoporous Silica Nanoparticles Monitored by Time-Resolved Small-Angle Neutron Scattering," Langmuir 28(9): 4425-4433.
Hur et al. (2011) "High-Throughput Size-Based Rare Cell Enrichment Using Microscale Vortices," Biomicrofluidics 5(2): 022206-1-022206-10.
International Search Report and Written Opinion, dated Dec. 12, 2019, corresponding to International Patent Application No. PCT/US2019/048005, 16 pp.
Jackson et al. (2004) "An analytical model for non-equilibrium segregation during crystallization," J. Crystal Growth 271: 481-494.
Kammer et al. (2006) "Cylindrical domain formation in topologically complex structures," Scripta Materialia 55(1): 17-22.
Kammer et al. (2006) "The morphological evolution of dendritic microstructures during coarsening," Acta Mater. 54(6): 1549-1558.
Kammer (2006) "Three-Dimensional Analysis and Morphological Characterization of Coarsened Dendritic Microstructures," Ph.D. thesis, Northwestern University, 212 pages.
Koch et al. (2003) "Evolution of Porosity by Freeze Casting and Sintering of Sol-Gel Derived Ceramics," Journal of Sol-Gel Science and Technology 26: 149-152.
Lai et al. (2013) "Shape Memory and Superelastic Ceramics at Small Scales," Science 341(6153): 1505-1508.
Lee et al. (2007) "Highly porous hydroxyapatite bioceramics with interconnected pore channels using camphene-based freeze casting," Mater. Lett. 61(11-12): 2270-2273.
Liang et al. (2010) "Silicon oxycarbide ceramics with reduced carbon by pyrolysis of polysiloxanes in water vapor," J. Eur. Ceram. Soc. 30(12): 2677-2682.
Li et al. (2012) "Freeze casting of porous materials: review of critical factors in microstructure evolution," Int. Mater. Rev. 57(1): 37-60.
Liu et al. (2016) "A review of fabrication strategies and applications of porous ceramics prepared by freeze-casting method," Ceramics International 42(2): 2907-2925.
Lu et al. (2016) "Fundamental understanding of water vapor effect on SiOC evolution during pyrolysis," J. Eur. Ceram. Soc. 36(3): 411-422.
Mandal et al. (2004) "Pt and Pd Nanoparticles Immobilized on Amine-Functionalized Zeolite: Excellent Catalysts for Hydrogenation and Heck Reactions," Chem. Mater. 16(19): 3714-3724.
Mera et al. (2013) "Silicon-Containing Preceramic Polymers," in: Encycl. Polym. Sci. Technol., John Wiley & Sons, Inc., Hoboken, NJ, USA, 2013. doi:10.1002/0471440264.pst591, pp. 1-33.
Miller et al. (2015) "Freeze-cast alumina pore networks: Effects of freezing conditions and dispersion medium," J. Eur. Ceram. Soc. 35(13): 3595-3605.

(56) References Cited

OTHER PUBLICATIONS

Narayan et al. (Aug. 2018) "Mesoporous Silica Nanoparticles: A Comprehensive Review on Synthesis and Recent Advances," Pharmaceutics 10(3): 118, pp. 1-49.
Naviroj et al. (2015) "Directionally aligned macroporous SiOC via freeze casting of preceramic polymers," Journal of the European Ceramic Society 35(8): 2225-2232.
Naviroj et al. (publicly available Nov. 2016) "Nucleation-controlled freeze casting of preceramic polymers for uniaxial pores in Si-based ceramics," Scripta Materialia (Mar. 2017) 130: 32-36.
Naviroj et al. (Sep. 2017) "Suspension- and solution-based freeze casting for porous ceramics," J. Mater. Res. 32(17): 3372-3382.
O'Brien (1972) "Closed Streamlines Associated with Channel Flow over a Cavity," Phys. Fluids 15(12): 2089-2097.
Preiss et al. (2012) "Tailored graded pore structure in zirconia toughened alumina ceramics using double-side cooling freeze casting," Journal of the European Ceramic Society 32(8): 1575-1583.
Rettenmayr et al. (2001) "Directional Solidification," in Encycl. Mater. Sci. Technol. (Eds.: K.H.J. Buschow, R.W. Cahn, M.C. Flemings, B. Ilschner, E.J. Kramer, S. Mahajan, P. Veyssiére) Elsevier, Oxford, pp. 2183-2189.
Rettenmayr et al. (2016) "Directional Solidification of Crystals," Ref. Module Mater. Sci. Mater. Eng., pp. 1-7.
Reyes-Morel et al. (1988) "Transformation Plasticity of $CeO_2$—Stabilized Tetragonal Zirconia Polycrystals: II, Pseudoelasticity and Shape Memory Effect," J. Am. Ceram. Soc. 71(8): 648-657.
Saha et al. (2006) "A Model for the Nanodomains in Polymer-Derived SiCO," J. Am. Ceram. Soc. 89(7): 2188-2195.
Schlappi et al. (2016) "Flow-through Capture and in Situ Amplification Can Enable Rapid Detection of a Few Single Molecules of Nucleic Acids from Several Milliliters of Solution," Anal. Chem. 88(15): 7647-7653.
Sofie et al. (2001) "Freeze Casting of Aqueous Alumina Slurries with Glycerol," Journal of the American Ceramic Society 84(7): 1459-1464.
Soraru et al. (1993) "Si-Al-O-N Fibers from Polymeric Precursor: Synthesis, Structural, and Mechanical Characterization," J. Am. Ceram. Soc. 76(10): 2595-2600.
Stolze et al. (2016) "Directional Solidification with Constant Ice Front Velocity in the Ice-Templating Process," Advanced Engineering Materials 18(1): 111-120.
Subhash et al. (1993) "Dynamic Stress-Induced Transformation and Texture Formation in Uniaxial Compression of Zirconia Ceramics," J. Am. Ceram. Soc. 76(1): 153-165.
Sun et al. (2013) "Multifunctional, Ultra-Flyweight, Synergistically Assembled Carbon Aerogels," Adv. Mater. 25(18): 2554-2560.
Sundblom et al. (2009) "Modeling In Situ Small-Angle X-ray Scattering Measurements Following the Formation of Mesostructured Silica," J. Phys. Chem. C 113(18): 7706-7713.

Swain (1986) "Shape memory behaviour in partially stabilized zirconia ceramics," Nature 322: 234-236.
Trivedi (1984) "Interdendritic Spacing: Part II. A Comparison of Theory and Experiment," Metall. Mater. Trans. A. 15A: 977-982.
Yamamura et al. (1988) "Development of a new continuous Si-Ti-C-O fiber using an organometallic polymer precursor," J Mater Sci 23: 2589-2594.
Yang (2016) "Side reactions upon amino acid/peptide carboxyl activation," Chapter 5 in Side reactions in Peptide synthesis, pp. 95-118.
Yi et al. (2015) "New Insight into Growth Mechanism and Kinetics of Mesoporous Silica Nanoparticles by In Situ Small Angle X-ray Scattering," Langmuir 31(30): 8478-8487.
Yoon et al. (2007) "Highly Aligned Porous Silicon Carbide Ceramics by Freezing Polycarbosilane/Camphene Solution," J. Am. Ceram. Soc. 90(6): 1753-1759.
Yu et al. (publicly available Apr. 2017) "Granular shape memory ceramic packings," Acta Mater. (Jun. 2017) 132: 455-466.
Zeng et al. (2016) "Crystal orientation dependence of the stress-induced martensitic transformation in zirconia-based shape memory ceramics," Acta Mater. 116: 124-135.
Zeng et al. (2016) "Microstructure, crystallization and shape memory behavior of titania and yttria co-doped zirconia," J. Eur. Ceram. Soc. 36(5): 1277-1283.
Zeng et al. (publicly available Jun. 2017) "In-situ studies on martensitic transformation and high-temperature shape memory in small volume zirconia," Acta Mater. (Aug. 2017) 134: 257-266.
Zeng et al. (publicly available Oct. 2017) "Enhanced shape memory and superelasticity in small-volume ceramics: a perspective on the controlling factors," MRS Commun. (Dec. 2017) 7(4): 747-754.
Zeng et al. (publicly available Aug. 2019) "Robust Cellular Shape-Memory Ceramics via Gradient-Controlled Freeze Casting," Adv. Eng. Mater. (Dec. 2019) 21(12): 1900398, pp. 1-5.
Zhao et al. (1996) "Advances in Mesoporous Molecular Sieve MCM-41," Ind. Eng. Chem. Res. 35(7): 2075-2090.
Zhao et al. (publicly available Mar. 2017) "Shape memory zirconia foams through ice templating," Scr. Mater. (Jul. 2017) 135: 50-53.
Zhang et al. (2007) "Aligned Porous Structures by Directional Freezing," Adv. Mater. 19(11): 1529-1533.
Zhang et al. (publicly available Aug. 2017) "Macro/mesoporous SiOC ceramics of anisotropic structure from cryogenic engineering," Materials & Design (Nov. 2017) 134:207-217.
Zheng et al. (publicly available Jan. 2019) "Implementing continuous freeze-casting by separated control of thermal gradient and solidification rate," International Journal of Heat and Mass Transfer (Apr. 2019) 133: 986-993.
Naviroj (Jun. 2017) "Silicon-based Porous Ceramics via Freeze Casting of Preceramic Polymers," Ph.D. Dissertation, Northwestern University, 180 pages total.
Liu et al. (Jun. 2013) "A novel way to fabricate tubular porous mullite membrane supports by TBA-based freezing casting method," *Journal of the European Ceramic Society*, 33, 3249-3256.

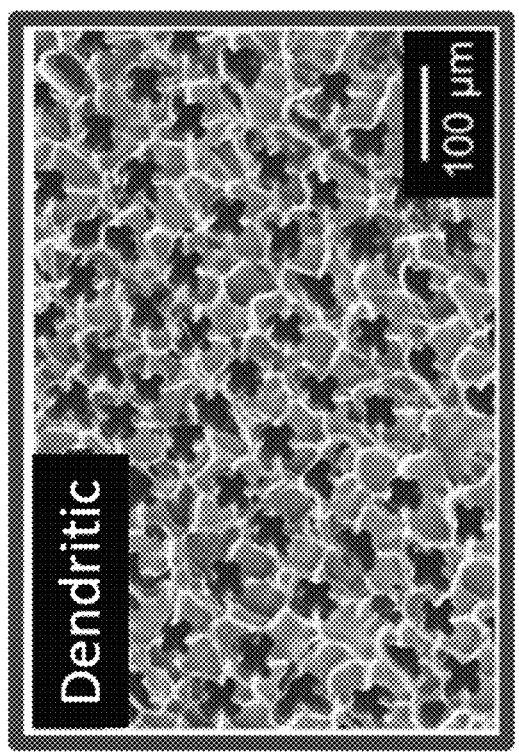
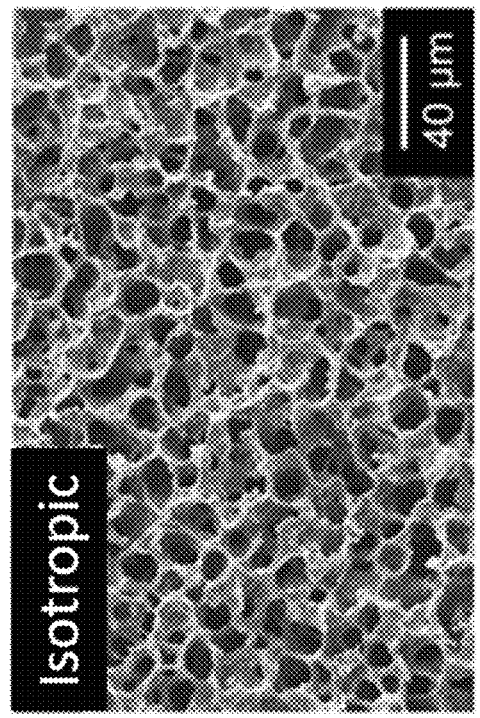
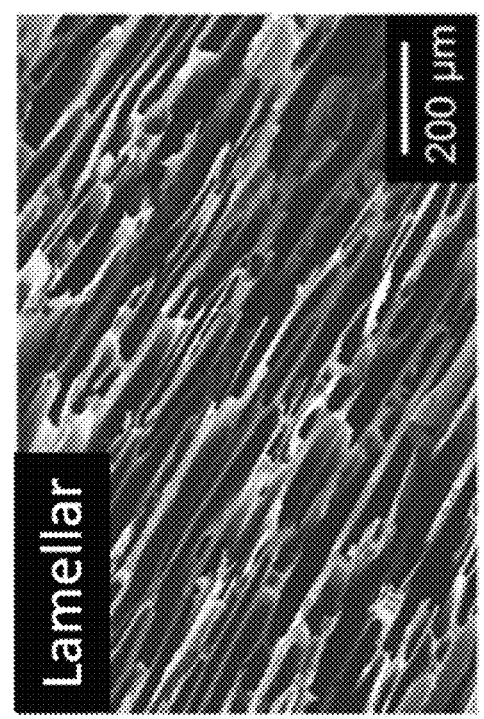
FIG. 25

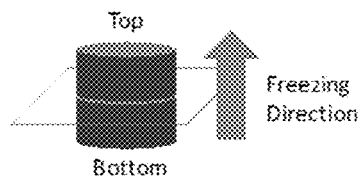
Transverse direction
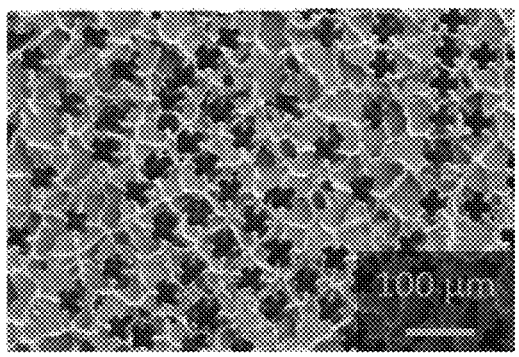
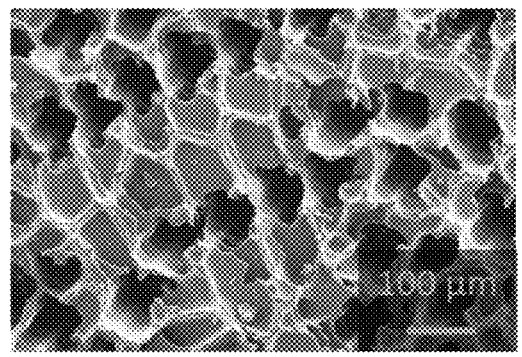
V=17 μm/s, G = 2.7 K/mm    V=1.7 μm/s, G = 2.8 K/mm
FIG. 32C
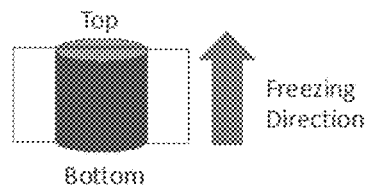
Longitudinal direction
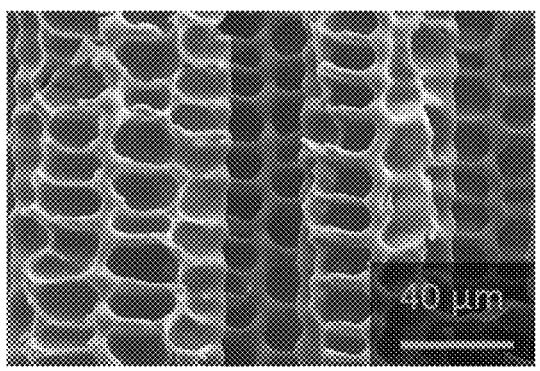
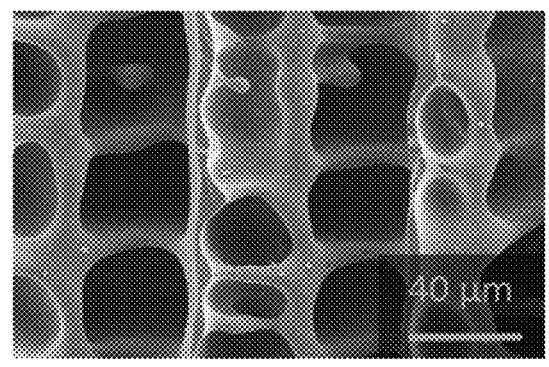
V=17 μm/s, G = 2.7 K/mm    V=1.7 μm/s, G = 2.8 K/mm
FIG. 32D

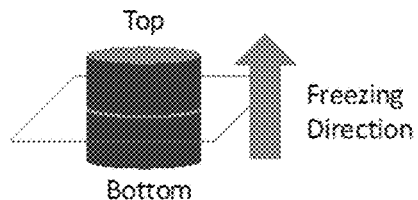
Transverse direction
V=1.7 µm/s, G = 2.8 K/mm    V=1.5 µm/s, G = 5.8 K/mm
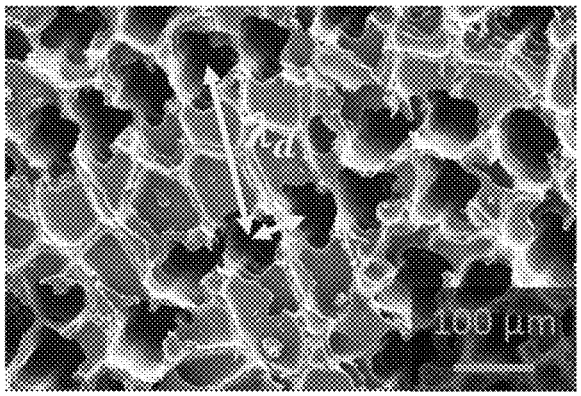 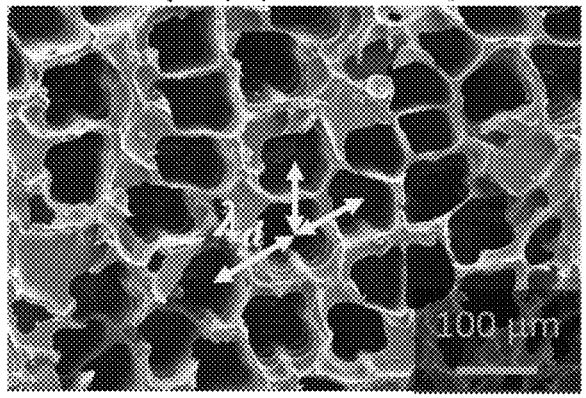
$$\lambda_d \propto V^{-1/4} G^{-1/2}$$
$\lambda_d$: Dendrite spacing
FIG. 33C

Fluorescent micrographs

Primary pore: 20 μm
Secondary pore: 13 μm

Primary pore: 20 μm
Secondary pore: 13 μm

Cyclooctane
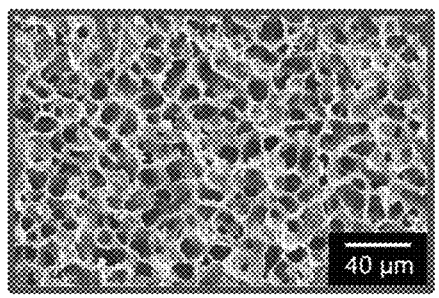
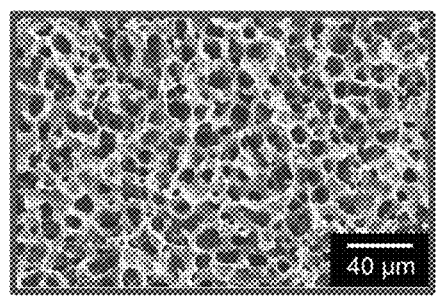
Isotropic
FIG. 44A
Cyclohexane
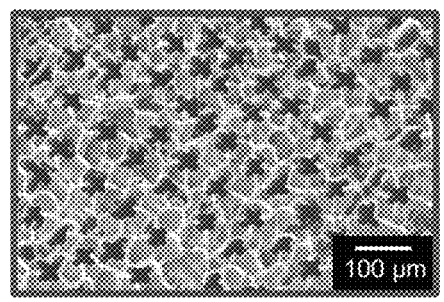
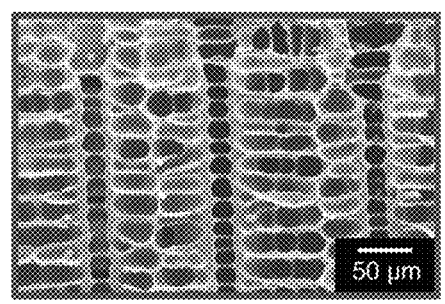
Dendritic
FIG. 44B
T-Butanol
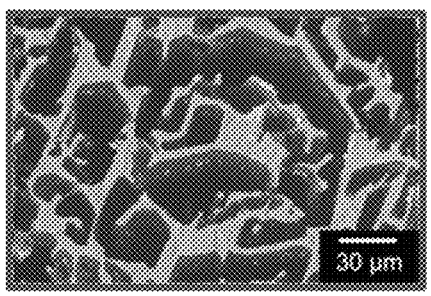
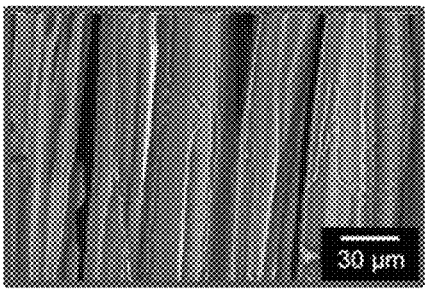
Prismatic
FIG. 44C
Dimethyl carbonate
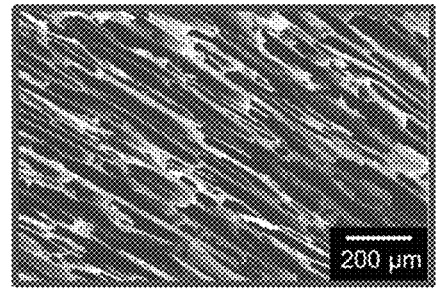
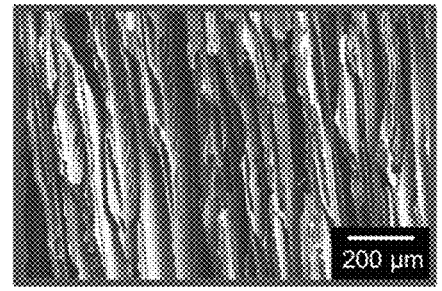
Lamellar
FIG. 44D

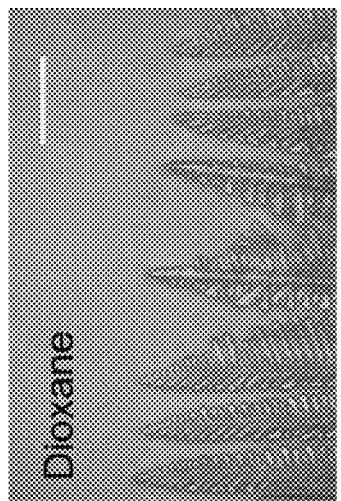
FIG. 45C Dioxane
Scale bar = 150 μm
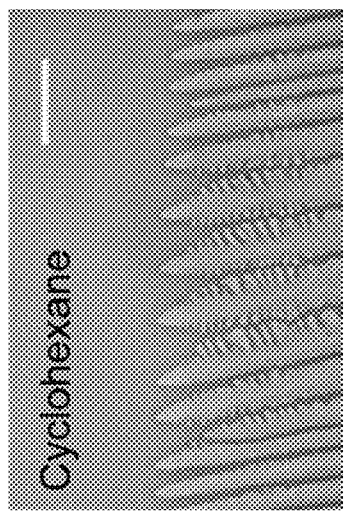
FIG. 45B Cyclohexane
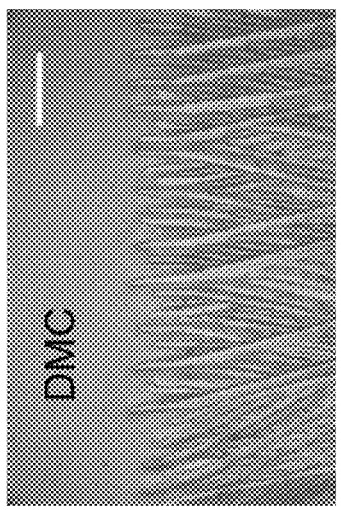
FIG. 45E DMC
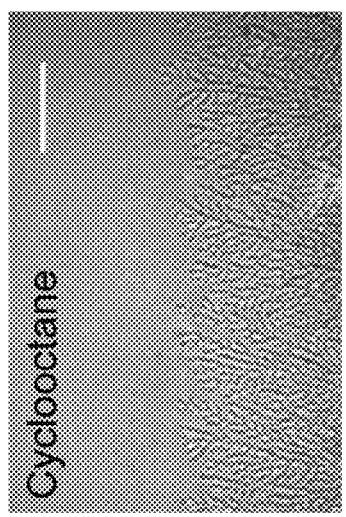
FIG. 45A Cyclooctane
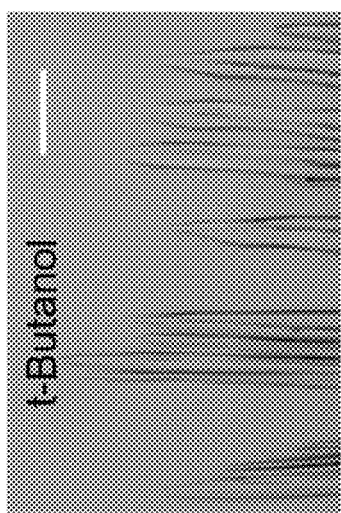
FIG. 45D t-Butanol

| Height (mm) | Before compression | After compression | After heat treatment | Residual displacement | Displacement recovery | Recovered strain |
|---|---|---|---|---|---|---|
| Measurement | 2.43 | 2.33 | 2.39 | 0.10 | 0.06 | |
| | 2.44 | 2.33 | 2.36 | 0.11 | 0.03 | |
| | 2.43 | 2.35 | 2.38 | 0.08 | 0.03 | |
| | 2.43 | 2.33 | 2.38 | 0.10 | 0.05 | |
| | 2.44 | 2.32 | 2.37 | 0.12 | 0.05 | |
| Average | 2.43 | 2.33 | 2.38 | 0.10 | 0.04 | 43% |

| Diameter (mm) | Before compression | After compression | After heat treatment | Diameter increment | Diameter recovery | Recovered strain |
|---|---|---|---|---|---|---|
| Measurement | 9.77 | 9.8 | 9.8 | 0.03 | 0 | |
| | 9.77 | 9.87 | 9.83 | 0.1 | 0.04 | |
| | 9.78 | 9.85 | 9.81 | 0.07 | 0.04 | |
| | 9.79 | 9.85 | 9.82 | 0.06 | 0.03 | |
| | 9.76 | 9.83 | 9.78 | 0.07 | 0.05 | |
| Average | 9.77 | 9.84 | 9.81 | 0.10 | 0.04 | 44% |

FIG. 47A

FREEZE-CAST CERAMIC MEMBRANE FOR SIZE BASED FILTRATION

CROSS-REFERENCE TO RELATED APPLICATIONS

This application claims the benefit of priority to U.S. Provisional Patent Application No. 62/722,689, filed Aug. 24, 2018, which is hereby incorporated by reference in its entirety.

STATEMENT REGARDING FEDERALLY SPONSORED RESEARCH OR DEVELOPMENT

This invention was made with government support under Award Number DMR-1411218 awarded by the National Science Foundation. The government has certain rights in the invention.

BACKGROUND OF INVENTION

Isolating or separating target particles from liquid mixtures is essential for a wide variety of applications but presents a complex and challenging problem. Isolating or separating particles may require selecting or customizing membrane materials based on complex sets of properties of the liquid mixture and the target particles. For example, target particles may need to be isolated or separated based on intrinsic characteristics such as, but not limited to, deformability, polarizability, and size of the particles. Further challenges include achieving sufficient throughput and particle capture efficiencies. For example, Faridi et al. [Faridi, M. A.; Ramachandraiah, H.; Banerjee, I.; Ardabili, S.; Zelenin, S.; Russom, A. Elasto-Inertial Microfluidics for Bacteria Separation from Whole Blood for Sepsis Diagnostics. J. Nanobiotechnology 2017, 15 (1), 3] demonstrated the removal of red blood cells from blood to isolate pathogens of interest using the inertial focusing of a polymer rich fluid. Unfortunately, this method of Faridi is restricted to slow flow rates and is not easily scaled up into a modular unit, hence, the amount of solution it can process is limited. Another method to separate particles as a function of size is demonstrated in the work of Hur et al., [Hur, S. C.; Mach, A. J.; Di Carlo, D. High-Throughput Size-Based Rare Cell Enrichment Using Microscale Vortices. Biomicrofluidics 2011, 5 (2), 1-10], where particles are separated by a difference in the net force acting upon the particle as a function of flow rate. Through the use of cavities lining a straight channel, larger particles are pulled into the cavity and are captured by microvortices developed by the fluid flow. Smaller particles are able to escape the cavities and are flushed down the device by the carrier fluid. The use of the microvortices to capture larger particles allows for higher flow rates to be used and the device is easily modulated. Despite these advantages, the device of Hur, et al., suffers from low capture efficiency and reduced ability to capture particles as the size decreases.

Thus, there exists a need for complex membrane materials, and method of making these materials, that can be tailored according to complex particle specifications while achieving high throughput and high particle capture efficiency.

SUMMARY OF THE INVENTION

Provided herein are freeze-cast materials, and method of making and using materials, that have a highly tunable and deterministic internal structure, which includes a plurality of pores. One or more pore characteristics of the plurality of pores can be deterministically tuned, such as according to desired particle separation characteristics. For example, a freeze-cast material may be formed to have dendritic pores each having a main channel sized to allow minimally hindered flow of large particles, such as blood cells, and secondary arms sized to slow or trap small particles, such as bacteria. Furthermore, a freeze-cast material's composition is also highly tunable, such as by incorporating nanocrystals, zeolites, or other species in walls or surfaces of the pores or by introducing a functionalization agent to surfaces of the pores. Control of composition provides additional handles on performance and function of the freeze-cast materials as may be needed according to desired applications and functionality. The breadth of tunability of the freeze-cast materials is provided deterministically. For example, the methods include herein allow for predictably determining a combination of temperature gradient and freezing front velocity, during the freeze-casting process, and for controlling the temperature gradient and freezing front velocity to yield the pre-determined pores and pore characteristics of the internal structure. For example, the freeze-cast materials, and associated methods, disclosed herein can be useful for any application requiring isolation, separation, or even functionalization of chemical species, such as but not limited to molecular, ionic, and/or particulate species, in liquid mixtures. An exemplary application is isolation of biological pathogens from bodily fluids such as blood.

Provided herein are methods for making a freeze-cast material having an internal structure (preferably, deterministic internal structure), the methods comprising steps of: determining the internal structure (preferably, deterministic internal structure) of the material, the internal structure having a plurality of pores, wherein: each of the plurality of pores has directionality; and the step of determining comprises: selecting a temperature gradient and a freezing front velocity to obtain the determined internal structure based on the selected temperature gradient and the selected freezing front velocity; directionally freezing a liquid formulation to form a frozen solid, the step of directionally freezing comprising: controlling the temperature gradient and the freezing front velocity to match the selected temperature gradient and the selected freezing front velocity during directionally freezing; wherein the liquid formulation comprises at least one solvent and at least one dispersed species; and subliming the at least one solvent out of the frozen solid to form the material. In some embodiments, each of the plurality of pores is characterized as a continuous through-pore. In some embodiments, the m is configured such that any microscopic fluid path across the internal structure includes a number of pores of the plurality of pores selected from the range of 1 to 100, preferably 1 to 50, preferably for some applications 1 to 20, more preferably for some applications 1 to 10. In some embodiments, the internal structure (preferably, deterministic internal structure) is configured such that any microscopic fluid path across the internal structure includes a number of pores of the plurality of pores selected from the range of 1 to 5. In some embodiments, the internal structure (preferably, deterministic internal structure) is configured such that any microscopic fluid path across the internal structure includes a number of pores of the plurality of pores selected from the range of 1 to 2. As used herein, a fluid path "across" the internal structure refers to a fluid path between one edge or outer surface and an opposite edge or opposite outer surface of the internal structure. In some embodiments, the plurality of pores correspond to at least 50%, preferably at least 75%, more preferably at least 90%, more preferably for some applications at least 99%, of total microscopic porosity of the internal structure. The term "total microscopic porosity" refers to a total microscopic void volume, where a microscopic void is a void (e.g., a pore) having a cross-sectional dimension in the range of 500 nm to 1 mm. In some embodiments, the internal structure, or the plurality of pores thereof, is formed via exclusion of the at least one dispersed species from the crystalline or crystallizing solvent during directionally freezing.

Any method for making a freeze-cast material can comprise heat treating or curing the material. In some embodiments, the heat treating comprises sintering or pyrolyzing. In some embodiments, the heating treatment step comprises more than one heat treatment step. For example, the material can be pyrolyzed and then high-temperature annealed. In some embodiments, however, the freeze-cast material may be useful without a heat-treating step. In some embodiments, the freeze-cast material can be pyrolyzed in the presence of water, such as water vapor, to change pore material composition (e.g. reduce carbon content in SiOC). For example, see (i) T. Liang, Y. L. Li, D. Su, H. B. Du, Silicon oxycarbide ceramics with reduced carbon by pyrolysis of polysiloxanes in water vapor, J. Eur. Ceram. Soc. 30 (2010) 2677-2682. doi:10.1016/j.jeurceramsoc.2010.04.005; and (ii) K. Lu, J. Li, Fundamental understanding of water vapor effect on SiOC evolution during pyrolysis, J. Eur. Ceram. Soc. 36 (2016) 411-422. doi:10.1016/j.jeurceramsoc.2015.11.003; each of which is incorporated herein by reference to the extent not inconsistent herewith. Optionally, in any method for making a freeze-cast material, the step of determining can comprise selecting the solvent to obtain the determined internal structure (preferably, deterministic internal structure) based on the selected solvent, the selected temperature gradient, and the selected freezing front velocity. Optionally, in any method for making a freeze-cast material, the step of determining comprises determining a pore-type of the plurality of pores; wherein the plurality of pores is selected from the group consisting of dendritic pores, cellular pores, lamellar pores, and prismatic pores. For example, the solvent may be selected according to its freezing temperature and its kinetics of crystallization, which can influence the resulting internal structure. For example, selection of solvent can help determine directionality of pores.

Optionally, in any freeze-cast material or any method for making a freeze-cast material, the directionality of each of the plurality of pores is characterized by a primary growth direction of each pore being equivalent to or within 45°, preferably within 30°, more preferably within 15°, of the primary growth direction of each other pore. Optionally, in any freeze-cast material or any method for making a freeze-cast material, the plurality of pores comprise dendritic pores; wherein each dendritic pore is characterized by: a main channel and a plurality of secondary arms each in fluid-communication with the main channel; a length of the main channel being greater than a length of each secondary arms; the main channel of each dendritic pore extending along a primary growth axis which is parallel or within 45°, preferably within 30°, more preferably within 15°, of the primary growth direction, and each secondary arm of each dendritic pore extending along a respective secondary growth axis that is different from the primary growth axis of the main channel. Optionally, in any freeze-cast material or any method for making a freeze-cast material, a cross-sectional dimension of the main channel is greater than a cross-sectional dimension of each of the plurality of secondary arms. Optionally, in any method for making a freeze-cast material, the step of determining comprises determining at least one other pore characteristic of the plurality of pores; the at least one other pore characteristic being selected from the group consisting of: a size characteristic, a primary growth direction, a ratio of a main channel volume to a secondary arm volume, and any combination of these. Optionally, in any freeze-cast material or any method for making a freeze-cast material, the plurality of pores comprises a plurality of first pores in a first zone of the internal structure (preferably, deterministic internal structure) and a plurality of second pores in a second zone of the internal structure (preferably, deterministic internal structure); wherein the plurality of first pores are in fluid communication with the plurality of second pores; wherein the plurality of first pores are characterized by one or more pore characteristics different from corresponding one or more pore characteristics of the plurality of second pores; and wherein the first zone and the second zone do not overlap and are in physical contact with each other.

Optionally, in any method for making a freeze-cast material, step of determining comprises determining the first pore-type of the plurality of first pores and the second pore-type of the plurality of second pores; wherein the step of selecting comprises selecting a first temperature gradient and a first freezing front velocity to obtain the plurality of first pores, and the step of selecting comprises selecting a second temperature gradient and a second freezing front velocity to obtain the plurality of second pores; wherein the step of controlling comprises controlling the first temperature gradient and the first freezing front velocity to obtain the plurality of first pores, and the step of controlling comprises selecting the second temperature gradient and the second freezing front velocity to obtain the plurality of second pores.

Optionally, in any method for making a freeze-cast material, selecting comprises selecting the temperature gradient and the freezing front velocity based on a pore-structure stability. The pore-structure stability map is a diagram showing effect of selection of temperature gradient and freezing front velocity on resulting pore-type of pores of the internal structure of the freeze-cast material, such as FIG. 5A and FIG. 16A. Optionally, in any method for making a freeze-cast material, the temperature gradient is selected from the range of 0.5 K/mm to 20 K/mm. Optionally, in any method for making a freeze-cast material, the freezing front velocity is selected from the range of 85 nm/s to 400 μm/s, optionally 85 nm/s to 40 μm/s. It is noted that the freezing front velocity can depend on thickness of the material and velocity of cross-linking of polymeric species. Low freezing front velocities can be obtained, for example, if the liquid formulation does not form a gel during directionally freezing. Optionally, in any method for making a freeze-cast material, controlling comprises holding the temperature gradient within 30%, optionally in some embodiments within 20%, of a single value and varying the freezing front velocity thereby manipulating an average size characteristic of pores of the internal structure. Optionally, in any method for making a freeze-cast material, controlling comprises holding the freezing front velocity within 30%, optionally in some embodiments within 20%, of a single value and varying the temperature gradient thereby manipulating a pore fraction characteristic of pores of the internal structure. The "pore fraction" characteristic is, for example, a "primary pore fraction" or a ratio of volume of main channel(s) to volume of secondary arms (and tertiary arms, if present) of dendritic pores of the internal structure. For example, if a primary pore fraction is 25%, then 25 vol. % of pores is comprised of main channel volume. Correspondingly, in this example, 75 vol. % is the "secondary arm fraction", or pore fraction characteristic corresponding to a volume of secondary arms of the pores to volume of main channel(s) of the pores.

Optionally, any method for making a freeze-cast material further comprises providing a thermally conductive spacer, such that the spacer forms one or more reservoirs of the liquid formulation during the freezing step. The one or more reservoirs, formed via the spacer, are useful if a volume of the solvent shrinks due to its freezing. The reservoirs provide liquid formulation to accommodate or counter solvent shrinkage. For example, the reservoir(s) allow a thickness of the frozen solid to be maintained as corresponding to distance between a top and a bottom heat exchange surfaces, despite shrinkage of the solvent during freezing.

Optionally, in any method for making a freeze-cast material, the step of controlling comprising applying a first heat exchange at a first surface of the liquid formulation or frozen solid and applying a second heat exchange to a second surface of the liquid formulation or frozen solid; wherein the first surface and the second surface are opposite of each other. Optionally, in any method for making a freeze-cast material, applying the first heat exchange comprises controlling a temperature of a substrate in thermal-communication with the first surface; and wherein applying the second heat exchange comprises irradiating the second surface with infrared light. Optionally, in any method for making a freeze-cast material, applying the first heat exchange comprises controlling a temperature of a substrate in thermal-communication with the first surface; and wherein applying the second heat exchange comprises controlling a temperature of a second substrate in thermal-communication with the second surface.

Optionally, any method for making a freeze-cast material further comprises steps of selecting and introducing a functionalization agent to the internal structure of the material; wherein the functionalization agent is at least one of (i) selected such that a selected analyte associates with the selected functionalization agent and (ii) selected such that a selected non-analyte does not associate with the selected functionalization agent.

Optionally, in any method for making a freeze-cast material, the step of directionally freezing comprises using a template to control the directionality of the plurality of pores. Templating, or the use of a template, can manipulate directionality, such as to make directionality more uniform among the template pores compared to not-templated pores. Templating can also be used to control or manipulate the number of pores in the internal structure.

Optionally, in any method for making a freeze-cast material, the step of determining comprises selecting the temperature gradient based on a pre-selected permeability of the internal structure and the step of directionally freezing comprising controlling the temperature gradient to obtain the pre-selected permeability based on the selected temperature gradient.

Optionally, in any method for making a freeze-cast material, the plurality of pores are dendritic pores; wherein the step of determining comprises selecting the temperature gradient based on a pre-selected ratio of a main channel volume to a secondary arm volume of the dendritic pores; and wherein the step of directionally freezing comprising controlling the temperature gradient to obtain the pre-selected ratio based on the selected temperature gradient.

Optionally, in any freeze-cast material or any method for making a freeze-cast material, the material has a composition comprising one or more ceramic materials, one or more metal oxide materials, one or more carbide materials, one or more nitride materials, one or more sulfide materials, and any combination of these. Optionally, in any freeze-cast material or any method for making a freeze-cast material, the material has a composition comprising zeolite material(s) and/or mesoporous silica, for example as part of at least a portion of walls or surfaces of the plurality of pores. Optionally, in any freeze-cast material or any method for making a freeze-cast material, a cross-sectional dimension, such as diameter or width (e.g., pore void width, of the plurality of pores is selected from the range of 500 nm to 500 μm. Optionally, in any freeze-cast material or any method for making a freeze-cast material, the dispersed species is a preceramic polymer. Optionally, in any liquid formulation or any method for making a freeze-cast material, the liquid formulation comprises an additive selected from the group consisting of at least one catalyst, a plurality of colloidal nanocrystals, at least one reinforcing agent, at least one metal, metal ions, an electrically conductive additive, at least one zeolite material, at least one mesoporous silica material, and any combination of these species is a preceramic polymer. Preferably, but not necessarily, the plurality of (first) pores has at least one of morphological homogeneity, directional homogeneity, and geometrical homogeneity over at least 75%, preferably at least 90%, of a volume of the internal structure. Preferably, but not necessarily, the plurality of (first) pores has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (first) pores has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$.

In an aspect, a freeze-cast material comprises: an internal structure (preferably, deterministic internal structure), the internal structure comprising at least a plurality of first pores in fluid-communication with a plurality of second pores; wherein the plurality of first pores are characterized by one or more pore characteristics different from corresponding one or more pore characteristics of the plurality of second pores; wherein each of the plurality of first pores and each of the plurality of second pores have directionality; and wherein the internal structure is, or pores thereof are, formed via exclusion from a crystalline or crystallizing solvent. Optionally, the internal structure (preferably, deterministic internal structure) is configured such that any microscopic fluid path across the internal structure includes a first pore and a second pore. Optionally, the internal structure (preferably, deterministic internal structure) is configured such that any microscopic fluid path across the internal structure includes a number of pores selected from the group consisting of the plurality of first pores and the plurality of second pores, the number of pores being selected from the range of 1 to 100, optionally 1 to 50, preferably for some applications 1 to 20, more preferably for some applications 1 to 10, and further more preferably for some application 1 to 5. In some embodiments, the internal structure (preferably, deterministic internal structure) is configured such that any microscopic fluid path across the internal structure includes a number of pores of the plurality of pores selected is 1 to 2 pores. Optionally, the internal structure (preferably, deterministic internal structure) is configured such that any microscopic fluid path across the internal structure includes only one first pore and one second pore. Optionally, the plurality of first pores and the plurality of second pores correspond to at least 50%, preferably at least 75%, more preferably at least 90%, more preferably for some applications at least 99%, of total microscopic porosity of the internal structure. Optionally, the plurality of first pores are of a first pore-type and the plurality of second pores are of a second pore-type; and wherein each of the first pore-type and the second pore-type is independently selected from the group consisting of dendritic pores, cellular pores, lamellar pores, and prismatic pores. Optionally, the first pore-type is different from the second pore-type. For example, both the first and the second pores can be dendritic pores. For example, one of the first pores and the second pores can be dendritic pores and the other of the first pores and the second pores can be cellular pores. Optionally, the one or more pore characteristics is an average size characteristic (e.g., a cross-sectional dimension), such that the plurality of first pores is characterized by an average size characteristic different from an average size characteristic of the plurality of second pores. Optionally, the directionality of each of the plurality of first pores and of each of the plurality of second pores is characterized by a deterministic primary growth direction; and wherein the primary growth direction of each of the plurality of first pores is equivalent to or within 45°, preferably within 30°, more preferably within 15°, of the primary growth direction of each of the plurality of second pores. Optionally, the plurality of first pores are in a first zone of the internal structure (preferably, deterministic internal structure), the plurality of second pores are in a second zone of the internal structure (preferably, deterministic internal structure), and wherein the first zone and the second zone do not overlap and are in physical contact with each other. Preferably, but not necessarily, the plurality of (first) pores has at least one of morphological homogeneity, directional homogeneity, and geometrical homogeneity over at least 75%, preferably at least 90%, of a volume of the internal structure. Preferably, but not necessarily, the plurality of (first) pores has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (first) pores has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (second) pores has at least one of morphological homogeneity, directional homogeneity, and geometrical homogeneity over at least 75%, preferably at least 90%, of a volume of the internal structure. Preferably, but not necessarily, the plurality of (second) pores has morphological homogeneity, directional homogeneity, and geometrical homogeneity over at least 75%, preferably at least 90%, of a volume of the internal structure. Preferably, but not necessarily, the plurality of (second) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (second) pores has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$.

Optionally, any deterministic internal structure having a plurality of first pores and a plurality of second pores can further comprise a plurality of third pores, the plurality of third pores being characterized by at least one of an average size characteristic, a primary growth direction, and a pore-type different from the same of the plurality of first pores and of the plurality of second pores In an aspect, a freeze-cast material system comprises: a internal structure (preferably, deterministic internal structure), the internal structure (preferably, deterministic internal structure) comprising a plurality of first pores, wherein: each of the plurality of first pores has directionality; and the internal structure is, or the first pores thereof are, formed via exclusion from a crystalline or crystallizing solvent; and a functionalization agent associated with at least a portion of a surface area of the plurality of pores, wherein the functionalization agent is at least one of (i) selected such that a selected analyte associates with the selected functionalization agent and (ii) selected such that a selected non-analyte does not associate with the selected functionalization agent. A functionalization agent can associate with the at least a portion of the surface area of the plurality of pores by absorption, adsorption, alloying, ionic bonding, covalent bonding, coordination bonding, or any combination of these. The term "sorb" can be used to refer to absorption, adsorption, or a combination of both. Optionally, the functionalization agent is hydrophilic, comprises chitosan, comprises polyethylene glycol (PEG), or any combination of these. Optionally, wherein the functionalization agent is at least one of (i) selected such that a selected analyte associates with the selected functionalization agent at least 50%, preferably at least 75%, of the functionalized surface area, and (ii) selected such that a selected non-analyte does not associate with the selected functionalization agent at least 50%, preferably at least 75%. Optionally, the internal structure (preferably, deterministic internal structure) further comprises a plurality of second pores, wherein: the plurality of first pores are in fluid-communication with a plurality of second pores; the plurality of second pores being characterized by at least one of an average size characteristic, a primary growth direction, and a pore-type different from the same of the plurality of first pores and of the plurality of second pores; each of the plurality of second pores have directionality; each of the plurality of second pores has a second pore-type selected from the group consisting of dendritic pores, cellular pores, lamellar pores, and prismatic pores; and the plurality of first pores are in a first zone of the internal structure (preferably, deterministic internal structure), the plurality of second pores are in a second zone of the internal structure (preferably, deterministic internal structure), and wherein the first zone and the second zone do not overlap and are in physical contact with each other. Preferably, but not necessarily, the plurality of (first) pores has at least one of morphological homogeneity, directional homogeneity, and geometrical homogeneity over at least 75%, preferably at least 90%, of a volume of the internal structure. Preferably, but not necessarily, the plurality of (first) pores has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (first) pores has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$.

In an aspect, a freeze-cast material comprises: an internal structure (preferably, deterministic internal structure), the internal structure (preferably, deterministic internal structure) comprising a plurality of first pores, wherein: each of the plurality of first pores has directionality; and the internal structure is, or the first pores thereof are, formed via exclusion from a crystalline or crystallizing solvent; and wherein the material is formed of a composition comprising an additive selected from the group consisting of at least one catalyst, a plurality of nanocrystals, at least one reinforcing agent, at least one metal, metal ions, an electrically conductive additive, at least one zeolite material, at least one mesoporous silica material, and any combination of these. Optionally, the material composition is characterized as a nanocomposite material having the plurality of nanocrystals. Optionally, the additive is selected from the group consisting of carbon black, Pt, Fe, Cu, carbon nanotubes, graphene, WS$_2$ nanotubes, intercalated clay, nanocrystals, and any combination of these. Optionally, the freeze-cast material is electrically conductive. For example, using a polymer comprising mostly hydrogen and carbon as the dispersed species (in the liquid mixture), to form the freeze-cast material, can produce a scaffold of electrically-conductive carbon which has the predetermined pore morphology. For example, the material can be made catalytically active by inclusion of a catalytic additive, such as complexed metal ions (e.g., Pt, Fe, Cu) the material's composition (e.g., by including the catalytic agent in the liquid mixture for forming the material). For example, carbon nanotubes can be included in the material's composition as reinforcing agents, which can also act as electrically conductive additives, for enhanced strength, and optionally also enhanced electrical conductivity of the freeze-cast material. Optionally, the internal structure (preferably, deterministic internal structure) further comprises a plurality of second pores, wherein: the plurality of first pores are in fluid-communication with a plurality of second pores; the plurality of second pores being characterized by at least one of an average size characteristic, a primary growth direction, and a pore-type different from the same of the plurality of first pores and of the plurality of second pores; each of the plurality of second pores have directionality; each of the plurality of second pores has a second pore-type selected from the group consisting of dendritic pores, cellular pores, lamellar pores, and prismatic pores; and the plurality of first pores are in a first zone of the internal structure (preferably, deterministic internal structure), the plurality of second pores are in a second zone of the internal structure (preferably, deterministic internal structure), and wherein the first zone and the second zone do not overlap and are in physical contact with each other. Preferably, but not necessarily, the plurality of (first) pores has at least one of morphological homogeneity, directional homogeneity, and geometrical homogeneity over at least 75%, preferably at least 90%, of a volume of the internal structure. Preferably, but not necessarily, the plurality of (first) pores has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, the plurality of (first) pores has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$.

In an aspect, a freeze-cast material system comprises: an internal structure (preferably, deterministic internal structure), the internal structure (preferably, deterministic internal structure) comprising a plurality of first pores, wherein: each of the plurality of first pores has directionality; and the internal structure is, or the first pores thereof are, formed via exclusion from a crystalline or crystallizing solvent; and wherein the internal structure (preferably, deterministic internal structure) has at least one of morphological homogeneity, directional homogeneity, and geometrical homogeneity over at least 50%, preferably at least 75%, more preferably at least 90%, further more preferably at least 95%, of a volume of the of the internal structure (preferably, deterministic internal structure). Preferably, but not necessarily, any internal structure disclosed herein of any freeze-cast material disclosed herein, has at least one of morphological homogeneity, directional homogeneity, and geometrical homogeneity over at least 75%, preferably at least 90%, of a volume of the internal structure. Preferably, but not necessarily, any internal structure disclosed herein of any freeze-cast material disclosed herein, has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure. Preferably, but not necessarily, the plurality of (first) pores has morphological homogeneity, directional homogeneity, and geometrical homogeneity over at least 75%, preferably at least 90%, of a volume of the internal structure. Preferably, but not necessarily, the plurality of (first) pores has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm³. Preferably, but not necessarily, the plurality of (first) pores has morphological homogeneity, directional homogeneity, and geometrical homogeneity over at least 75%, preferably at least 90%, of a volume of the internal structure, wherein the volume of the internal structure is at least 10 mm³, preferably at least 50 mm³, preferably at least 100 mm³, more preferably at least 500 mm³. Optionally, the homogeneity of the internal structure (preferably, deterministic internal structure) is characterized by each of the plurality of first pores having a same pore-type, an average size characteristic within 30%, optionally within 25%, preferably within 20%, more preferably within 10%, of that of each other first pore, and a primary growth direction within 30°, preferably within 15°, of that of each other first pore. Optionally, the internal structure (preferably, deterministic internal structure) has the homogeneity over at least 10 mm³, at least 50 mm³, at least 100 mm³, at least 200 mm³, at least 500 mm³, at least 1000 mm³, at least 5000 mm³, at least 10000 mm³, preferably at least 20000 mm³, preferably at least 50000 mm³, more preferably at least 100000 mm³, or further more preferably at least 500000 mm³. For example, some homogeneity can be obtained by maintaining a constant freezing front velocity and a constant temperature gradient during the directional freezing step. Optionally, the internal structure (preferably, deterministic internal structure) further comprises a plurality of second pores, wherein: the plurality of first pores are in fluid-communication with a plurality of second pores; the plurality of second pores being characterized by at least one of an average size characteristic, a primary growth direction, and a pore-type different from the same of the plurality of first pores and of the plurality of second pores; each of the plurality of second pores have directionality; each of the plurality of second pores has a second pore-type selected from the group consisting of dendritic pores, cellular pores, lamellar pores, and prismatic pores; and the plurality of first pores are in a first zone of the internal structure (preferably, deterministic internal structure), the plurality of second pores are in a second zone of the internal structure (preferably, deterministic internal structure), and wherein the first zone and the second zone do not overlap and are in physical contact with each other.

Optionally, in any freeze-cast material or associated method disclosed herein, each of the plurality of first pores is characterized as a continuous through-pore. Optionally, in any freeze-cast material or associated method disclosed herein, the internal structure (preferably, deterministic internal structure) is configured such that any microscopic fluid path across the internal structure includes a number of pores of the plurality of first pores selected from the range of 1 to 100, optionally 1 to 50, preferably for some applications 1 to 20, more preferably for some applications 1 to 10, and further more preferably for some application 1 to 5. Optionally, in any freeze-cast material or associated method disclosed herein, the plurality of first pores correspond to at least 75% of total microscopic porosity of the internal structure. Optionally, in any freeze-cast material or associated method disclosed herein, the freeze-cast material is in the form of a membrane.

Optionally, in any freeze-cast material or associated method disclosed herein, the plurality of first pores are of a pore-type selected from the group consisting of dendritic pores, cellular pores, lamellar pores, and prismatic pores. Optionally, in any freeze-cast material or associated method disclosed herein, a primary growth direction of each of the plurality of first pores is equivalent to or within 45°, preferably within 30°, more preferably within 15°, of the primary growth direction of each other first pore. Optionally, in any freeze-cast material or associated method disclosed herein, the plurality of first pores are a plurality of dendritic pores and each dendritic pore is characterized by: a main channel and a plurality of secondary arms each in fluid-communication with the main channel; a length of the main channel being greater than a length of each secondary arms; the main channel of each dendritic pore extending along a primary growth axis which is parallel or within 45°, preferably within 30°, more preferably within 15°, of the primary growth direction, and each secondary arm of each dendritic pore extending along a respective secondary growth axis that is different from the primary growth axis. Optionally, a cross-sectional dimension of the main channel being greater than a cross-sectional dimension of each of the plurality of secondary arms.

Optionally, in any freeze-cast material or associated method disclosed herein, the material has a composition comprising one or more ceramic materials, one or more metal oxide materials, one or more carbide materials, one or more nitride materials, one or more sulfide materials, and any combination of these. Optionally, in any freeze-cast material or associated method disclosed herein, the one or more ceramic materials are selected from the group consisting of an oxide, a carbide, a boride, a sulfide, and any combination of these. Optionally, in any freeze-cast material or associated method disclosed herein, the one or more ceramic materials are selected from the group consisting of a metal oxide, a metal carbide, a metal boride, a metal sulfide, and any combination of these. Optionally, in any freeze-cast material or associated method disclosed herein, the material composition comprises a material selected from the group consisting of $ZrO_2$, $CeO_2$, SiOC, SiC, SiCN, SiBCN, SiBCO, SiCNO, SiAlCN, AlN, $Si_3N_4$, BCN, SiAlCN, SiAlCO, a Si—Ti—C—O ceramic, a Si—Al—O—N ceramic, a B-based ceramic, and any combination thereof. Optionally, in any freeze-cast material or associated method disclosed herein, the internal structure is characterized by an intrinsic permeability constant selected from the range of $10^{-14}$ to $10^{-10}$ m². It is noted that "intrinsic permeability" refers to the permeability in a porous medium that is 100% saturated with a single-phase fluid. This may also be called specific permeability. Intrinsic permeability refers to the quality that the permeability value in question is an intensive property of the medium, not a spatial average of a heterogeneous block of material, and that it is a function of the material structure only (and not of the fluid). Intrinsic permeability is expressed in units of length² (SI units are m²).

Optionally, in any freeze-cast material or associated method disclosed herein, a cross-sectional dimension (such as diameter or width, such as pore void's width) of the plurality of first pores is preferably selected from the range of 500 nm to 500 μm, optionally 1 μm to 500 μm, optionally 4 μm to 500 μm, optionally 500 nm to 1 mm. Optionally, in any freeze-cast material or associated method disclosed herein, the plurality of first pores are of a first pore-type and the plurality of second pores are of a second pore-type; and wherein each of the first pore-type and the second pore-type is independently selected from the group consisting of dendritic pores, cellular pores, lamellar pores, and prismatic pores. Optionally, in any freeze-cast material or associated method disclosed herein, the plurality of first pores are dendritic pores characterized by a ratio of a main channel volume to a secondary arm volume selected from the range of 0.05 to 0.95, or any value or range therebetween inclusively. Optionally, in any freeze-cast material or associated method disclosed herein, the material is in the form of a membrane having a capture efficiency of at least 50%, preferably at least 70%, more preferably at least 80%, more preferably at least 90%, and further more preferably at least 95%.

In an aspect, a liquid formulation comprises: a solvent; wherein the solvent has a melting point selected from the range of 0° C. to 123° C. (optionally, −20° C. to 150° C.); and at least one dispersed species homogenously dispersed in the solvent at a concentration selected from the range of 3 to 60 vol % (optionally 0.5 vol % to 75 vol. %); wherein the at least one dispersed species comprises ceramic powders or at least one preceramic polymer. Optionally, the at least one dispersed species is homogeneously dispersed in the solvent at the start of a freeze-casting process for making a freeze-cast material. The dispersed species can be a material precursor, wherein the material precursor forms pore walls of the internal structure of a freeze-cast material during freeze-casting. For some discussion of concentration ranges of dispersed species for freeze-casting, see Sofie, et al. (S. W. Sofie, F. Dogan, Freeze Casting of Aqueous Alumina Slurries with Glycerol, J. Am. Ceram. Soc. 84 (2004) 1459-1464), which is incorporated herein by reference to the extent not inconsistent herewith. Optionally, any liquid formulation can comprise at least one of: at least one dispersant, at least one cross-linking agent, at least one catalytic agent, at least one colloidal species additive, at least one reinforcing agent, at least one zeolite material, at least one mesoscopic silica material, and any combination of these. Optionally, in any liquid formulation disclosed herein, the at least one colloidal species additive comprises colloidal nanocrystals, carbon black, carbon nanotubes, $WS_2$ nanotubes, intercalated clay, or any combination of these. Optionally, in any liquid formulation disclosed herein, the ceramic powders are selected from the group consisting of oxides, carbides, borides, sulfides, and any combination of these. Optionally, in any liquid formulation disclosed herein, the ceramic powders are selected from the group consisting of metal oxides, metal carbides, metal borides, metal sulfide, and any combination of these. Optionally, in any liquid formulation disclosed herein, the at least one preceramic polymer is selected from the group consisting of polycarbosilanes, polysiloxanes, polysilsesquioxanes, polycarbosiloxanes, polysilylcarbodiimides, polysilsesquicarbodiimides, polysilsesquiazanes, polysilazanes, polyborosilazanes, polyborosilanes, polyaluminocarbosilanes, polytitanocarbosilane, poly[(methylamino)borazines], polyborazylene, polyiminoalane, and any combination of these. Optionally, in any liquid formulation disclosed herein, the solvent is selected from the group consisting of cyclohexane, cyclooctene, tert-butanol, dioxane, dimethyl carbonate, p-Xylene, camphene, cyclohexanol, water, 1-octanol, 2-ethylhexanol, and any combination of these.

Also provided herein, in an aspect, are methods for using a membrane comprising a freeze-cast material, wherein: the freeze-cast material has an internal structure (preferably, deterministic internal structure); the internal structure (preferably, deterministic internal structure) comprises a plurality of pores; each of the plurality of pores has directionality; and the internal structure is, or the plurality of pores thereof are, formed via exclusion from a crystalline or crystallizing solvent during a freeze-casting process; and the method comprises steps of: flowing a liquid mixture through the material system, the mixture comprising a plurality of particles; and separating the particles according to at least one of a size characteristic of each particle and a chemical interaction of each particle using the membrane. Optionally, the chemical interaction is at least one of adsorption and absorption of each particle to a surface of the plurality of pores. Preferably, but not necessarily, the plurality of pores has at least one of morphological homogeneity, directional homogeneity, and geometrical homogeneity over at least 75%, preferably at least 90%, of a volume of the internal structure. Preferably, but not necessarily, the plurality of pores has morphological homogeneity, directional homogeneity, and geometrical homogeneity over at least 75%, preferably at least 90%, of a volume of the internal structure. Preferably, but not necessarily, the plurality of pores has at least one of morphological homogeneity, directional homogeneity, and geometrical homogeneity over at least 75%, preferably at least 90%, of a volume of the internal structure, wherein the volume of the internal structure is at least 10 $mm^3$, preferably at least 50 $mm^3$, preferably at least 100 $mm^3$, more preferably at least 500 $mm^3$. Preferably, but not necessarily, the plurality of pores has morphological homogeneity, directional homogeneity, and geometrical homogeneity over at least 75%, preferably at least 90%, of a volume of the internal structure, wherein the volume of the internal structure is at least 10 $mm^3$, preferably at least 50 $mm^3$, preferably at least 100 $mm^3$, more preferably at least 500 $mm^3$.

Optionally, any method for using a membrane method comprises selecting separation characteristics and determining a desired internal structure of the material system based on selected separation characteristics, and selecting the membrane having the material with the desired internal structure. Optionally, any method for using a membrane method comprises controlling a flow rate, a flow type, a functionalization agent, or any combination of these to obtain the selected separation characteristics. Optionally, in any method for using a membrane method, the step of separating comprises controlling the flow rate of the mixture through the membrane. Optionally, in any method for using a membrane method, the desired internal structure comprises a plurality of dendritic pores; wherein the method further comprises selecting size characteristics of the plurality dendritic pores such that large particles of the plurality of particles flow through main channels of the dendritic pores and such that small particles of the plurality of particles are delayed or permanently captured within the secondary arms of the dendritic pores. Optionally, in any method for using a membrane method, the separation characteristics comprise capture efficiency, a desired maximum filtrate-particle size characteristic, a desired minimum entrained-particle size characteristic, a desired filtrate-particle chemical characteristic, a desired entrained-particle chemical characteristic, or any combination of these. Optionally, in any method for using a membrane method, the liquid mixture is a biological fluid. Optionally, in any method for using a membrane method, the liquid mixture is blood; wherein the step of separating comprises entraining bacteria and passing blood cells.

Also provided herein are freeze-cast materials and membranes having freeze-cast materials including any one or any combination of embodiments of freeze-cast materials, liquid formulations, methods for making freeze-cast materials, and methods for using membranes disclosed herein. Also provided herein are method of making freeze-cast materials including any one or any combination of embodiments of freeze-cast materials, liquid formulations, methods for making freeze-cast materials, and methods for using membranes disclosed herein. Also provided herein are liquid formulations including any one or any combination of embodiments of freeze-cast materials, liquid formulations, methods for making freeze-cast materials, and methods for using membranes disclosed herein. Also provided herein are methods of using membranes including any one or any combination of embodiments of freeze-cast materials, liquid formulations, methods for making freeze-cast materials, and methods for using membranes disclosed herein.

Preferably, but not necessarily, any internal structure disclosed herein of any freeze-cast material disclosed herein, has at least one of morphological homogeneity, directional homogeneity, and geometrical homogeneity over at least 75%, preferably at least 90%, of a volume of the internal structure. Preferably, but not necessarily, any internal structure disclosed herein of any freeze-cast material disclosed herein, has morphological homogeneity, directional homogeneity, and geometrical homogeneity over at least 75%, preferably at least 90%, of a volume of the internal structure. Preferably, but not necessarily, any internal structure disclosed herein of any freeze-cast material disclosed herein, has at least one of morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$. Preferably, but not necessarily, any internal structure disclosed herein of any freeze-cast material disclosed herein, has morphological homogeneity, directional homogeneity, and geometrical homogeneity over at least 75%, preferably at least 90%, of a volume of the internal structure, wherein the volume of the internal structure is at least 10 mm$^3$, preferably at least 50 mm$^3$, preferably at least 100 mm$^3$, more preferably at least 500 mm$^3$.

As used herein, any internal structure disclosed herein, of any freeze-cast material disclosed herein, can be, preferably but not necessarily, a deterministic internal structure.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 6E. Pore size distribution within the measurement range of 100 nm to 80 µm from porosimetry, with inserted sample image after machining.

FIG. 15A: A schematic of a device for making a freeze-cast material allowing for gradient-controlled freeze-casting. The "copper plate" is an exemplary thermally conductive spacer. The dotted sections around the copper plate show liquid mixture reservoirs formed by the shape of the thermally conductive reservoir. FIG. 15B: a photograph of a device for making a freeze-cast material, such as a device of FIG. 15A.

FIG. 16A: A temperature gradient vs. freezing front velocity pore-structure stability map showing that different pore-types are obtained at different regions of the pore-structure stability map. FIG. 16B: a plot showing temperature vs. time for a top and a bottom heat-exchange surface (e.g., top and bottom thermoelectric plate) during an exemplary process for making a freeze-cast material including an internal structure with a zone having dendritic pores and a zone having cellular pores, according to some embodiments.

FIG. 19A is a plot of principal curvature $\kappa_2$ vs. $\kappa_1$ with regions of the plot annotated to indicate shape of a pore surface corresponding to the indicated principal curvatures. FIG. 19B is a plot of surface area normalized principal curvatures, or $\kappa_2/S_v$ vs. $\kappa_1/S_v$, with regions of the plot annotated to indicate types of pore surface shapes observed based on corresponding principal curvatures. Annotation 'S' indicates solvent, fluid, or void inside of the pore (e.g., the volume of the main channel and side arms); and 'D' indicates the pore wall (or, solid portion corresponding to the dispersed species which form the pore wall). Between 'S' and 'D' is the pore surface, which has a shape characterized by the principal curvatures.

FIG. 25. SEM images showing different pore-types: Dendritic, Lamellar, and Isotropic.

FIG. 26A: Image of dendrites formed from a liquid mixture including cyclohexane, for example. FIG. 26B: close-up image of dendritic pores. FIG. 26C is a schematic of flow patterns in dendritic pores. FIG. 26D is a schematic of flow patterns in dendritic pores, also showing large particles (blood cells) passing through the main channel and small particles (bacteria) delayed or trapped in microvortices formed in the secondary arms.

FIG. 27A. Pore size distributions by mercury intrusion porosimetry showing effect of freezing velocity. FIG. 27B. Pore size distributions by mercury intrusion porosimetry plot showing effect of polymer concentration.

FIG. 31A. Percent fraction out of total pores (primary pores: 24%, Secondary arms: 76%.) for a freeze-cast material having dendritic pores based upon pore size distribution plot. FIG. 31B is an image of a portion of a dendritic pore of a freeze-cast material.

FIGS. 32A-32D. Change in freezing front velocity at constant temperature gradient. FIG. 32A. Pore-structure stability map (temperature gradient vs. freezing front velocity) showing two data points, representing a change in freezing front velocity at constant temperature gradient. FIG. 32B. Pore size distributions by mercury intrusion porosimetry of freeze-cast materials corresponding to the two data points in the pore-structure stability map of FIG. 32A. FIG. 32C. Transverse direction images of pores of the internal structure of freeze-cast material with higher freezing front velocity (left) and lower freezing front velocity (right), according to the two data points in the pore-structure stability map of FIG. 32A. FIG. 32D. Longitudinal direction images of pores of the internal structure of freeze-cast material with higher freezing front velocity (left) and lower freezing front velocity (right), according to the two data points in the pore-structure stability map of FIG. 32A.

FIGS. 33A-33C. Change in temperature gradient at constant freezing front velocity. FIG. 33A. Pore-structure stability map (temperature gradient vs. freezing front velocity) showing two data points, representing a change in temperature gradient at a constant freezing front velocity. FIG. 33B. Pore size distributions by mercury intrusion porosimetry of freeze-cast materials corresponding to the two data points in the pore-structure stability map of FIG. 33A. FIG. 33C. Transverse direction images of pores of the internal structure of freeze-cast material with lower temperature gradient (left) and higher temperature gradient (right), according to the two data points in the pore-structure stability map of FIG. 33A.

FIG. 34A. Schematic representing an exemplary test of particle separation in a freeze-cast material. FIG. 34B. Fluorescent micrographs of small and large particles. FIG. 34C. Pore size distributions by mercury intrusion porosimetry for structures formed using a high or a low temperature gradient. FIG. 34D. Images of pores in internal structures formed using low and high gradient membranes.

FIG. 35A. Image of pores formed using a low temperature gradient. FIG. 35B. Bar graph demonstrating results of particles passed through, 2 µm particles. FIG. 35C. Bar graph demonstrating results of particles passed through, 10 µm particles.

FIG. 36A. Images of pores formed using a high temperature gradient. FIG. 36B. Bar graph demonstrating results of particles passed through. FIG. 36C. Bar graph demonstrating results of particles passed through, 10 μm particles.

FIG. 37A. Summary of data showing ability of low temperature gradient membrane to separate particles. FIG. 37B. Schematic showing effect of higher flow rate on separation.

FIG. 38A. Summary of data showing ability of high temperature gradient membrane to separate particles. FIGS. 38B-C. Schematics demonstrating particle interaction with main channel and secondary arms are lower flow rates.

FIG. 39A. Particles passed through vs. time. FIG. 39B. SEM image of dendritic pores with small particles captured in the secondary arms.

FIG. 41A. Crystal structure of ice. FIG. 41B. Morphology of growing crystals. FIG. 41C. Resulting porous structure.

FIGS. 44A-44D. Pore structures: solvent choice; increasing Jackson alpha factor. FIG. 44A. Cyclooctane, Isotropic. FIG. 44B. Cyclohexane, Dendritic. FIG. 44C. T-Butanol, Prismatic. FIG. 44D. Dimethyl carbonate, Lamellar.

FIGS. 45A-45E. Solidification morphology. FIG. 45A. Cyclooctane. FIG. 45B. Cyclohexane. FIG. 45C. Dioxane. FIG. 45D. t-Butanol. FIG. 45E. Dimethyl carbonate.

FIGS. 47A-47B. (FIG. 47A) Sample (e.g., a material of Example 2) height and diameter before compression, after compression, and after heat treatment; associated residual and recovered displacements used to establish recovered strain. (FIG. 47B) The corresponding stress-strain curve during compression.

STATEMENTS REGARDING CHEMICAL COMPOUNDS AND NOMENCLATURE

Figure 1:
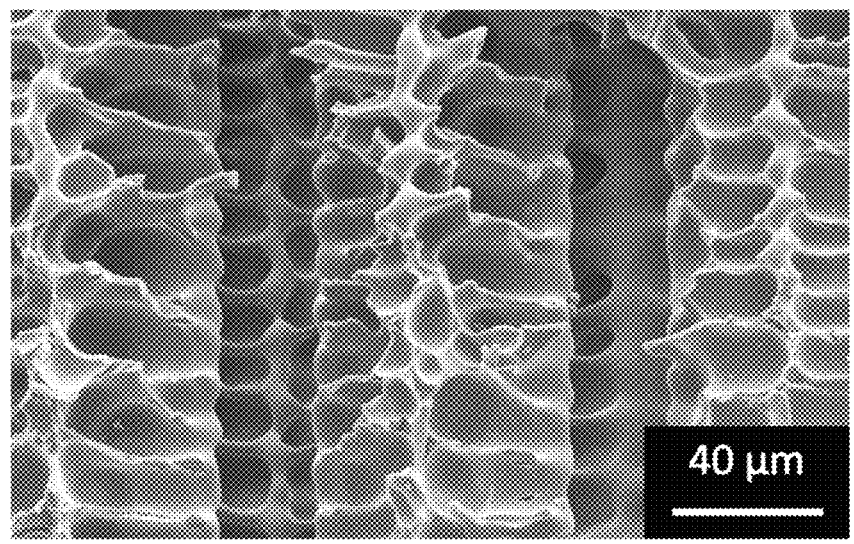
FIG. 1. An SEM image of a plane parallel to freezing direction showing dendritic pores.

In general, the terms and phrases used herein have their art-recognized meaning, which can be found by reference to standard texts, journal references and contexts known to those skilled in the art. The following definitions are provided to clarify their specific use in the context of the invention.

The term "freeze-casting" refers to a process for forming a porous material having an internal structure according to any embodiment(s) disclosed herein, wherein the process includes freezing a solvent (or, dispersion medium) of a liquid formulation and subsequently removing the solvent by sublimation or solvent extraction. In embodiments, the liquid formulation comprises the solvent and chemical species dispersed ("dispersed species") therein. Exemplary dispersed species include, but are not limited to, powders, such as ceramic powders, preceramic polymers, colloidal particles, micelles, salts, and any combinations of these. In embodiments, the crystallizing (freezing) and/or crystallized solvent leads to exclusion of the dispersed species therefrom, resulting in redistribution of non-solvent solids that subsequently form or template the internal structure of the porous material. The frozen/crystallized solvent is then removed from the pores of the internal structure by sublimation or solvent extraction. In embodiments, the solvent is a solvent mixture. In some embodiments, the freezing is a directional freezing. In some embodiments, freeze-casting is characterized by forming a material with an internal structure characterized by directional pores having a cross-sectional dimension, such as diameter, selected from the range of 500 nm to 500 μm. It is noted that controlling pore characteristics of 500 nm to 500 μm pores represents an unsatisfied need in the art. A wide variety of applications, such as but not limited to separating pathogens from blood and fractionating particulate products by size, require or benefit from membranes having 500 nm to 500 μm pores.

This range of pore size is not accessible using methods that are used to produce materials with well-defined pores having cross sectional dimensions that are less than approximately 100 nm. Synthesis of zeolites provides materials with pores in the size range from 0.2 to 2 nm that are catalogued in the Atlas of Zeolite Framework Types by Ch. Baerlocher W. M. Meier and D. H Olson sixth edition. Typically, zeolites are formed by crystallization of metal oxide precursors and molecular structure directing agents. Synthesis of mesoporous materials provide routes to pore sizes in the range from 2 nm to 50 nm, such as MCM-41,["Advances in Mesoporous Molecular Sieve MCM-41," X S Zhao, G Q Lu, G J Millar, *Ind. Eng. Chem. Res.* 1996, 35, 2075-2090], MCM-48, SBA-15, TUD-1, HMM-33, and FSM-16. Pore sizes in the range from 0.2 nm to 50 nm provide extremely large surface area per unit volume of material, which is useful for catalysis, chemical sensors, and molecular separation. ["Mesoporous Silica Nanoparticles: A Comprehensive Review on Synthesis and Recent Advances", R Narayan, U Y Nayak, A M Raichur, S Garg, *Pharmaceutics* 2018, 10, 118; doi:10.3390] Generally, templates including surfactants, such as anionic surfactants, cationic surfactants, nonionic surfactants, and block copolymers, are used to chaperone the formation of uniform-sized pores of sizes from 10 nm to 100 nm. The methods that are used to prepare zeolites and mesoporous materials are limited to pores that are much smaller than those of the materials disclosed herein, resulting in zeolite materials that have the deficiency of very low permeability. The methods that are used to prepare zeolites and mesoporous materials have failed to produce porous materials with long-range orientation and connectivity spanning length scales of 0.1 mm to 10 mm. Consequently, the methods used to prepare zeolites and mesoporous materials do not meet the need for membranes and monoliths in which the orientation of the pores is deterministic over length scales of 0.1 mm to 10 mm. The range of pore sizes from 500 nm to 500 μm is not accessible using methods to produce materials with directional pores with sizes greater than 0.5 mm by extrusion. Parallel pores of size 1 mm and larger are useful when a membrane or monolith of material with very high permeability is required. For example, the ceramic monoliths used in catalytic converters have aligned pores with cross sectional dimensions of approximately 1 mm such that the exhaust gas can readily flow through. However, extrusion processes fail when channel dimensions are less than 0.5 mm. One of the reasons is that interfacial forces become increasingly important as the size of the opening decreases and the interfacial forces act to collapse the pores. Freeze casting avoids this problem by templating the pores using solidification of a solvent, the freeze casting methods provides a solid support for the microstructure that prevents collapse. Prior to or during sublimation the constituents that were rejected by the solvent crystal can be solidified such that the pores do not collapse when the solvent is removed by sublimation or extraction. The freeze casting methods disclosed herein address the need for deterministic porous materials with aligned pores in the important size range from 500 nm to 500 μm. The freeze-cast material synthesis methods disclosed herein produced inventive deterministic porous materials described herein. The following references provide further context for the different pore size regimes: Xu, Ruren; Pang, Wenqin; Yu, Jihong (2007). Chemistry of zeolites and related porous materials: synthesis and structure. Wiley-Interscience. p. 472. ISBN 978-0-470-82233-3. Blin, J. L.; Impéror-Clerc, M. Mechanism of self-assembly in the synthesis of silica mesoporous materials: In situ studies by X-ray and neutron scattering. Chem. Soc. Rev. 2013, 42, 4071-4082. Gao, C.; Qiu, H.; Zeng, W.; Sakamoto, Y.; Terasaki, O.; Sakamoto, K.; Chen, Q.; Che, S. Formation Mechanism of Anionic Surfactant-Templated Mesoporous Silica. Chem. Mater. 2006, 18, 3904-3914. Pharmaceutics 2018, 10, 118. Flodström, K.; Wennerström,H.; Alfredsson, V. Mechanism of Mesoporous Silica Formation. A Time-Resolved NMR and TEM Study of Silica☐Block Copolymer Aggregation. Langmuir 2004, 20, 680-688. Attard, G. S.; Glyde, J. C.; Göltner, C. G. Liquid-crystalline phases as templates for the synthesis of mesoporous silica. Nature 1995, 378, 366-368. Sundblom, A.; Oliveira, C. L. P.; Palmqvist, A. E. C.; Pedersen, J. S. Modeling In Situ Small-Angle X-ray Scattering Measurements Following the Formation of Mesostructured Silica. J. Phys. Chem. C 2009, 113, 7706-7713. Hollamby, M. J.; Borisova, D.; Brown, P.; Eastoe, J.; Grillo, I.; Shchukin, D. Growth of Mesoporous Silica Nanoparticles Monitored by Time-Resolved Small-Angle Neutron Scattering. Langmuir 2012, 28, 4425-4433. Edler, K. J. Current Understanding of Formation Mechanisms in Surfactant-Templated Materials. Aust. J. Chem. 2005, 58, 627-643. Yi, Z.; Dumée, L. F.; Garvey, C. J.; Feng, C.; She, F.; Rookes, J. E.; Mudie, S.; Cahill, D. M.; Kong, L. A New Insight into Growth Mechanism and Kinetics of Mesoporous Silica Nanoparticles by In Situ Small Angle X-ray Scattering. Langmuir 2015, 31, 8478-8487. Danks, A. E.; Hall, S. R.; Schnepp, Z. The evolution of "sol-gel" chemistry as a technique for materials synthesis. Mater. Horiz. 2016, 3, 91-112.

The term "internal structure" refers to the internal geometry or internal configuration in a material (e.g., within the external boundaries (e.g., external surfaces) of the material). The term internal structure does not refer to structure on an atomic length scale of a material, such as the characterization of crystallographic structure. An internal structure comprising pores or voids can be characterized as a "porous internal structure." The term "porous", as used herein, refers to a material or structure within which pores are arranged. Thus, for instance, in a porous material or structure, the pores are volumes within the body of the material or structure where there is no material. Pores can be characterized by a "pore characteristic" including, but not limited to, a (average) size characteristic, a geometrical parameter, a pore-type, directionality, a primary growth direction, a primary growth axis, a secondary growth axis, being a continuous through-pore, and any combinations of these. Geometrical parameters of a pore are exemplary size characteristics of a pore. An exemplary cross-sectional dimension of a pore is its hydraulic diameter, which is defined as the ratio of the cross sectional area of the pore divided by the wetted perimeter of the pore.

Figure 52:
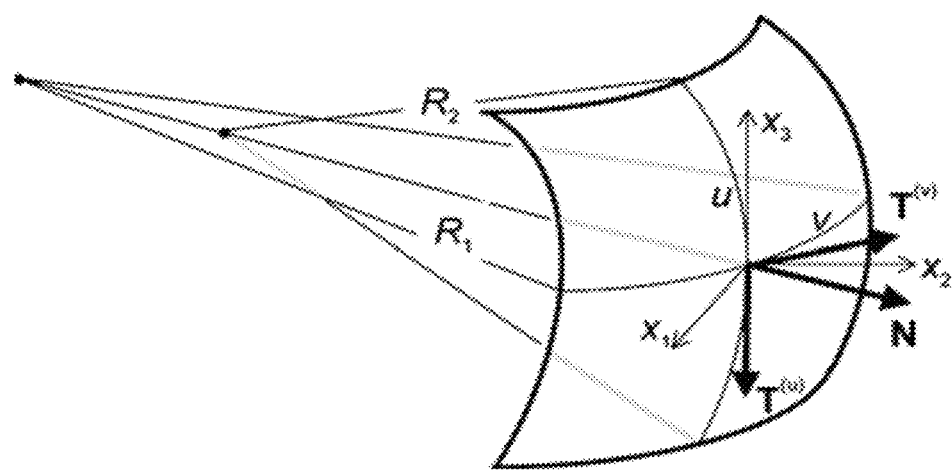
FIG. 52. A schematic corresponding to a coordinate (Monge) patch defining the geometry of a small piece of surface. The outward pointing normal vector N at (0, 0, 0) defines the orientation of the patch, and T(u) and T(v) are orthogonal surface tangent vectors to N, that set the orientation about the normal for the surface coordinates (u, v). As indicated, the oriented triplet of vectors defines two principal radii of curvature, R1 and R2, on the patch. Their associated curvatures ("principal curvatures"), $\kappa_1 = R_1^{-1}$ and $\kappa_2 = R_2^{-1}$, are elements that diagonalize the curvature matrix.
Figure 53:
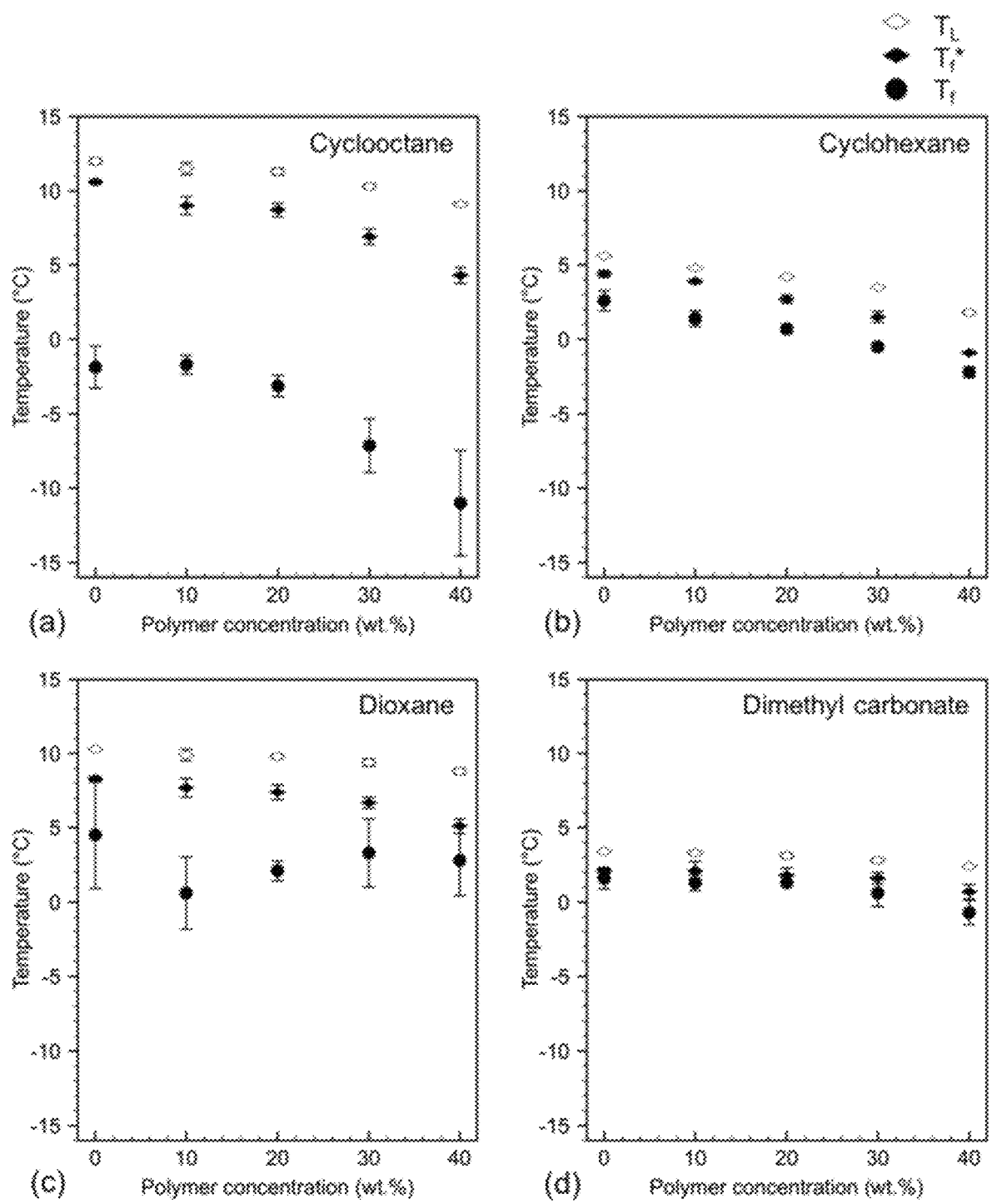
FIG. 53. Polymer-solvent phase diagrams for MK powder and (panel a) cyclooctene, (panel b) cyclohexane, (panel c) dioxane, and panel (d) dimethyl carbonate. The terms in the legend are: the natural freezing point (Tf), the agitated freezing point (Tf*), and the liquidus temperature (TL).

A pore of an internal structure can be characterized by its pore-type. Exemplary pore-types include, but are not limited to, dendritic pores, cellular pores, lamellar pores, prismatic pores, isotropic pores, and transitional pores. As used herein, preferably, pore-types are selected from the group consisting of dendritic pores, cellular pores, lamellar pores, and prismatic pores. Pore-types can be differentiated with respect to the shape of a surface of the pore as characterized by the surface's principal curvatures, $\kappa_1$ and $\kappa_2$, being the minimum and maximum values of curvature, respectively, such as illustrated in FIG. 52. A surface of a pore ("pore surface") corresponds to the surface of the pore's wall representing an interface between the pore wall and a fluid when the pore's void volume filled with the fluid. Principal curvatures $\kappa_1$ and $\kappa_2$ are defined as $\kappa_1=1/R_1$ and $\kappa_2=1/R_2$, where $R_1$ and $R_2$ are the principal radii of curvature corresponding to a surface of the pore. See Kammer, et al. (D. Kammer, P. W. Voorhees, "The morphological evolution of dendritic microstructures during coarsening," Acta Mater. 54 (2006) 1549-1558), which is incorporated herein in its entirety to the extent not inconsistent herewith, for further characterization of principal curvatures $\kappa_1$ and $\kappa_2$ and their relation to shape of the surface of pores, such as dendritic pores. In some embodiments, the shape of a surface of the pore can be characterized by $\kappa_1/S_\nu$ and $\kappa_2/S_\nu$, where $S_\nu$ is the surface area per unit volume the pore or plurality of pores being characterized. The shape of a pore surface can be characterized by appropriate techniques known in the art, such as X-ray microtomography, which can be aided by computational simulations, confocal microscopy, focused ion beam scanning electron microscopy (e.g., see M. Ender, J. Joos, T. Carraro, E. Ivers-Tiffée, Quantitative Characterization of LiFePO 4 Cathodes Reconstructed by FIB/SEM Tomography, J. Electrochem. Soc. 159 (2012) A972-A980), and automated serial sectioning technique developed by Alkemper and Voorhees (J. Alkemper, P. W. Voorhees, Quantitative serial sectioning analysis, J. Microsc. 201 (2001) 388-394). Pore-types and their surface shapes, and techniques for characterizing these, can also be found in: S. Deville Freezing Colloids: Observations, Principles, Control, and Use, Springer International Publishing AG, 2017; D. Kammer, P. W. Voorhees, The morphological evolution of dendritic microstructures during coarsening, Acta Mater. 54 (2006) 1549-1558; D. Kammer, Three-Dimensional Analysis and Morphological Characterization of Coarsened Dendritic Microstructures, Ph.D. thesis, Northwestern University, 2006; D. Kammer, R. Mendoza, P. W. Voorhees, Cylindrical domain formation in topologically complex structures, Scr. Mater. 55 (2006) 17-22, doi:10.1016/J.SCRIPTAMAT.2006.02.027; M. Ender, J. Joos, T. Carraro, E. Ivers-Tiffée, Quantitative Characterization of LiFePO 4 Cathodes Reconstructed by FIB/SEM Tomography, J. Electrochem. Soc. 159 (2012) A972-A980; and M. Glicksman, Principles of Solidification: An Introduction to Modern Casting and Crystal Growth Concepts, Springer New York, 2011; each of which is incorporated herein by reference to the extent not inconsistent herewith.

Any dendritic pore has a main channel and a plurality of secondary arms, each of the secondary arms being in fluid-communication with the main channel. The term "arm" refers to a non-main channel pore/void section or portion of a dendritic pore. The secondary arms are portions of the dendritic pore (they are void/pore portions) which are not the main channel. In embodiments, a characteristic cross-sectional dimension of the main channel (e.g., diameter of a cylindrical main channel) is greater than a cross-sectional dimension of each of the plurality of secondary arms. In embodiments, the overall length of the main channel (e.g., straight line from end to end) is greater than a length of each secondary arm. A dendritic pore is also characterized by the main channel extending along a primary growth axis and each secondary arm extending along a respective secondary growth axis, where the primary growth axis is different from each of the secondary growth axes of the dendritic pore. With respect to dendritic pores, the terms "main channel" and "primary pore" are used interchangeably and are intended to be synonymous. With respect to dendritic pores, the terms "secondary arm", "secondary pore" and "side cavity" are used interchangeably and are intended to be synonymous. In embodiments, the primary growth axis of each dendritic pores of a plurality of dendritic pores is parallel to or within 45°, preferably within 30°, more preferably within 15°, of the primary growth direction of the plurality of dendritic pores. In some embodiments, the main channel of a dendritic pore has a cylindrical cross-sectional shape, such that the main channel itself appears as a cylindrical pore. In some embodiments, dendritic pores comprise a cross-sectional shape resembling a cross or an 'X', or an asterisk. In some embodiments, a dendritic pore further comprises a plurality of tertiary arms, each tertiary arm being in direct fluid communication with a secondary arm of the dendritic pore and being in indirect fluid communication with the main channel via said secondary arm. Preferably, the main channel of any dendritic pore can be fluidically isolated from the main channel of any other pore's main channel of the same zone. In other words, preferably, the main channel (or, "primary pore") of any first dendritic pore is not in fluid communication, neither directly nor through its secondary arms, within the internal structure, with the main channel nor secondary arms of any second dendritic pore if both the first and the second dendritic pores are part of the same zone of pores of an internal structure of a freeze-cast material. Pore characteristics of dendritic pores include geometrical parameters of a dendritic pore-type, which include the center-to-center distance between the central axis of a pore and the central axis of an adjacent pore and the distance between the mid-plane of a side cavity and the mid-plane of an adjacent side cavity. In some embodiments, a dendritic pore is characterized as having a surface with a plurality of portions the surface having a saddle-shape. In some embodiments, a dendritic pore is characterized as having a surface with a plurality of portions where $0<\kappa_2<|\kappa_1|$ and $0>\kappa_1$, a plurality of portions where $0=\kappa_1=\kappa_2$ and a plurality of portions where $\kappa_2>\kappa_1>0$. Note that $0=\kappa_1=\kappa_2$ indicates a flat surface, as illustrated in FIG. 34D (left). In some embodiments, a dendritic pore is characterized as having a surface with a plurality of portions where $|\kappa1|/S_V>\kappa_2/S_V>0$ and $\kappa_1/S_V<0$, a plurality of portions where $0=\kappa_1/S_V=\kappa_2/S_V$, and a plurality of portions where $\kappa_2/S_V>\kappa_1/S_V>0$. FIGS. 19A, 19B, 20, and 51 illustrate principal curvatures at portion of a surface of a dendritic pore and interfacial shape distribution with respect to principal curvatures. In Kammer (D. Kammer, P. W. Voorhees, The morphological evolution of dendritic microstructures during coarsening, Acta Mater. 54 (2006) 1549-1558), which is incorporated herein in its entirety to the extent not inconsistent herewith, Figure 5.23(a) shows an interfacial shape distribution (ISD) and FIG. 5.23(b) shows specific locations (shown in red) which correspond to the region marked with a white border in the respective ISD. The region marked with white border in ISD is a result of three contributing factors: (1) secondary arms, which are mostly cylindrical or cylindrical-like and give rise to the peak's relative alignment along the solid cylinder line, (2) dendritic tips; and (3) isolated convex shapes in the structure, which give rise to the peak's partial positioning in the convex area and to the convex tail of the ISD. Outside of white border region, one can observe saddle-shaped region. Additional description of dendritic pores, surface shapes in dendritic pores, and techniques for characterizing these can be found in: D. Kammer, P. W. Voorhees, The morphological evolution of dendritic microstructures during coarsening, Acta Mater. 54 (2006) 1549-1558; D. Kammer, Three-Dimensional Analysis and Morphological Characterization of Coarsened Dendritic Microstructures, Ph.D. thesis, Northwestern University, 2006; and D. Kammer, R. Mendoza, P. W. Voorhees, Cylindrical domain formation in topologically complex structures, Scr. Mater. 55 (2006) 17-22; doi:10.1016/J.SCRIPTAMAT.2006.02.027.

Figure 21:
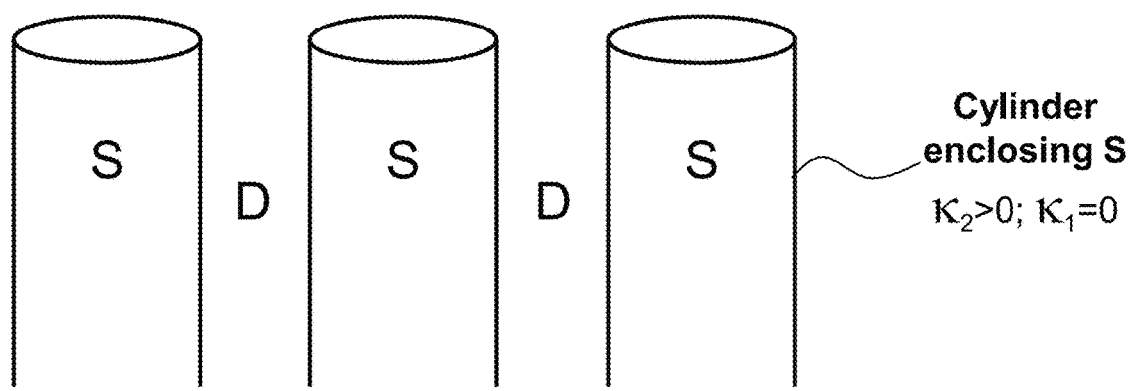
FIG. 21. Illustration of cellular pores, with annotations indicating values of principal curvatures $\kappa_1$ and $\kappa_2$ at the pore surface. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall).

Any cellular pore is characterized as a longitudinal pore. For example, cellular pores can be characterized as pores having a main channel without, or substantially without, secondary arms. In some embodiments, cellular pores are cylindrical pores, having an ellipsoidal (e.g., circular) cross-sectional shape. In some embodiments, any first cellular pore is not in fluid communication, within the internal structure, with any second cellular pore if both the first and the second cellular pores are part of the same zone of pores of an internal structure of a freeze-cast material. Pore characteristics of cellular pores include geometrical parameters of a cellular pore-type, which include the distance between the central axis of a pore and the central axis of an adjacent pore and the hydraulic diameter of the pore. The distance between two axes is measured along a direction that is orthogonal to one of the two axes. In some embodiments, none or substantially none of a cellular pore's surface is characterized as having a saddle-shape. In some embodiments, none or substantially none of a cellular pore's surface can be characterized by both $0<\kappa_2<|\kappa_1|$ and $0>\kappa_1$, and $\kappa_2>\kappa_1>0$. In some embodiments, none or substantially none of a cellular pore's surface can be characterized by both $|\kappa_1|/S_v>\kappa_2/S_v>0$ and $\kappa_1/S_v<0$, and $\kappa_2/S_v>\kappa_1/S_v>0$. In some embodiments, a cellular pore is characterized as having a surface with a plurality of portions where $\kappa_2>0$ and $\kappa_1=0$. FIG. 21 illustrates principal curvatures at a surface of a cellular pore. In Kammer (D. Kammer, R. Mendoza, P. W. Voorhees, Cylindrical domain formation in topologically complex structures, Scr. Mater. 55 (2006) 17-22; doi: 10.1016/J.SCRIPTAMAT.2006.02.027), which is incorporated herein in its entirety to the extent not inconsistent herewith, figures show 3D reconstruction of cellular-like morphology (FIG. 4(*b*)) and corresponding ISD (FIG. 5), where the distribution in ISD map is in the region of $\kappa_2>0$ and $\kappa_1=0$.

Any lamellar pore is characterized as a series of stacked two-dimensional plate-like structures, having a planar or rectangular cross-sectional pore shapes. In some embodiments, any first lamellar pore is not in fluid communication, within the internal structure, with any second lamellar pore if both the first and the second lamellar pores are part of the same zone of pores of an internal structure of a freeze-cast material. Pore characteristics of lamellar pores include geometrical parameters of a lamellar pore type, which include the distance through the void between solid surfaces, the distance through the solid between two free surfaces, and the sum of the two distances (known as the lamellar wavelength). The distance between two surfaces is measured along a direction that is normal to one of the two surfaces.

Any prismatic pore is characterized as a longitudinal pore having smooth faceted walls. In some embodiments, any first prismatic pore is not in fluid communication, within the internal structure, with any second prismatic pore if both the first and the second prismatic pores are part of the same zone of pores of an internal structure of a freeze-cast material.

In some embodiments, an internal structure can be characterized as having a plurality of zones. In an internal structure having a plurality of zones, each zone comprises a plurality of pores having at least one pore characteristic that is different from the corresponding pore characteristic of the plurality of pores of each other zone. Each zone is in fluid communication with at least one other zone. For example, a plurality of pores of each zone is in fluid communication with a plurality of pores of at least one other zone. In some embodiments, each zone does not overlap with any other zone but each zone is in physical contact with at least one other zone of the internal structure. For example, physical boundaries of each zone do not overlap with physical boundaries of any other zone but at least one boundary of each zone is in physical contact with at least one boundary of at least one other zone of the internal structure. Optionally, a primary growth direction of pores in a zone is normal to a boundary of the zone, or a portion or tangent thereof. An internal structure can also have only a single zone, such that all or substantially of the internal structure corresponds to the single zone.

A pore that includes at least two openings to an edge or external surface of the material and forms a continuous channel through the material's internal structure between the at least two openings can be characterized as a continuous through-pore. For example, a cellular pore having two ends, such as one at a bottom surface of the material system and the other end at the opposite top surface of the material system, and forming a continuous channel between the two ends (and thus through the material system) can be characterized as a continuous-through pore. Similarly, for example, a dendritic pore having a main channel with two ends, such as one at a bottom surface of the material and the other end at the opposite top surface of the material, and forming a continuous channel between the two ends (and thus through the material system) can be characterized as a continuous through-pore. A pore having only one end opening at an edge or outer surface of the internal structure can be characterized as an open pore, but not necessarily a continuous through-pore. On the other hand, a pore whose internal volume is entirely confined within boundaries of the internal structure, without forming a channel to at one or at least two edges of the material, can be characterized as a closed pore. In some embodiments, stochastic foams include or are formed substantially of closed pores.

The term "size characteristic" refers to a property, or set of properties, of a pore or particle that directly or indirectly relates to a size attribute of the pore or particle. According to some embodiments, a size characteristic corresponds to an empirically-derived size characteristic of a pore or particle(s) being detected, such as a size characteristic based on, determined by, or corresponding to data from any technique or instrument that may be used to determine a pore size or particle size, such as electron microscope (e.g., for particles or pores; e.g., SEM and TEM), mercury intrusion porosimetry (e.g., for pores), or a light scattering technique (e.g., for particle; e.g., DLS). For example, in reference to a particle, a size characteristic can correspond to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as length, width, thickness, or diameter. Size characteristics of a pore include length, width, diameter, surface area, geometrical parameter, or void volume in the pore. A plurality of pores can be characterized by an average size characteristic, such as an empirically-derived numerical average of the respective size characteristic of each pore of the plurality of pores. A pore may be a longitudinal pore, for example. A longitudinal pore is one whose length is at least 20% greater than its diameter (or, than width of its void volume, for example, if diameter is not an appropriate characteristic). For example, cellular pores and dendritic pores are longitudinal pores.

A material can be in the form of a membrane. The term "material system" may be used to refer to a material having a shape, such as an object or element, such as a membrane. A material can have an internal structure, which may be porous. For example, a material can be in the form of a membrane, having a porous internal structure such that the membrane may be used for separation or filtration of a fluid mixture.

A deterministic internal structure is custom engineered to be useful for a specific application, where the specific application requires or benefits from one or more features or properties of the internal structure. The term "deterministic" refers to an internal structure characterized by at least one deterministic feature or property, which is predicted and controlled to be substantially equivalent to at least one pre-determined feature or property. The at least one feature or property includes, but is not limited to, porosity, pore-type, zone (or aspect thereof such as zone dimensions and pore-type in the zone), size characteristic (average size characteristic; including but not limited to length, width, diameter, or cross-sectional dimension), primary growth direction, primary growth axis, secondary growth axis, ratio of main channel volume to secondary arm volume, geometrical parameter(s), other pore characteristic, homogeneity, or any combination of these. A "pre-determined" feature or property, or value(s) thereof, is the feature or property as determined or selected prior to the formation of the internal structure. As used here, "substantially equivalent" refers to the at least one feature or property being equal to or within 30%, preferably within 20%, preferably within 10%, more preferably within 5%, more preferably within 1%, or more preferably within 0.1%, of the at least one pre-determined feature or property. Process conditions and parameters, including but not limited to freezing front velocity, temperature gradient, and solvent, for a method for forming freeze-cast material with a deterministic internal structure are selected based on the at least one pre-determined feature or property. Thus, a deterministic internal structure is formed to have the at least one pre-determined feature or property, such that the deterministic internal structure has the corresponding at least one deterministic feature or property. For example, a deterministic internal structure is one for which a freezing front velocity and a temperature gradient are selected based on the at least one pre-determined feature or property to yield the corresponding substantially equivalent at least one deterministic feature or property, thus resulting in the deterministic internal structure. In certain embodiments, a deterministic internal structure is characterized by a deterministic pore-type, deterministic primary growth direction, and at least one deterministic average size characteristic. In an illustrative example, a deterministic internal structure has dendritic pores characterized by an average primary growth direction that is within 20% of a pre-determined primary growth direction. In an illustrative example, a deterministic internal structure has dendritic pores (e.g., a plurality of first pores) characterized by an average main channel diameter that is within 20% of a pre-determined average main channel diameter (e.g., 15 µm±20%) for the respective pores. In an illustrative example, a deterministic internal structure is pre-determined to have two zones, the first zone having dendritic pores and the second zone having cellular pores, where 75% of pore volume in the internal structure corresponds to the first zone's dendritic pores and 25% of pore volume in the internal structure corresponds to the second zone's cellular pores, and the material formation is controlled such that the resulting deterministic internal structure's pore volume is 75% dendritic pore volume (or, 60% to 90%; i.e., within 20% of pre-determined value) and 25% cellular pore volume (or, 20% to 30%; i.e., within 20% of pre-determined value). In an illustrative example, a deterministic internal structure has two zones, each zone having dendritic pores characterized by an average primary growth direction that is within 20% of a pre-determined primary growth direction for the corresponding zone. In an illustrative example, a deterministic internal structure has dendritic pores (e.g., a plurality of first pores) characterized by a primary pore fraction that is within 20% of a pre-determined primary pore fraction. In an illustrative example, a deterministic internal structure has pores (e.g., a plurality of first pores) characterized by an average longitudinal length that is within 20% of a pre-determined average longitudinal length. A deterministic internal structure is exclusive of stochastic structures, such as random/stochastic foams.

As used herein with respect to an internal structure, of a freeze-cast material, the term "homogeneity" refers to uniformity of a plurality of pores of the internal structure. An internal structure having homogeneity has at least one of a morphological homogeneity, directional homogeneity, and geometrical homogeneity, and preferably for certain materials, an internal structure having homogeneity exhibits each of morphological homogeneity, directional homogeneity, and geometrical homogeneity. The term "morphological homogeneity" refers to pores of the internal structure having uniformity in terms of pore-type. A plurality of pores having morphological homogeneity is characterized by at least at least 80% of the pores, preferably at least 90%, and more preferably each pore, of the plurality of pores having the same pore-type (e.g., dendritic, cellular, lamellar, or prismatic). The term "directional homogeneity" refers to pores of the internal structure having uniformity in terms of a common direction, which can be the primary growth direction of the pores or the direction of a common orientation such as a longitudinal direction of the pores. A plurality of pores having directional homogeneity is characterized by at least 80% of the pores, preferably at least 90% of the pores, having a common direction, such as the primary growth direction of the pores or the direction of a common orientation such as a longitudinal direction of the pores, that differs from an average primary growth direction (of the plurality of pores) by less than 30°, preferably less than 15°, more preferably less than 10°. The term "geometrical homogeneity" refers to pores of the internal structure having uniformity in terms of their size characteristic(s). A plurality of pores having geometrical homogeneity is characterized by at least 80% of the pores, preferably at least 90% of the pores, having at least one size characteristic that differs from the average of the corresponding at least one size characteristic (of the plurality of pores) by less than 50%, preferably less than 30%, more preferably less than 20%. Exemplary size characteristics include cross-sectional dimension (e.g., hydraulic diameter of pore), length, and one or more geometrical parameters. As noted above, geometrical parameters of dendritic pores include the center-to-center distance between the central axis of a pore and the central axis of an adjacent pore and the distance between the mid-plane of a side cavity and the mid-plane of an adjacent side cavity; geometrical parameters of cellular pores include the distance between the central axis of a pore and the central axis of an adjacent pore and the hydraulic diameter of the pore; and geometrical parameters of lamellar pores include the distance through the void between solid surfaces, the distance through the solid between two free surfaces, and the sum of the two distances (known as the lamellar wavelength). As an illustrative example, a plurality of dendritic pores exhibiting geometrical homogeneity is characterized by at least 80% of the dendritic pores each having (i) the center-to-center distance between the central axis of a pore and the central axis of an adjacent pore and (ii) the distance between the mid-plane of a side cavity and the mid-plane of an adjacent side cavity differing by less than 30% from (respectively) (i) the average center-to-center distance between the central axis of a pore and the central axis of an adjacent pore and (ii) the average distance between the mid-plane of a side cavity and the mid-plane of an adjacent side cavity, where the average is an average with respect to all pores of the plurality of pores being characterized. As used herein, any internal structure disclosed herein, of any freeze-cast material disclosed herein, preferably, but not necessarily, has homogeneity over at least 50%, preferably at least 75%, more preferably at least 90%, further more preferably at least 95%, of the volume of the internal structure. As used herein, any internal structure disclosed herein, of any freeze-cast material disclosed herein, preferably, but not necessarily, has homogeneity over at least 50%, preferably at least 75%, more preferably at least 90%, further more preferably at least 95%, of the volume of the internal structure, wherein the volume of the internal structure is preferably at least 10 mm$^3$, more preferably at least 50 mm$^3$, and further more preferably at least 100 mm$^3$. Homogeneity can be determined using statistical analysis of conventional micrographs that probe the relevant characteristics (e.g., relevant length scales) of the pore structure, by imaging techniques such as scanning electron microscopy (SEM), or by three-dimensional imaging techniques such as X-ray (micro)tomography.

The term "solvent" refers to a chemical species that has a well-defined melting temperature ($T_m$) and a melting transition that occurs within a temperature range of 20° C. In compositions and materials described herein, a solvent is used in its liquid phase to solvate (dissolve) or otherwise cause dispersion therein of materials ("dispersed species") including but not limited to, ceramic powders, colloidal nanocrystals, other colloidal particulates, glass powders, metals, preceramic polymers, monomers, micelles, salts, or combinations of these. In these aspects, the solvent is a substantially pure substance that contains 10% or less of one or more co-solvents, wherein the co-solvents are miscible with the solvent in its liquid state and are amenable to removal (e.g., sublimation or extraction) using the same process that removes the solvent during a freeze-casting process. The value of Tm can be measured by scanning calorimetry as the temperature at which the maximum rate of heat evolution during melting is observed. A well-defined melting temperature for some embodiments refers to one that shifts less than 2° C. when the heating rate is changed from 10° C./min to 20° C./min, wherein the difference between the two measured values is sufficiently small that the either one of the two values or the average of the two values will suffice to enable a skilled person to identify the processing conditions that produce a desired freeze-cast structure. The onset of the melting transition and the conclusion of the melting transition are the temperatures at which the heat flow deviates from the baseline by a value that is 10% of the maximum heat flow observed at the melting peak. A solvent for some embodiments can have a difference between the onset and conclusion of melting that is less than 20° C. when measured at a heating rate less than or equal to 20° C. A solvent, as used herein, is a solvent suitable for freeze-casting. For example, during freeze casting, the crystallization of the solvent rejects the dissolved and dispersed species. Crystallization of the solvent creates regions rich in the dissolved and dispersed species, after which the crystalline solvent is removed directly into the vapor phase by sublimation, wherein the resulting voids are made permanent by one of the methods known to convert the regions rich in that can become incorporated or transformed into the material of the pore walls of a freeze-cast porous material. Exemplary solvents include but are not limited to cyclohexane, cyclooctene, tert-butanol, dioxane, dimethyl carbonate, p-Xylene, camphene, cyclohexanol, water, 1-octanol, 2-ethylhexanol, and any combination of these. A solvent can also be referred to as a "dispersion medium."

The term "dispersion" refers to a homogenous liquid mixture. In the context of a dispersion, the term "homogeneous" refers to a liquid mixture that appears uniform to the naked eye. In contrast, a heterogenous liquid mixture includes particles that are precipitated from or suspended in the liquid mixture and are large enough to be distinctly identifiable by the naked eye in the liquid mixture. A heterogeneous liquid mixture includes, for example, sedimented and/or sedimenting particles. The term "dispersion" is broadly intended to include solutions and dispersions, such as colloids, which are not heterogenous liquid mixtures. As used herein, a dispersion may be a transient state of the liquid mixture, such as a kinetically but not thermodynamically stable mixture. For example, some heterogenous liquid mixtures may be perturbed (e.g., sonicated) resulting in temporary dispersal or dissolution of the large particles resulting in a liquid mixture that appears homogeneous to the naked eye, but where said liquid mixture can return to the heterogeneous state after some time. According to certain embodiments, a liquid mixture may be used as a liquid formulation for forming a freeze-cast material when the liquid mixture is in a state of being a "dispersion." For example, milk can be characterized as a dispersion. For example, a dispersion can include dispersed species that are molecularly stable. For example, the species dispersed in the dispersion can be dispersed solids and/or dissolved ions. Exemplary dispersed species in a dispersion include, but are not limited to, ceramic powders, preceramic polymers, colloidal species, micelles, salts, and any combinations of these. A dispersed species that forms pore walls of the internal structure, such as a preceramic polymer, can be referred to as a "material precursor."

As used herein, the term "fluid communication" refers to the configuration of two or more pores such that a fluid (e.g., a gas or a liquid) is capable of transport, flowing and/or diffusing from one pore to another pore, without adversely impacting the functionality of each of the pores or of the material having said pores. In some embodiments, pores can be in fluid communication with each other via one or more intervening pores. Pores can be direct fluid communication wherein fluid is capable of moving directly from one pore to another. Pores in fluid communication with each other can be in indirect fluid communication wherein fluid is capable of transport indirectly from one pore to another pore via one or more intervening pores that physically separate the components. The term "fluid communication" can be used to describe two or more zones of an internal structure, such as two zones are in fluid communication when one or more pores from one zone are in fluid communication with one or more pores of the other zone.

The term "exclusion from a crystalline or crystallizing solvent" may describe formation of a material's internal structure, or pores thereof, during freezing of a liquid formulation that includes a solvent and chemical species dispersed therein. In this context, the term "exclusion" may be used interchangeably with "rejection." A crystallizing and/or crystallized solvent can exclude or reject species that were dispersed therein. The exclusion process may include any combination of appropriate physical and/or chemical phase separation processes, including, but not limited to, precipitation of dispersed solids from the crystallizing and/or crystallized solvent and processes known in the art as impurity exclusion from a crystal. For example, the term "exclusion from a crystalline or crystallizing solvent" excludes processes such as nucleation and growth of droplets (e.g., for foams) and surfactant templating (e.g., for zeolites).

The term "directionality" refers to a characteristic of pores that can be described to extend in a direction. For example, pores having directionality may be characterized by as having a primary growth direction. The term "primary growth direction" refers to the direction in which a directional pore, or longitudinal pore, extends. The primary growth direction of a pore is a direction of its primary growth axis (its longitudinal axis). In cellular and dendritic pores, one can determine primary growth direction by observing or measuring the axial direction of the main pore. In prismatic pores, one can determine primary growth direction by observing or measuring the long axis of the prism. The only case in which we cannot observe the orientation of an axis is the lamellar case in which orientation of the normal to an internal surface is used to characterize directional homogeneity. For example, a plurality of parallel longitudinal pores, such as cellular pores or dendritic pores, can have identical primary growth directions but unique primary growth axes (e.g., the primary growth axes have same direction but each is transposed in physical space with respect to another). In other words, two pores having identical primary growth directions is an indication that they have parallel primary growth axes. Isotropic pores and pores of a stochastic foam do not have a primary growth direction or a primary growth axis. As noted earlier, dendritic pores include secondary arms, where each secondary arm is characterized by its own secondary growth axis. In some embodiments, dendritic pores may also include higher order arms, such as tertiary arms. Generally, the term "directionality" refers to an overall or average pore configuration, such as of the main channel of a dendritic pore (rather than of its secondary arms). In some embodiments, the primary growth axis of a pore can be characterized as a straight line of best fit representing the pore geometry/configuration in its entirety. A pore having directionality is an anisotropic pore. For example, The primary growth direction and the primary growth axis can be determined from conventional micrographs that probe the relevant length scales of the pore structure, from imaging techniques such as scanning electron microscopy (SEM), or from three-dimensional imaging techniques such as X-ray (micro)tomography.

As used herein, the term "microscopic" refers to a cross-sectional dimension in the range of 500 nm to 1 mm, such a microscopic particle, a microscopic pore, or a microscopic fluid path having a cross-sectional dimension in the range of 500 nm to 1 mm. For example, a microscopic fluid path refers to a path, such as through one or more pores, where substantially all portions of the path have a cross-sectional dimension in the range of 500 nm to 1 mm. For example, the portion of a fluid flowing through a channel or pore having a cross-sectional dimension of 1 nm does not correspond to a microscopic fluid path. For example, the portion of a fluid flowing through a pore having a 1 µm cross-sectional dimension does correspond to a microscopic fluid path, or portion thereof.

The term "directionally freezing" refers to the process of freezing, such as a freezing solvent, that is not isotropic. For example, directionally freezing corresponds to a freezing front moving along a single direction (uni-directional freezing), or up to several directions. For example, freezing may initiate at a surface (e.g., a cold surface) and proceed in direction(s) substantially normal to the surface. For example, the surface can be planar or curved. In some embodiments, a primary growth direction of a pore is substantially equal to the normal to the surface at which the directional freezing initiated.

The term "preceramic polymer" refers to a polymer that can chemically convert (e.g., chemically decompose) into a ceramic material when heat-treated, such as but not limited to, sintering or pyrolysis. For example, preceramic polymers are described in Colombo, et al. (P. Colombo, G. Mera, R. Riedel, G. D. Soraru, "Polymer-derived ceramics: 40 Years of research and innovation in advanced ceramics," J. Am. Ceram. Soc. 93 (2010) 1805-1837), which is incorporated herein by reference. For example, using pyrolysis, polyaluminocarbosilanes can be converted into SiAlCO or into SiAlON if heat treated in the presence of ammonia ($NH_3$). For example, polytitanocarbosilane can be converted to SiTiCO. For example, poly[(methylamino)borazines] and polyborazylene can be converted into boron nitride. For example, polyiminoalane can be converted into aluminum nitride.

The term "heat treatment" generally refers to exposure of a material to a high temperature. Exemplary heat treatment processes include sintering, pyrolysis, and high temperature annealing. For example, pyrolysis may refer to a temperature treatment range of 400° C. to 1400° C. For example, high temperature annealing may refer to a temperature treatment range of 1000° C. to 2000° C. For example, ceramic materials may undergo crystallization in the temperature range corresponding to high temperature annealing. For example, a material may be first pyrolyzed to form a ceramic and then crystallized at the high temperature annealing conditions. Heat treatment may be performed under a selected gas atmosphere, which is selected to induce and/or prevent certain chemical reactions (e.g., incorporation of O but not N, or N but not O). For example, see Mera, et al. (G. Mera, E. Ionescu, "Silicon-Containing Preceramic Polymers," in: Encycl. Polym. Sci. Technol., John Wiley & Sons, Inc., Hoboken, N.J., USA, 2013. doi:10.1002/0471440264.pst591), which is incorporated herein by reference, for further discussion of heat treatments and ceramic materials.

The term "isotropic" refers to exhibiting substantially equal physical properties and structure in all directions. For example, a spherical pore is an isotropic pore.

The term "freezing front velocity" refers to the rate at which the interface between the frozen solid and liquid solution/suspension moves away from a surface or interface at which freezing initiates/nucleates (e.g., the base plate or cold source), as can be measured optically.

The term "permeability" is the degree to which a material (or its structure) allows the passage therethrough of a liquid.

The "liquidus temperature" is the lowest temperature at which a mixture of solvent and any dissolved or suspended dispersed constituents is completely free of solvent crystals. "Solidus temperature" is the highest temperature at which a mixture of solvent and any dissolved or suspended dispersed constituents retains the maximum crystalline solvent content and no liquid solvent is observed.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

It is important to note that an approach, as disclosed herein, of determining or using a pore-structure stability map to deterministically predict and form a membrane material is not conventionally realized. Certain conventional approaches for forming a freeze-cast material can be summarized as one morphology per solvent. In other words, conventional approaches are limited to selecting a solvent to obtain a particular pore-type. However, the materials, formulations, and methods disclosed herein provide for a more versatile approach where a variety of pore characteristics, not just pore-type, can be obtained even without changing solvent. As disclosed herein, this can be achieved by determining a temperature gradient and freezing front velocity based on pore-structure stability maps disclosed herein. Moreover, dual-zone structures can be obtained by, for example, changing freeze-casting conditions (temperature gradient and/or freezing front velocity), for example based on the pore-structure stability map, to change pore characteristics during the freeze-casting process and thus terminating one zone and forming a second zone. On the other hand, the conventional approaches of one morphology per solvent are not compatible with forming dual-zone structures. The conventional approaches are also incapable of producing materials with the degree of homogeneity disclosed herein. The invention can be further understood by the following non-limiting examples.

Example 1: Freeze-Cast Ceramic Membrane for Size Based Filtration

Background: Isolating target particles from complex solutions is a necessary step in a variety of fields. Methods used to isolate particles of interest may be separated into extrinsic and intrinsic mechanisms. Labeling the particle of interest with a specific chemical functionality or magnetic signature is an example of an extrinsic mechanism. While extrinsic mechanisms often include difficult preparation steps which rely on a foreknowledge of the composition of the complex solution, intrinsic mechanisms rely solely on an understanding of the desired particle. Examples of intrinsic characteristics which may be exploited for separation are the deformability, polarizability, and size of the particle.

Size is particularly attractive as there is previous work in the literature demonstrating such separations in easily assembled devices. In work by Faridi et al., the researchers demonstrate the removal of red blood cells from blood to isolate pathogens of interest using the inertial focusing of a polymer rich fluid [1]. Unfortunately, this method is restricted to slow flow rates and is not easily scaled up into a modular unit, hence, the amount of solution it can process is limited. Another method to separate particles as a function of size is demonstrated in the work of Hur et al. [2]. In this work, the particles are separated by a difference in the net force acting upon the particle as a function of flow rate. Through the use of cavities lining a straight channel, larger particles are pulled into the cavity and are captured by microvortices developed by the fluid flow. Smaller particles are able to escape the cavities and are flushed down the device by the carrier fluid. The use of the microvortices to capture larger particles allows for higher flow rates to be used and the device is easily modulated. Despite these advantages, this device suffers from low capture efficiency ~50% and reduced ability to capture particles as the size decreases.

In order to capture small-sized particles, the flow velocity in a straight channel needs to be slow so that small particles have ample time to diffuse inside cavities for trapping. This motivates the development of a membrane with a large number of pores and cavities which are tailorable in size to capture target particles while achieving high volumetric throughput.

Summary: Disclosed herein is the development of a membrane with tailorable dendritic pores via freeze casting. Crystallization of a solvent can be used in conjunction with dispersed species, such as colloidal species, prepolymers or a combination of these. In some embodiments, the crystalline solvent is removed by sublimation (lyophilization) prior to conversion of the colloidal species and/or polymer to the final solid material of the membrane. In other embodiments, the crystalline solvent can be present at the time of conversion of the colloidal species and/or polymer to the final solid material of the membrane. The dispersed species, such as colloidal species, can be selected from ceramic or metal or a combination of these that are converted by firing to yield a ceramic or metallic membrane. The polymers can be preceramic polymers that yield a ceramic upon firing. Alternatively, the polymers may solidify by vitrification, crystallization, physical crosslinking or covalent crosslinking. In this way, the dendritic crystallization of a solvent can be used to template membranes that are metal, ceramic or polymer.

The invention is first demonstrated using a freeze casting of a solution of preceramic polymer to fabricate ceramic membranes. The invention can be applied in an analogous way to suspension of ceramic powders [3]. In freeze casting of preceramic polymer, the preceramic polymer solution is directionally frozen such that the phase separation between preceramic polymer and solvent crystal creates dendritic pores after removing the solvent crystals, e.g., by sublimation. The present Example focuses on creating dendritic pores, which have primary pores (templated by primary dendrites) and secondary arms (templated by secondary dendrite arms). Freezing front velocity has been used as a means to change pore size [4]. Freezing front velocity can be adjusted by controlling temperature of the cold surface. In turn, control of the dendritic structure offers new opportunities to change pore morphology.

In the present invention, solution temperature is controlled from both the top and bottom to modify freezing front velocity and temperature gradient. This enables control of not only the main channel and side cavity diameters, but also the side cavity length. Since the main channel and side cavities flow fields depend on their dimensions, the ability to manipulate these parameters is crucial in fabricating a membrane which allows large particles to pass through the main channel while selectively trapping small particles in the side pores [5].

The membrane described above will be used to isolate particles of interest based on size and interactions with the non-functionalized or functionalized surface. The aforementioned tunable parameters of the ceramic membrane dendritic structure, in this case SiOC, in conjunction with control of the volumetric flow rate allows for predetermined residence times and flow profiles. The amount of time necessary for a particle of interest to diffuse into the side cavities will guide the choice of residence time. Within the side cavity the flow velocity is significantly reduced increasing the probability of binding the desired particle to the functionalized membrane. With the target particles bound to the membrane surface, unwanted particles may be removed through manipulations of the flow rate.

Figure 22:
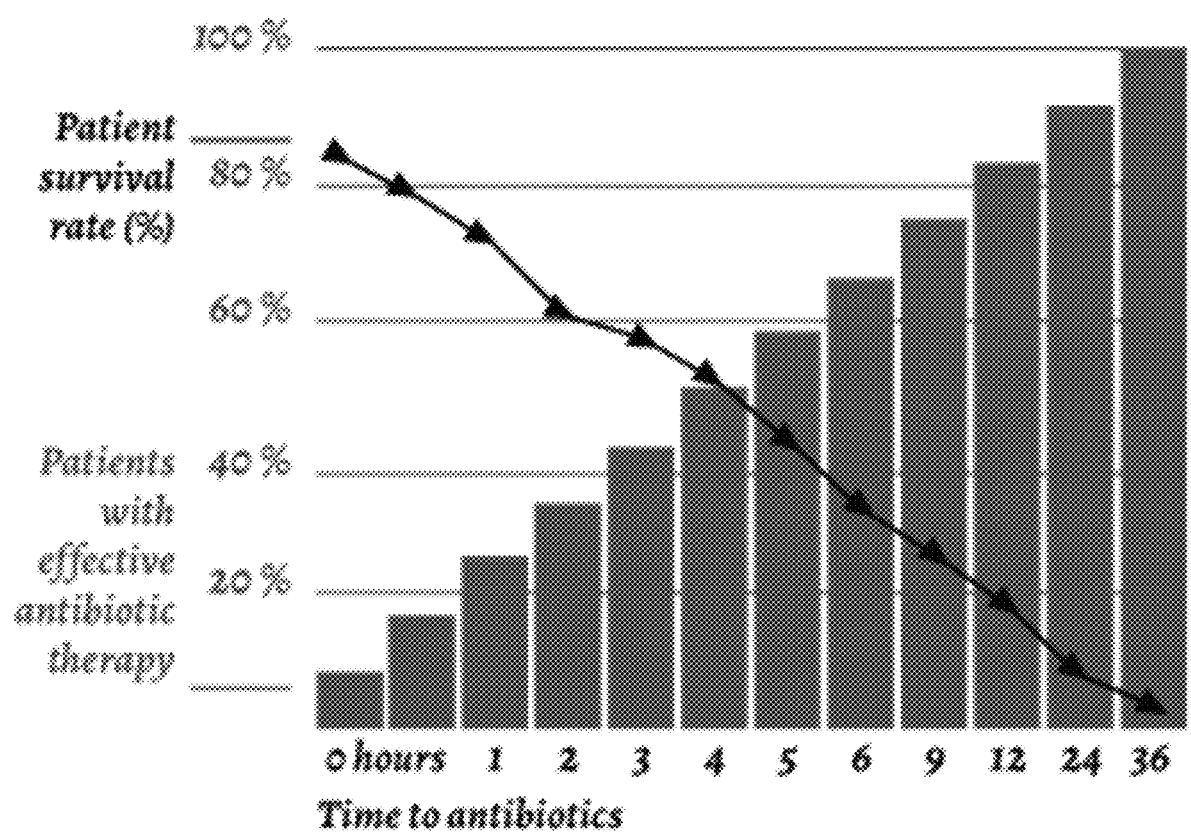
FIG. 22. Plot of patient survival rate vs time until antibiotics are administered demonstrating that sepsis is a medical emergency.
Figure 23:
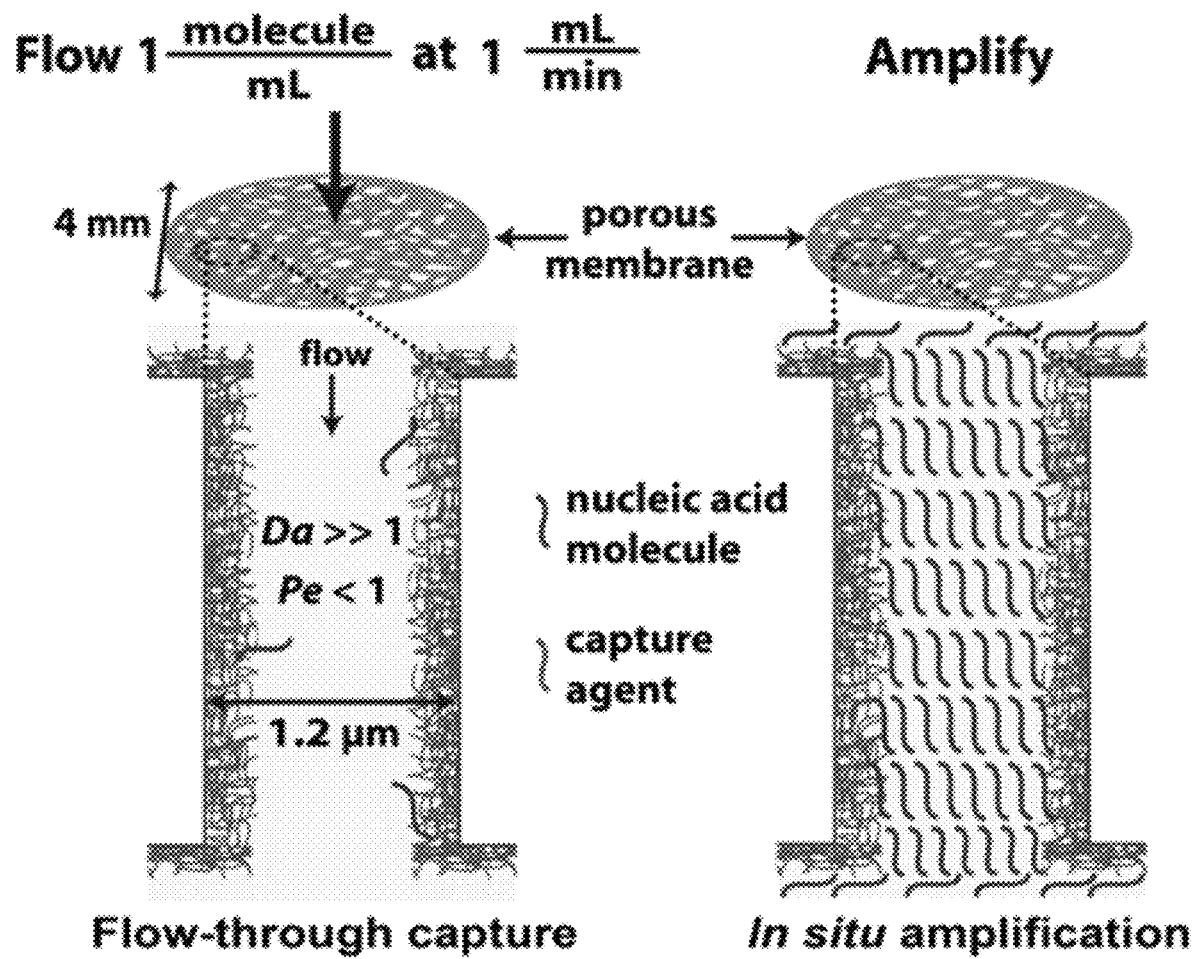
FIG. 23. Schematics showing some technical aspects of particle isolation using porous materials.

More specifically the invention may be used to isolate particles of interest (such as bacteria, cancer cells, proteins, etc.) from complex solutions (such as blood, organic broths, etc.). An illustrative example is the separation of bacteria from the blood of a sepsis patient (FIG. 26 C, D). Patient survival is inversely correlated to the amount of time necessary for identification of the infectious bacteria (FIG. 22). Using a ceramic membrane, a predetermined relationship will furnish the necessary flow rate to maximize bacteria capture efficiency. The functionalized surface of the membrane will secure the pathogen within the side cavities. Bacteria capture within the side cavities both reduces the volume of sample to treat during identification and increases capture efficiency.

Description: Freeze-cast ceramic membranes can be prepared by the following procedure. Even though it is described with a specific embodiment, it is not intended to limit the scope of the invention. This disclosure encompasses any freeze casting process suitable to fabricate membranes with dendritic pores.

Figure 2:
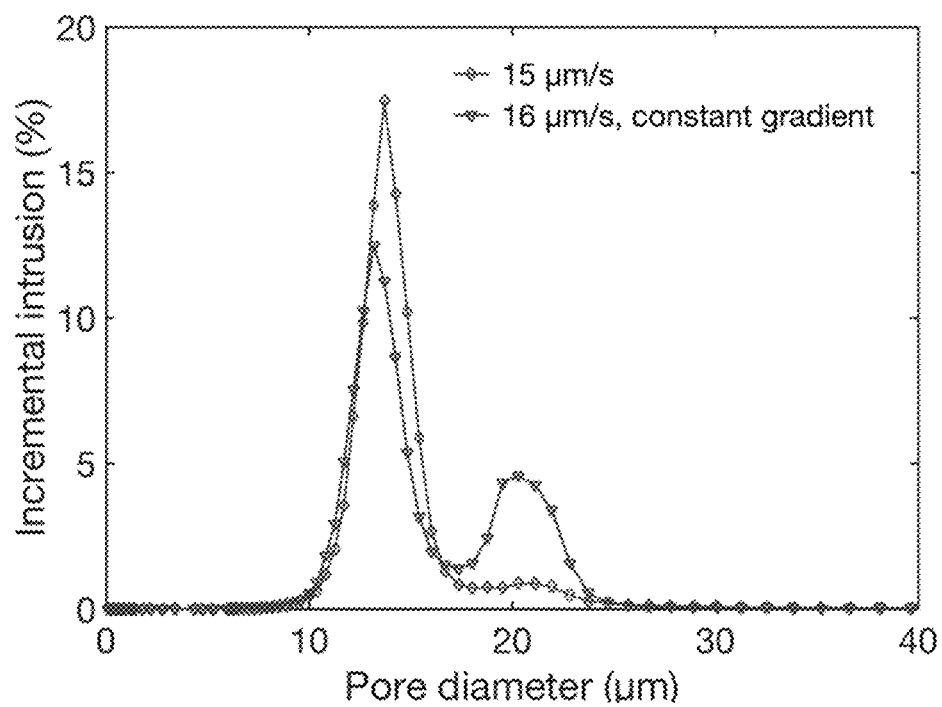
FIG. 2. Pore size distributions based upon mercury intrusion porosimetry data for membranes fabricated with constant freezing front velocity, and with constant freezing front velocity and temperature gradient.
Figure 24:
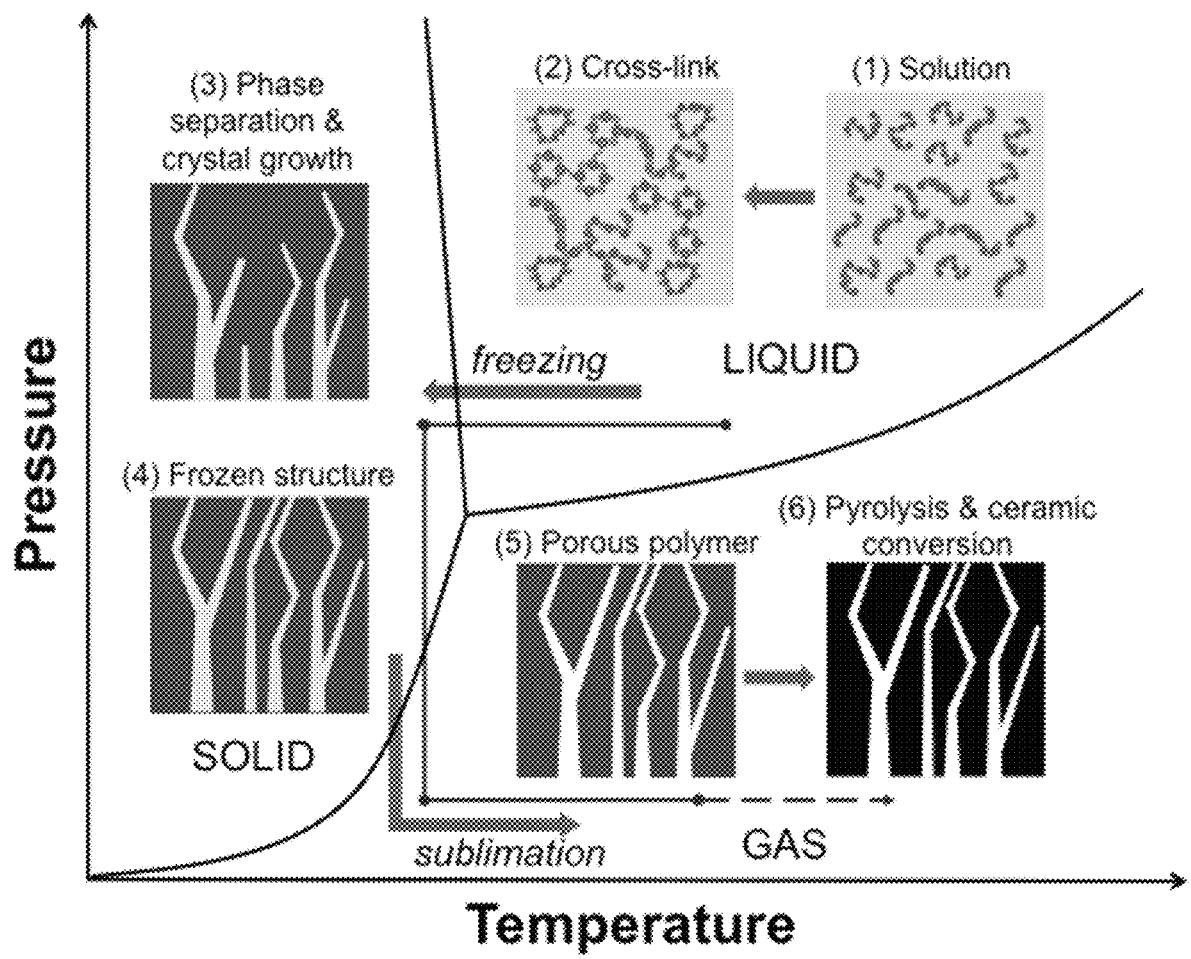
FIG. 24. A pressure vs. temperature phase diagram showing freeze-casting process using preceramic polymers.

A preceramic polymer solution is prepared by dissolving a commercially available polymethylsiloxane in cyclohexane. The resulting solution is then directionally frozen while keeping the freezing front velocity and temperature gradient approximately constant. The frozen samples are then sublimated in a freeze drier to completely remove the solvent leaving a dendritic polymethylsiloxane membrane. This membrane is then pyrolyzed and converted into SiOC (FIG. 24). FIG. 1 is an SEM image of a freeze-cast membrane depicting the dendritic nature of the main channels and side cavities. The efficacy of controlling temperature gradient is demonstrated in FIG. 2 by the pore size distribution measured by mercury intrusion porosimetry. The peaks at ~20 μm and ~13 μm correspond to the primary pores and secondary arms, respectively. Assuming that main primary pores and secondary pores are cylindrical in shape, the decrease in incremental intrusion peak, and consequently porosity fraction, at ~13 μm for a membrane prepared with temperature gradient control indicates a decrease in side cavity length. However, the means of the primary and secondary arm pore distributions for both conditions remain nearly constant. Hence, the methods disclosed herein are capable of modifying the side cavity length without changing the primary pore and secondary pore diameters by controlling the freezing front velocity and the temperature gradient.

One protocol for functionalizing the SiOC membrane with polyethylene glycol (PEG) is provided here. This description is meant purely as an example formulation and is not meant to restrict the scope of the invention. The invention is to encompass any number of SiOC membrane surface functionalizations necessary to capture particles from complex solutions.

Since SiOC has silica nanodomains encased with free carbon [6], the SiOC membrane is first treated with NaOH to activate the top layer of the silica nanodomain and develop surface silanol groups. The membrane is next treated with HCl to neutralize remaining hydroxyl groups and then rinsed with water. The membrane is then treated with 3(aminopropyl) trimethoxysilane resulting in an aminosilane layer with available amines. The amines are then functionalized with polyethylene glycol diacrylate. The functionalized membrane is then washed with solvent to remove unreacted reactants.

Alternative functionalities can be achieved through the use of N,N-carbonyldiimidazole (CDI) to further functionalize the amines from the aminosilane layer above. Once CDI has reacted with available amines, a solution of Chitosan in water at pH 5 may be added to the membrane. Once the reaction between the CDI intermediate and chitosan has been completed, the unreacted molecules may be removed through washing with water at a pH of 3-5. This provides a surface bound molecule which will interact electrostatically with charged molecules/particulates within a fluid flowing through the membrane. It may be easily seen that instead of the addition of Chitosan, any number of amino acids can be added to the membrane using this reaction scheme to allow for further functionality. (Side reactions in Peptide synthesis, Ch. 5—Side reactions upon amino acid/peptide carboxyl activation, Yi Yang, 2016).

Another optional functionalization scheme is the addition of catalytically active Pt/Pd nanoparticles. The nanoparticles may be prepared using the method described by Mandal et al. [Chem. Mater. 2004, 16, 19]. In a typical experiment, 100 mL of a 10-4 M concentrated aqueous solution each of chloroplatinic acid (H2PtCl6) and palladium nitrate were reduced separately by 0.01 g of sodium borohydride (NaBH4) at room temperature to yield a blackish-brown colored solution, which indicates the formation of Pt and Pd nanoparticles. Once the nanoparticles are formed, they can be immobilized to the membrane surface via interactions with amines (prepared using the method described above).

To use the membrane in a separation process there are several variables which must be identified: process time, particle size, particle surface functionality, and capture efficiency. Depending on the variables identified, the operator has the following parameters which they may tune: flow rate, flow type, membrane morphology, and membrane surface functionality. As described above, the flow profile depends on the operating flow rate in addition to the membrane morphology. The flow profile may be used to determine the residence time of the complex solution in the membrane which provides the maximum time the particle of interest has to diffuse into a side pore. The directionality of flow (dead-end or cross-flow) across the membrane influences the clogging of the membrane and the number of passes necessary to obtain a high capture efficiency. Membrane surface functionality provides reduction of nonspecific binding of miscellaneous particles in the solution, in addition to improved capture and retention of the desired particles. Exemplary procedures and results probing the relationship between these parameters is presented below.

Figure 3:
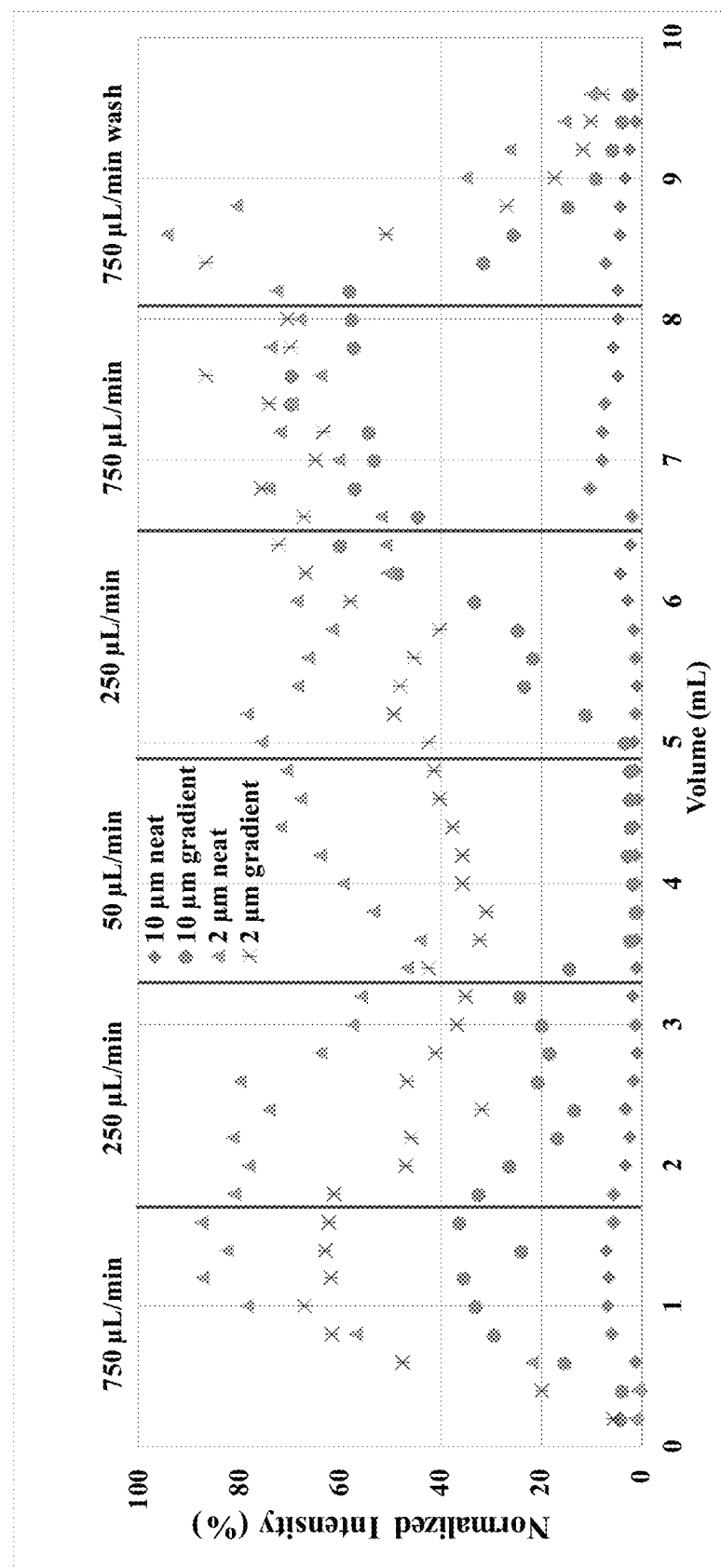
FIG. 3. Particle "filtration" measurements for membranes with and without thermal gradient control. Normalized intensity is equivalent to the percentage of particles which passed through the membrane.

The separation characteristics of several membranes are probed using a simple suspension composed of 10 μm and 2 μm particles suspended in water glycerol. Relationships between operating conditions and particle separation is studied by analyzing the number density of the specified particles in the "filtrate" solution. FIG. 3 presents the comparison of particle "filtration" using two different membrane morphologies. As depicted, the larger number of main channel pores in a membrane prepared with temperature gradient control (indicated by the larger peak at 20 μm in FIG. 2) leads to an increase in the permeation of 10 μm particles in comparison to a membrane prepared without temperature gradient control.

The flow profile, and therefore the particle separation, in the membrane may also be controlled by manipulating the operating flow rate. Considering a membrane prepared without temperature gradient control, it may be seen that by varying the flow rate from 750 μl/min to 50 μL/min the penetration of 2-micron particles is reduced by 25% (FIG. 3). Further reduction may be obtained by optimizing the flow rate and making modifications to the membrane morphology. In addition, the flow profile may be altered by manipulating the functionalization of the membrane surface. As demonstrated in FIG. 4, functionalizing the membrane surface with PEG—as described above—drastically increases the penetration of 10-micron particles while having no distinguishable effect on 2-micron particles. The relationships between membrane morphology, flow rate, particle retention, and surface modification will provide critical guidance in choosing the appropriate membrane microstructure and functionalization for a given separation process.

References Corresponding to Example 1

[1] Faridi, M. A.; Ramachandraiah, H.; Banerjee, I.; Ardabili, S.; Zelenin, S.; Russom, A. Elasto-Inertial Microfluidics for Bacteria Separation from Whole Blood for Sepsis Diagnostics. *J. Nanobiotechnology* 2017, 15 (1), 3.
[2] Hur, S. C.; Mach, A. J.; Di Carlo, D. High-Throughput Size-Based Rare Cell Enrichment Using Microscale Vortices. *Biomicrofluidics* 2011, 5 (2), 1-10.
[3] Naviroj, M.; Voorhees, P. W.; Faber, K. T. Suspension- and Solution-Based Freeze Casting for Porous Ceramics. *J. Mater. Res.* 2017, 32 (17), 3372-3382.
[4] Naviroj, M. Silicon-based Porous Ceramics via Freeze Casting of Preceramic Polymers, Ph.D. Dissertation, Northwestern University, 2017.
[5] O'Brien, V. Closed Streamlines Associated with Channel Flow over a *Cavity. Phys. Fluids* 1972, 15 (12), 2089-2097.
[6] Saha, A.; Raj, R.; Williamson, D. L. A Model for the Nanodomains in Polymer-Derived SiCO. *J. Am. Ceram. Soc.* 2006, 89 (7), 2188-2195.

Example 2: Robust Cellular Shape-Memory Ceramics Via Gradient-Controlled Freeze Casting Shape-memory ceramics offer promise for applications like actuation and energy damping, due to their unique properties of high specific strength, high ductility, and inertness in harsh environments. To date, shape-memory behavior in ceramics is limited to micro/submicro-scale pillars and particles to circumvent the longstanding problem of transformation-induced fracture which occurs readily in bulk polycrystalline specimens. The challenge, therefore, lies in the realization of shape-memory properties in bulk ceramics, which requires careful design of three-dimensional structures that locally mimic pillar structures. In this work, it is demonstrated that with a gradient-controlled freeze-casting approach, honeycomb-like cellular structures can be fabricated with thin and directionally aligned walls to facilitate martensitic transformation under compression without fracture. With this approach, robust bulk shape-memory ceramics have been demonstrated in a highly porous structure under compressive stresses of 25 MPa and strains up to 7.5%.

The shape-memory effect as derived from the reversible martensitic transformation in zirconia-based ceramics[1-3] has recently been reported in micro/submicro-scale pillars and particles,[4] characterized by their unique pseudo-elastic behavior with significant deformation and full recovery.[5] Despite their promising potential in applications like actuation and energy damping,[6] shape-memory properties are found to be limited to small volumes to accommodate mismatch stresses along grain boundaries.[7] The corresponding bulk ceramics suffer from premature fracture prior to significant shape deformation.[8] Though the microscale dimensions are convenient for elucidating the fundamentals of material behavior,[9] the challenge remains to transfer such shape-memory properties into desirable three-dimensional bulk forms for practical applications. Addressing this challenge, therefore, involves the design of a suitable bulk structure that locally mimics the characteristic features of oligocrystalline pillars and the development of appropriate fabrication approaches to realize such structures. One approach involving scale-up of particles in a granular form, where each particle acts as a transformation site, has proven effective in demonstrating high energy damping capacity at a pseudo-bulk scale.[10] Alternatively, a one-piece porous foam with thin oligocrystalline walls has been reported, showing that a significant volume fraction of the porous material (>60%) could experience martensitic transformations under an applied stress.[11] These studies motivate the concept that a high specific surface area with oligocrystalline features accommodates stress during martensitic transformation of grains and the associated large deformation in a bulk-form structure.[12] However, the full potential in shape-memory ceramics is characterized by their unique properties of large recoverable strain at high mechanical stress, which are not present in the aforementioned investigations. We propose that its realization relies on a desirable three-dimensional geometry with the following properties: 1) a homogeneous feature size comparable to microscale pillars for transformation events to occur uniformly in the structure;[13] 2) a particular cellular configuration that can resolve the applied uniaxial force into uniform compressive stress to trigger the martensitic transformation without introducing tensile or bending stress;[14] and 3) sufficient strength to survive a large compressive transformation stress before reaching the fracture stress.[9]

Figure 5A:
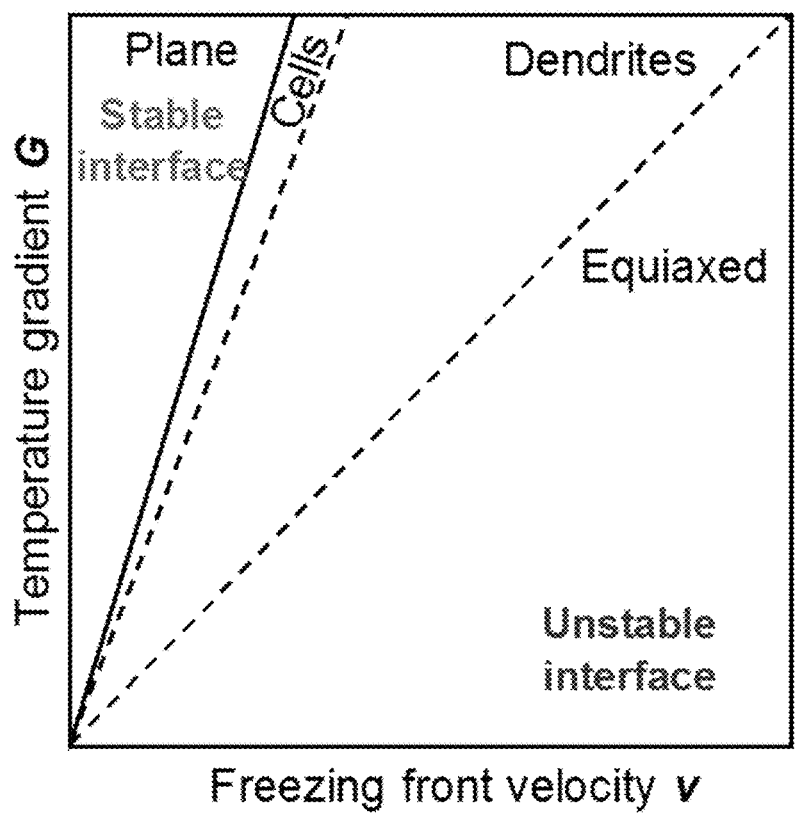
FIG. 5A. Pore-structure stability map based on constitutional supercooling of solid-liquid interface controlled by freezing front velocity and temperature gradient (modified based on Rettenmayr et al., reference 27 in Example 2). Schematic illustration of (FIG. 5B) dendrites and (FIG. 5C) cells of a suspension-based freeze casting at different conditions.
Figure 5B:
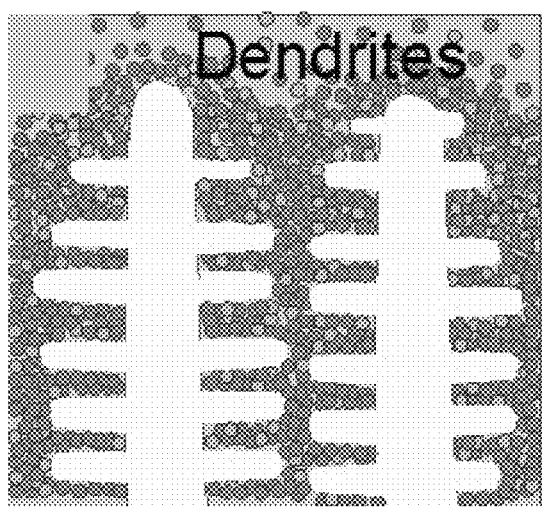
FIG. 5D. The proposed shape-memory effect in a unidirectional cellular structure during uniaxial compression and heat treatment. The red highlights represent transformed grains within the cellular walls.
FIG. 5E. Pore-structure stability map based on measured freezing front velocity and temperature gradient of cyclohexane, with the corresponding longitudinal microstructures (taken along freezing direction) of freeze-cast zirconia-based ceramics inserted.
Figure 5C:
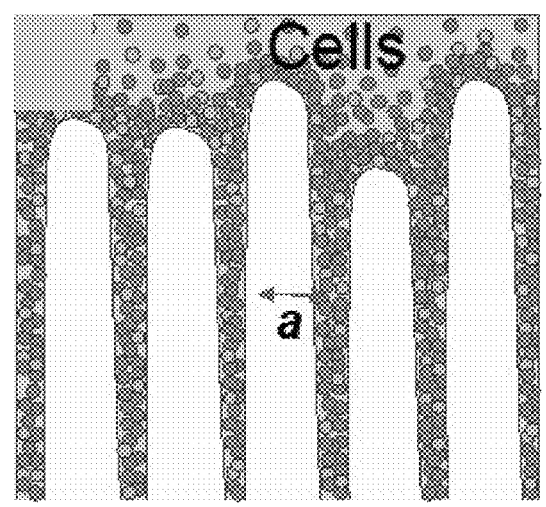
Figure 5D:
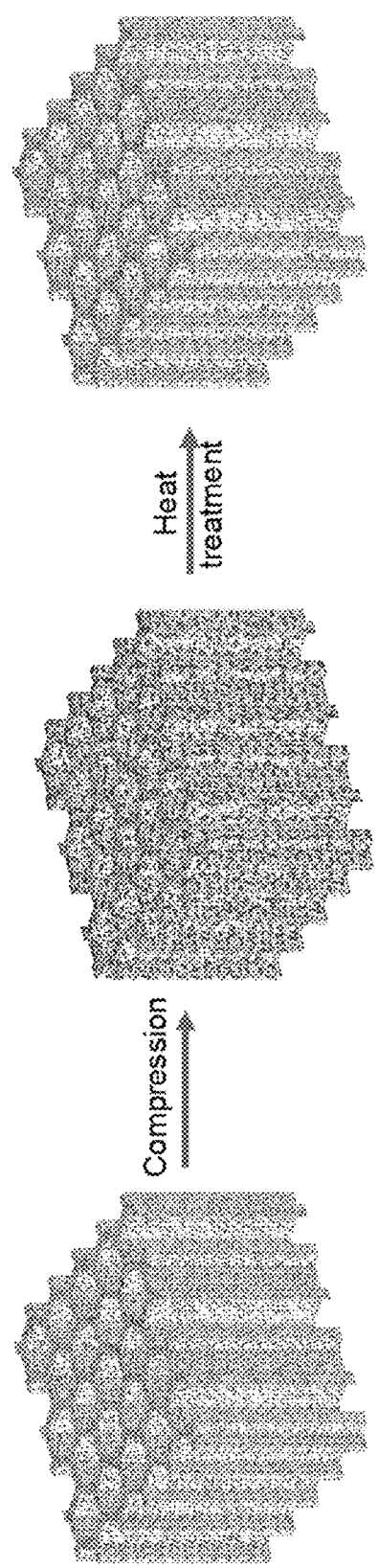

The approach disclosed in this Example is to develop zirconia-based ceramics with a directionally aligned honeycomb-like cellular porous structure, afforded by the structural tunability offered by gradient-controlled freeze casting. Freeze casting makes use of solidified solvent crystals as sacrificial templates; a highly porous structure is created after the sublimation of the solvent. [15-19] The crystal microstructure formed during solidification is controlled by constitutional supercooling which is determined by interfacial instability due to the breakdown of planar growth fronts.[20] Experimentally, the microstructure is tunable by freezing front velocity and temperature gradient, as shown in FIG. 5A. Dendritic structures of tree-like (FIG. 5B) or lamellar-like usually form and represent a fully evolved end-state of an unstable interface.[21] Cell structures (FIG. 5C), however, represent a less perturbed interface having smooth directional features without secondary dendrite arms. The cell structure can be considered an intermediate structure between the stable planar front and the dendrites.[22,23] Thus, cell structures span a narrow region on the pore-structure stability map (FIG. 5A) and can only be achieved with very limited conditions of low freezing front velocity and high temperature gradient.[21] Therefore, the conventional single-sided freeze casting which only affords control of the freezing front velocity that results in dendritic grain growth is not sufficient.[24,25] Instead, gradient-controlled freeze casting with temperature controls on both ends of the suspension offers additional control of temperature gradient.[26] Such a casting configuration affords precise control of both freezing front velocity and temperature gradient so as to move to the cellular region of the pore-structure stability map and achieve cellular structures (FIG. 5A). As a result, a particular freeze-casting condition can be established in which a homogeneous unidirectional cellular morphology can be created (FIG. 5D). The unidirectional cellular structure in principle would have high strength in the out-of-plane direction[14] for the material to be mechanically deformed to reach phase transformation stress prior to fracture. The thin cellular walls would mimic the features of oligocrystalline pillars, offering a feasible approach for exhibiting the shape-memory effect in a bulk structure. During mechanical compression, grains with suitable crystal orientations can experience the martensitic transformation that leads to large deformation, whereas those non-transformed grains serve as the framework to provide sufficient mechanical strength for structural integrity. With such a design, shape recovery can be achieved through subsequent heat treatment to trigger the reverse martensitic transformation to demonstrate a full cycle of shape-memory effect.

Figure 5E:
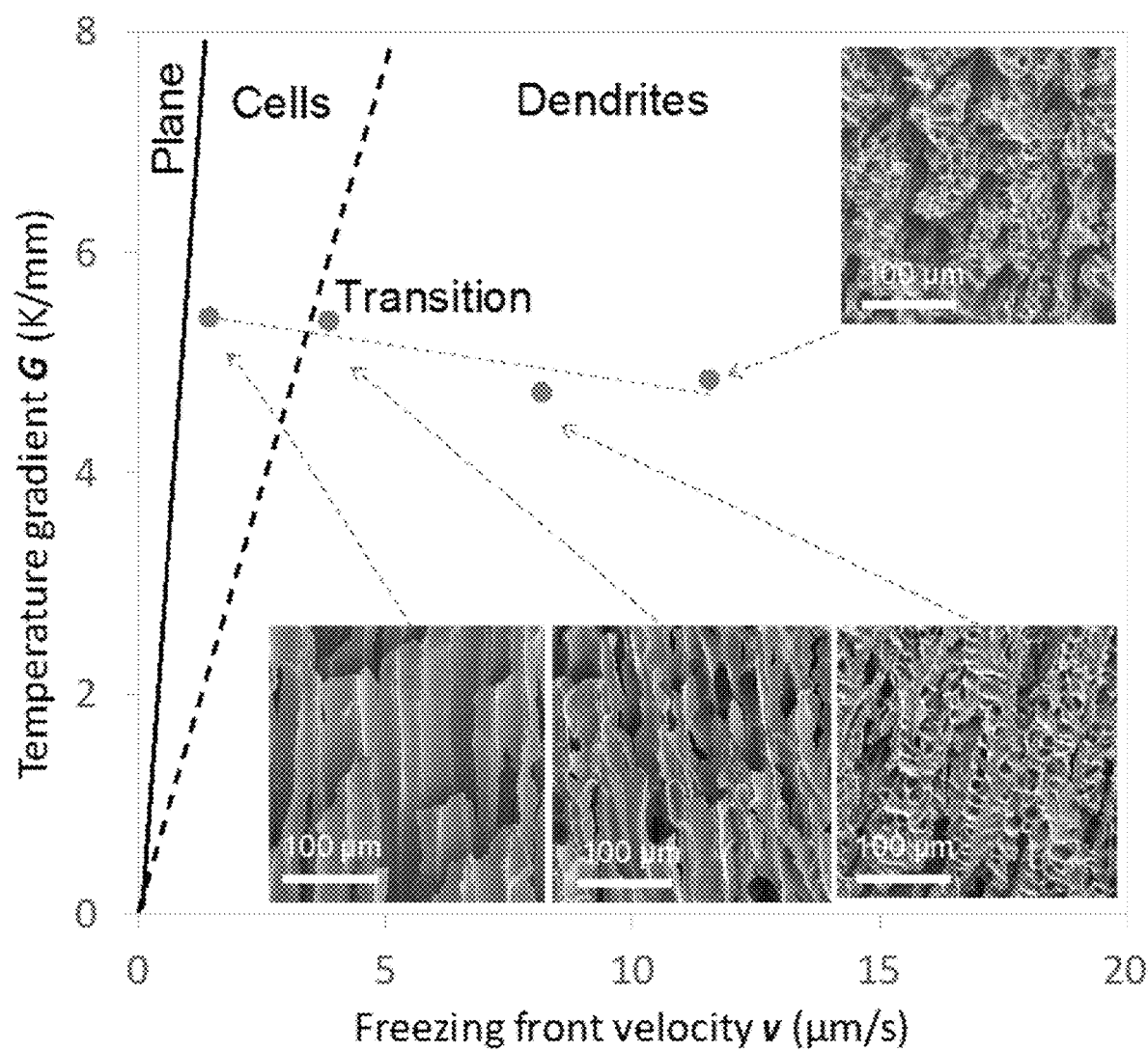

In the method we propose, a powder mixture having a composition of 12.5 mol % $CeO_2$-87.5 mol % $ZrO_2$ was used to obtain the tetragonal phase in ceria-doped zirconia (refer to the supplementary document for details). The composition was deliberately selected to control the characteristic transformation temperature, at which the thermally induced tetragonal/monoclinic phase transformation occurs, to be in the vicinity of room temperature.[6,28] Therefore, the material should exhibit the shape-memory effect: the forward transformation of tetragonal→monoclinic phase during uniaxial compression at room temperature and the reverse monoclinic→tetragonal phase transformation during subsequent heat treatment, providing insight into phase changes over the appropriate stress-temperature phase space.[29] Among various suspension media used in freeze casting,[24,30] cyclohexane was chosen in this study to produce dendritic/cellular pore structures. Four freezing conditions of cyclohexane were studied (FIG. 5E). The freezing front velocity (v) and temperature gradient (G) were controlled through thermoelectric plates at the base and at the top of the solution; v and G were determined based on a reference solution using a camera with an intervalometer (refer to FIGS. 9A-9D for details). Velocity, v varied from 1.4 μm/s to 11.6 μm/s, whereas the G over the sample height was controlled to be relatively constant at around 5 K/mm for all freezing front velocities. The chosen conditions allow one to horizontally shift the locus on the pore-structure stability map between dendritic and cellular regions, which is supported by the obtained microstructure corresponding to each condition. The secondary arms of the dendrites (at v of 11.6 and 8.2 μm/s) become shorter at a lower v of 3.9 μm/s to form a transitional structure with wavy surface cellular walls. At a low v of 1.4 μm/s, a cellular structure with well aligned straight walls and no secondary arms is developed. As ceramics are much stronger under compression than under tension or bending,[6] the cellular structure is considered critical to effectively constrain the resolved applied force to be mainly compressive on the walls, instead of the complex stress field expected in a dendritic structure which can easily lead to local fracture.

Figure 6A:
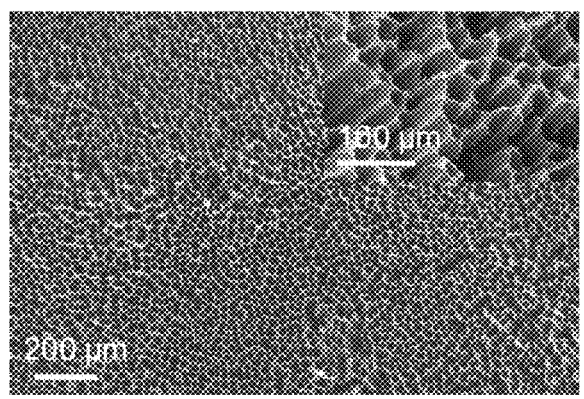
FIGS. 6A-6E. Microstructure of freeze-cast cellular zirconia-based ceramics viewed from (FIG. 6A) the transverse (the inset image shows an off-axis view of pores) (FIG. 6B) and the longitudinal directions. Oligocrystalline cellular walls from (FIG. 6C) the transverse and (FIG. 6D) the longitudinal directions.
Figure 6B:
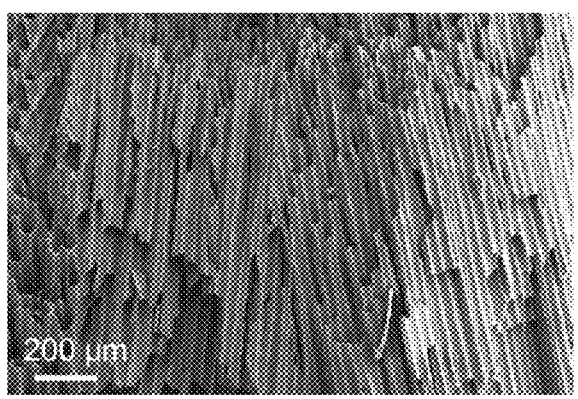
Figure 6C:
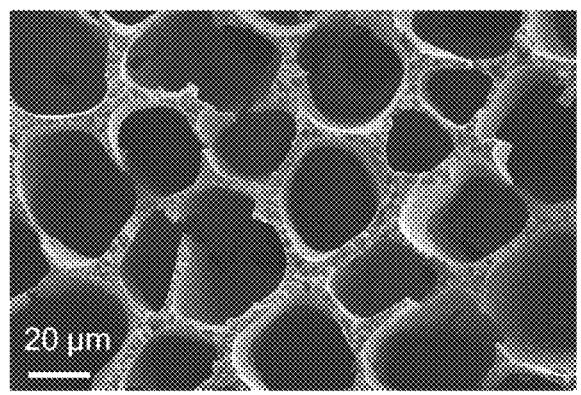
Figure 6D:
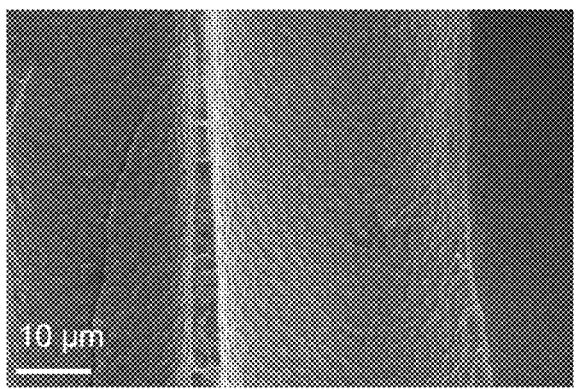
Figure 6E:
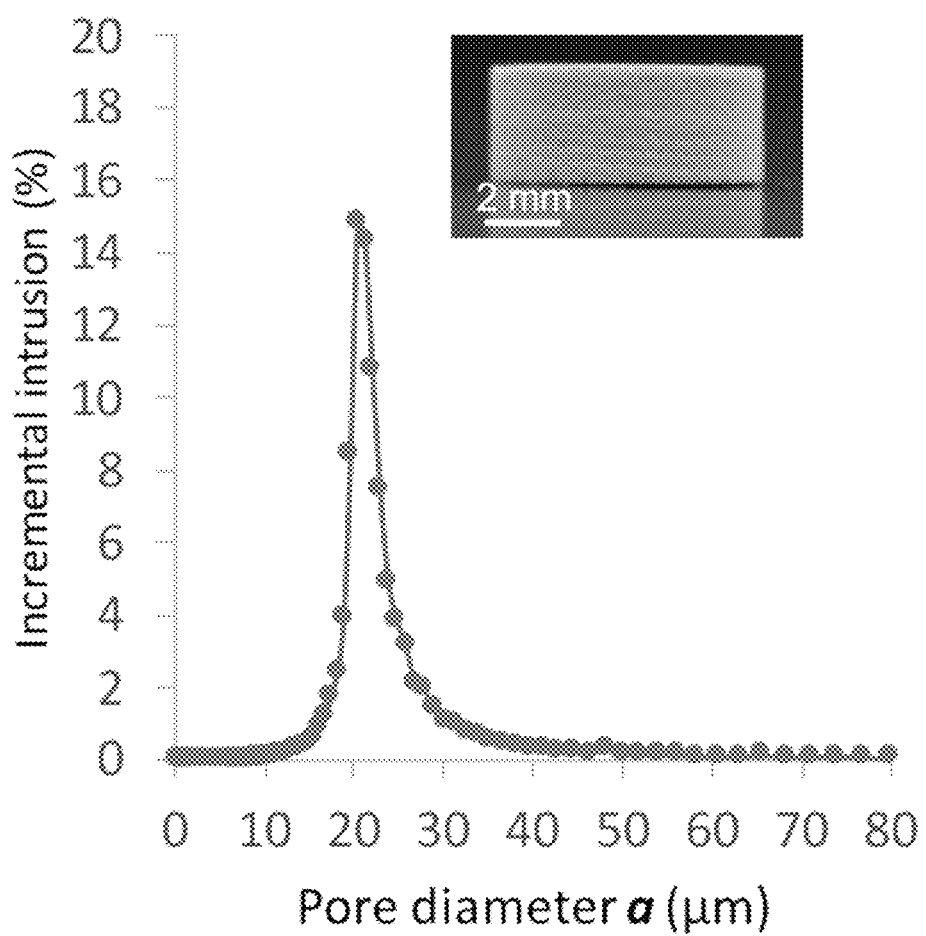

The cellular structure obtained with the lowest freezing front velocity is homogeneous throughout the sample with a height of 3 mm and porosity of 70% (FIGS. 6A-6B). The structure is honeycomb-like with an array of pores formed between thin vertical walls that align along the freezing direction. The average grain size is ~2 μm while the wall thickness is 2-4 μm, indicating that the walls are largely oligocrystalline with only one or two grains in the thickness direction (FIGS. 6C-6D), thereby successfully mimicking the oligocrystalline pillar structures. The pore size measured with mercury intrusion porosimetry shows a narrow unimodal distribution around 20.3 μm (FIG. 6E).

The mechanical response of the porous ceramics with various microstructures was studied by applying a uniaxial compressive force along the longitudinal direction; a second set of mechanical tests was accompanied by a phase content study with X-ray diffraction (XRD) between stress increments. Under monotonic loading to 25 MPa (FIG. 7A), linear elastic behavior was observed for all samples up to 20 MPa. The major difference lies in their behavior above 20 MPa, where cellular structures experience a marked decrease in slope, reaching a maximum strain of 7.5% at 25 MPa. Upon unloading, a residual strain of 3.9% persists, a magnitude comparable to shape-memory pillars.[7,9] The dendritic and transitional structures both exhibit a much smaller deformations with residual strains of less than 0.4%. The significant variation of stress-strain behavior in cellular, transitional and dendritic structures supports the hypothesis that only with a precisely designed three-dimensional cellular structure can the shape-memory effect be observed in bulk form.

Figure 7A:
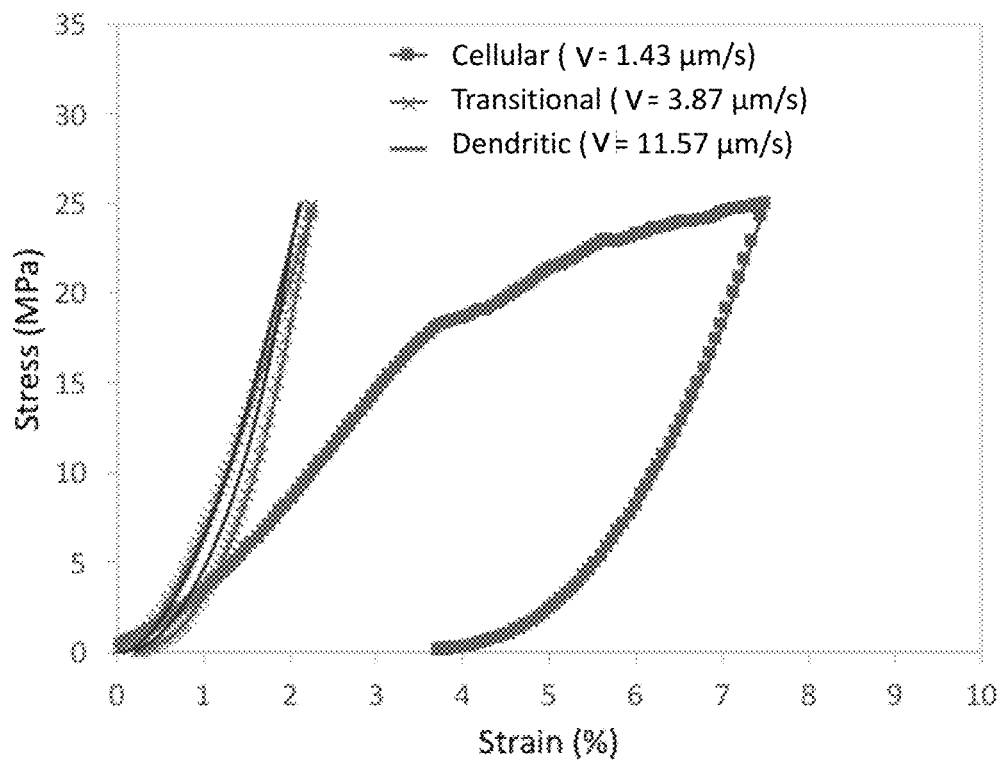
FIG. 7A. Stress-strain behavior of the cellular structure (v=1.4 µm/s), transitional structure (v=3.9 µm/s) and dendritic structure (v=11.6 µm/s) under a compressive stress of 25 MPa.
Figure 7B:
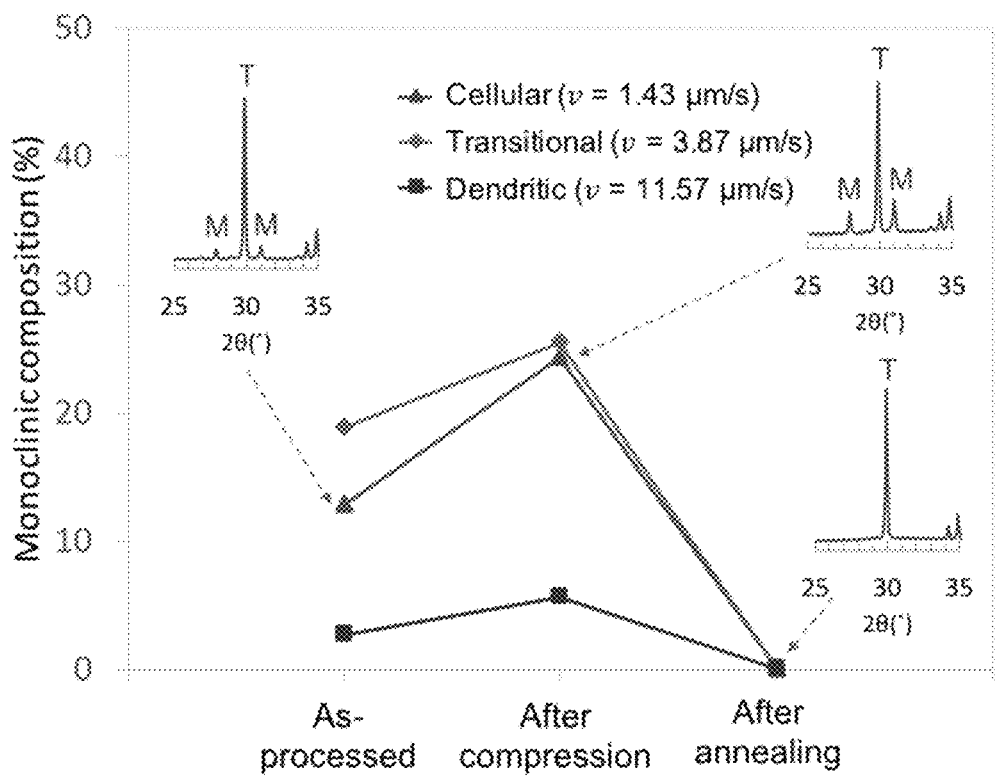
FIG. 7B. The evolution of phase content on compression and after heat treatment, with inserted X-ray diffraction patterns of cellular structure corresponding to each condition.
Figure 46A:
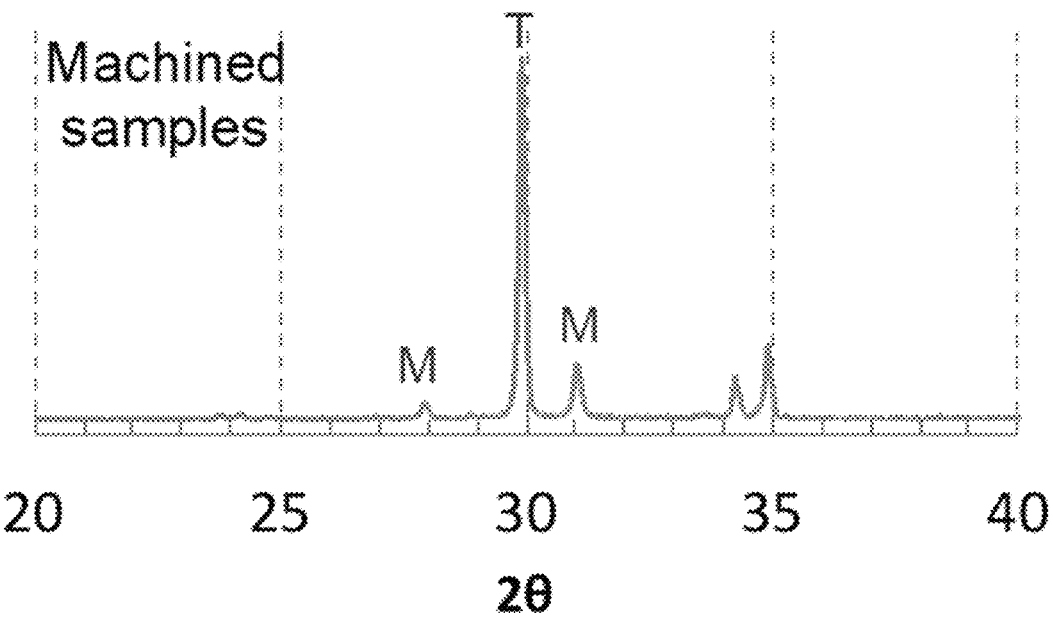
FIGS. 46A-46B. XRD spectrum of a sample, such as a material of Example 2, (FIG. 46A) after machining, and (FIG. 46B) after annealing without experiencing mechanical compression.

The phase composition was calculated based on the intensity ratio of X-ray diffraction peaks: $(11\bar{1})_m$, $(111)_t$ and $(111)_m$ between 27 to 32°.[9] All samples were composed of 2.7-18.9% monoclinic phase before compression (FIG. 7B). The monoclinic phase in the as-processed samples was introduced during the machining process to obtain a disk-like shape for compression tests. (Refer to FIGS. 46A-B where an annealed sample after machining was determined by XRD to have no monoclinic phase content.) Cellular structures experienced a significant tetragonal→monoclinic phase change of 11.5% during compression, whereas the transitional and dendritic structures experienced only 6.6 and 3.0% transformation, respectively. All samples remained intact after the compressive tests without any noticeable macroscale cracks. The typical abrupt stress drop in a brittle honeycomb structure that signifies the beginning of brittle fracture of cell walls[14] was not observed in any cellular structures. No further mechanical tests were conducted on cellular structures since the as-compressed samples were composed of 24.3% monoclinic phase, which we consider to be significant enough for shape deformation while ~75% of the parent tetragonal phase would provide sufficient mechanical support to preclude fracture. All compressed samples were annealed at 700° C. for 2 hours, after which only the tetragonal phase was observed, suggesting a complete reverse phase transformation during heat treatment. To confirm the thermal-induced shape recovery in the cellular structure, the dimensions of a second identically processed sample were recorded before compression, after compression to a maximum strain of 6.4%, and after heat treatment. The compression test was halted as soon a drop in load was detected, which suggested the onset of structural failure. Hence, we expected only partial strain recovery from heat treatment, measured here to be 43-44%. (Refer to the FIG. 47 for details.) The large residual strain on loading above 20 MPa, the XRD evidence of the stress-induced phase transformation, and the fully reversible phase transformation on heating indicate that the cellular structures exhibited the shape-memory effect.

Figure 7C:
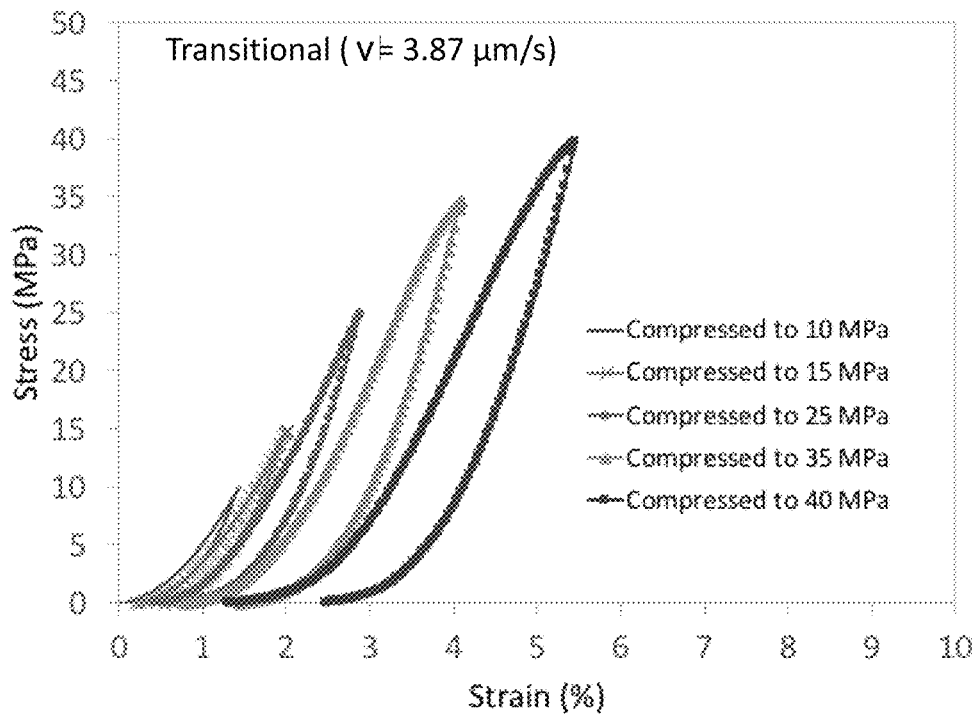
FIG. 7C. Stress-strain curves of the transitional structure tested consecutively at stresses from 10 to 40 MPa.
Figure 7D:
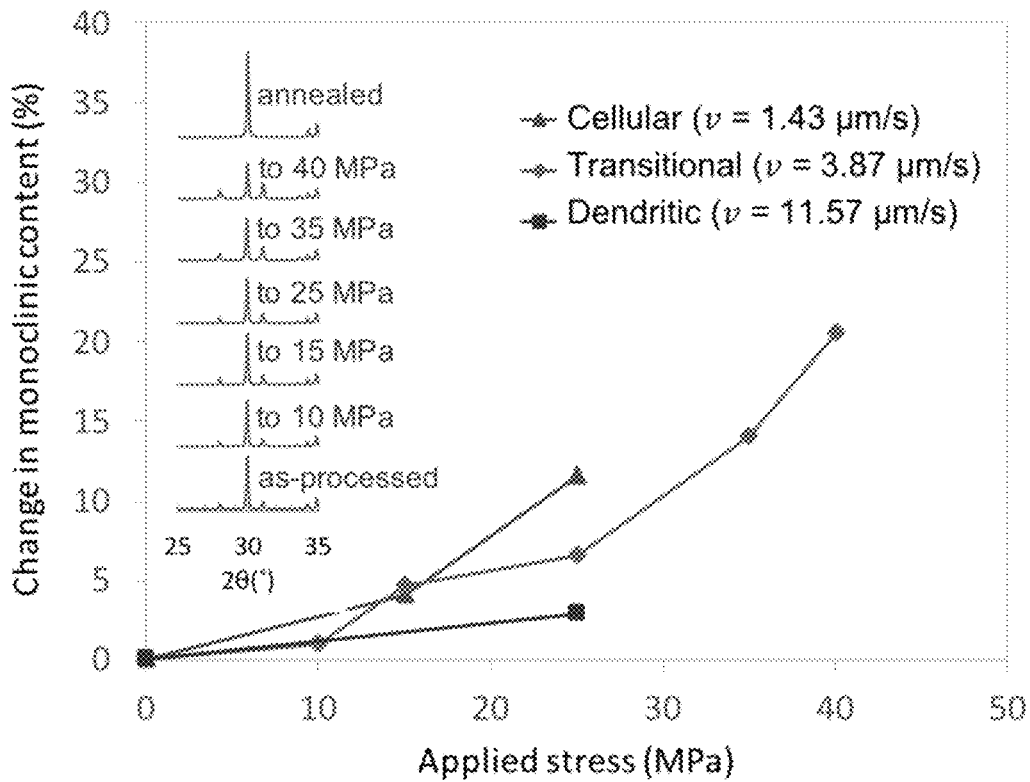
FIG. 7D. The change in the monoclinic content of all samples after compression as a function of applied stress, with inserted X-ray diffraction patterns of transitional structure in between each compression test.

The critical stress of martensitic transformation of grains is highly orientation-dependent, varying between 100 MPa and 2 GPa.[13] Therefore, the random distribution of grain orientations in these cellular structures leads to a continual tetragonal→monoclinic transformation at different stress levels and a marked decrease in slope, instead of a single flat plateau in strain, as observed in single crystal pillars[9] or step-wise plateau, as in oligocrystalline pillars.[4] According to Gibson and Ashby,[14] for perfect cellular structures, walls are effectively compressed when a compressive stress is applied, whereas more poorly aligned structures like foams experience a complex stress field under compression. For the dendritic structure, a complex stress field involving compression, tension and bending is expected, and therefore limits the material fraction that participates in phase transformation through compressive deformation. In the transitional structure, the walls are well aligned but with high surface waviness, leading to an inhomogeneous compressive stress distribution across the walls. Consequently, a smaller fraction of grains is able to reach the critical transformation stress, resulting in a negligible change in slope (FIG. 7A, v=3.9 μm/s). This limited nonlinearity is reminiscent of the stress-strain behavior of granular shape-memory powders,[10] where the transformation is limited by the non-uniform stress distribution. The extent of this effect is further evaluated by applying ascending stresses from 10 to 40 MPa to the transitional structure (FIG. 7C). The transitional structure survived a maximum stress of 40 MPa without any macroscale fracture, providing latitude for a significant volume of the ceramics to experience transformation prior to fracture. The stress-strain curves are plotted with the residual strain of each test accounted for; the total residual strain of 2.5% lies between that of cellular and dendritic structures. The change in monoclinic content in between each compression test was plotted in FIG. 7D, together with those of cellular and dendritic structures. The slope of the change in monoclinic content against applied stress, an indication of the effectiveness in triggering the transformation through compression, increases from dendritic to transitional to cellular structures. The general trend of the increasing slope with applied stress is due to a non-linear distribution of transformation stress over random crystal orientations.[9] The high correlation between the change in monoclinic content and residual strain further supports the idea that a homogeneous compressive stress in the walls is most desirable for inducing shape-memory effect in ceramics. The difference in monoclinic phase introduced during the machining process in the as-processed samples also qualitatively suggests the variation in difficulty in triggering the deformation through shear cutting.

In summary, with a precisely designed honeycomb-like cellular structure, the single- and oligo-crystalline martensitic transformation has been successfully extended to bulk-scale deformation to achieve the shape-memory effect in a three-dimensional geometry. With independent control of freezing front velocity and temperature gradient through gradient-controlled freeze casting, the cast microstructure can be fine-tuned into the desired cellular structure with feature sizes similar to that of shape-memory ceramic micropillars. The resultant cellular structure can experience a significant recoverable deformation of up to 7.5% under compression at a stress of 25 MPa.

Figure 9A:
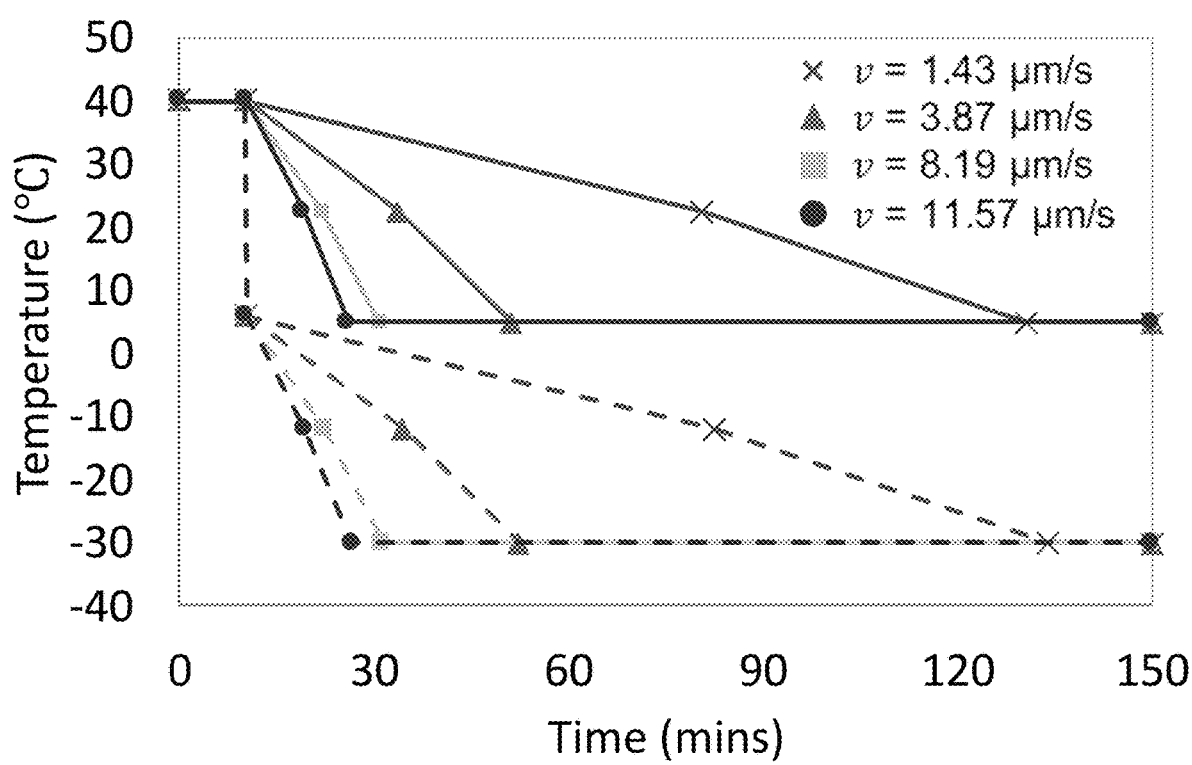
FIG. 9A. Four temperature profiles used to control the freezing front velocity and temperature gradient.
Figure 9C:
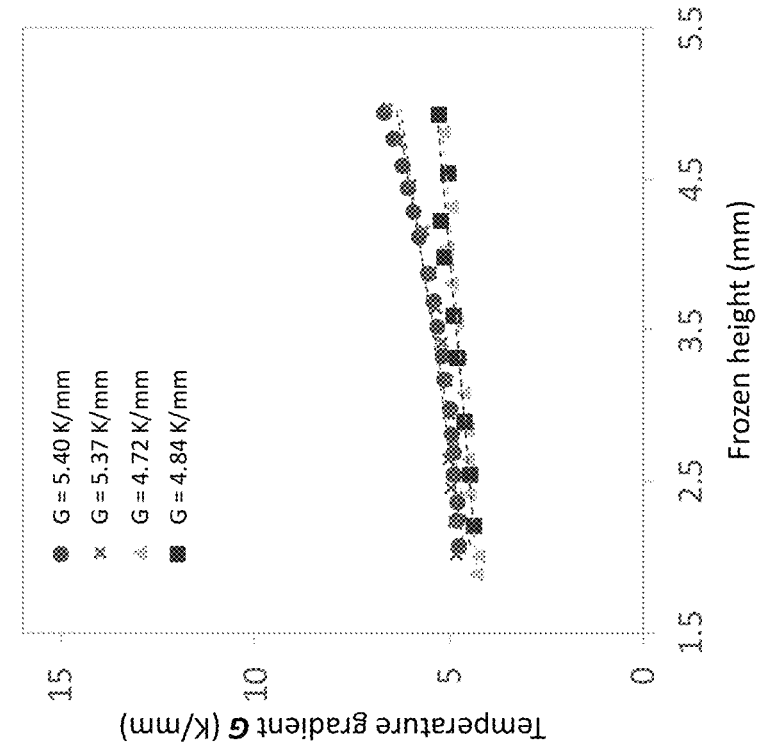
FIG. 9B. Averaged freezing front velocity and (FIG. 9C) averaged temperature gradient of cyclohexane throughout freezing as measured with camera.
Figure 9B:
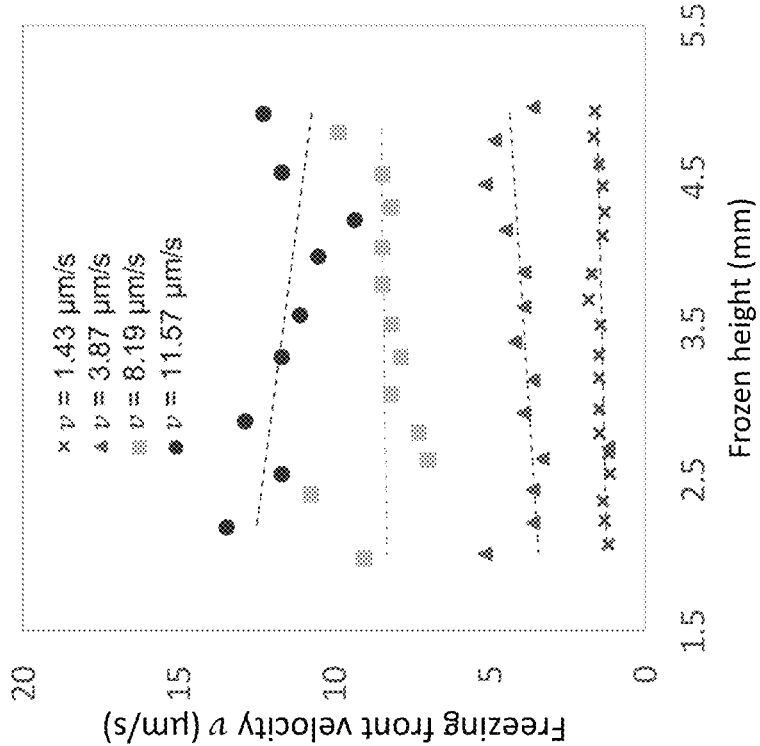
Figure 10:
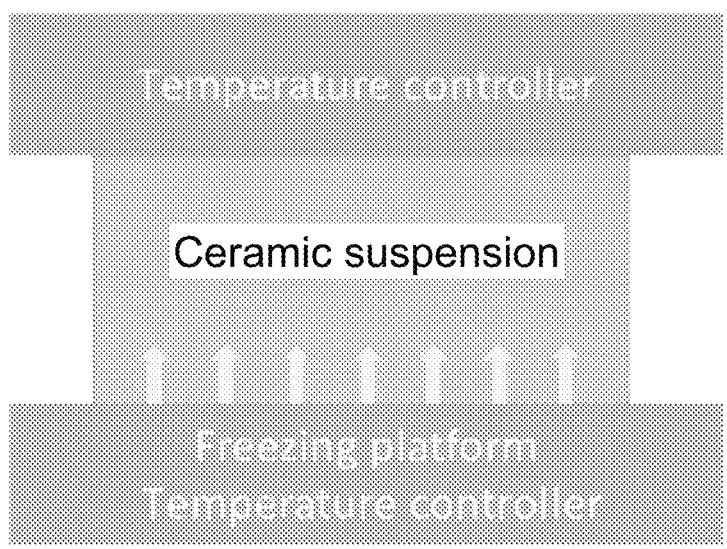
FIG. 10. Schematic of a gradient controlled freeze casting setup

Supporting Information: A ceramic powder suspension (i.e., liquid formulation with ceramic powder as dispersed species) was prepared by mixing 87.5 mol. % of zirconia ($ZrO_2$) nanopowders and 12.5 mol. % of ceria ($CeO_2$) nanopowders (99.9%, Inframat Advanced Materials) with cyclohexane (99.5%, Sigma-Aldrich) as the solvent of the liquid formulation, to achieve a 10 vol. % solids loading for a target porosity of 70%. A dispersant of Hypermer KD-4 (Croda Inc.) was added at a concentration of 7 wt. % of solid powders. The mixture was ball milled for 48 h with zirconia milling balls to achieve a homogenous suspension. The suspension (i.e., liquid formulation, or, dispersion) was freeze cast in a glass mold with an inner diameter of 24 mm and a height of 12.5 mm. The glass mold was placed between two thermoelectric devices with temperature profile controlled by PID-controllers (FIG. 9A). A parabolic cooling profile was employed to compensate for changes in sample height and thermal resistance (FIG. 9B). The freezing front velocity of pure cyclohexane solvent and dispersant with no ceramic powders (FIG. 9C) was measured with a camera. The freezing front, which is the interface between the liquid and solid phases, was captured with software Image J (National Institutes of Health) based on the color contrast of the two phases. The top and bottom sections of the sample were sectioned away due to the ambiguity in determining the freezing front. The frozen height of 1.5 mm to 4.5 mm was used as a reference for subsequent sample machining (3 mm sample height). The temperature gradient (FIG. 9D) was measured by dividing the temperature difference with the distance between the top thermoelectric device and the freezing front. The temperature at the freezing front was assumed to be 6° C., the melting point of cyclohexane. The constitutional supercooling effect from the dispersant is not taken into account when temperature gradient is calculated.

The frozen samples were placed in a freeze dryer (VirTis AdVantage 2.0; SP Scientific, Warminster, Pa., USA) at −20° C. and reduced pressure of 60 Pa for 48 h to fully sublimate cyclohexane. Finally, the samples were sintered in air at 1500° C. for 3 h at a ramping rate of 2° C./min, after holding at 550° C. for 2 h to burn out any residual organic compounds.

The microstructures were observed using a scanning electron microscope (SEM; Zeiss 1550VP, Carl Zeiss AG, Oberkochen, Germany). The pore size distribution was characterized using mercury intrusion porosimetry (MIP; Auto Pore IV, Micromeritics, Norcross, Ga., USA). The samples were uniaxially compressed along the longitudinal direction (parallel to the freezing direction) with universal testing machine (Instron 5982, 100 kN), with a displacement rate of 0.06 mm/min. An X-ray diffractometer (PANalytical X'Pert Pro, Cu Kα, I=40 mA, V=45 kV) was used to analyze the phase content before and after compression tests, with 2θ ranges between 25-35° and a scan rate of 1°/min.

Figure 46B:
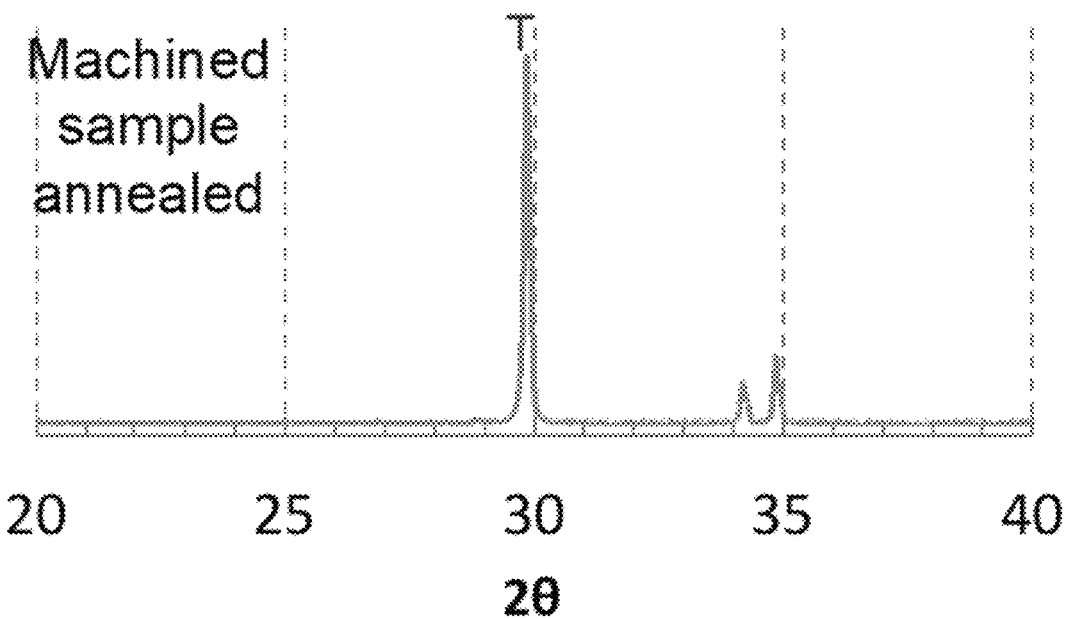
Figure 47B:
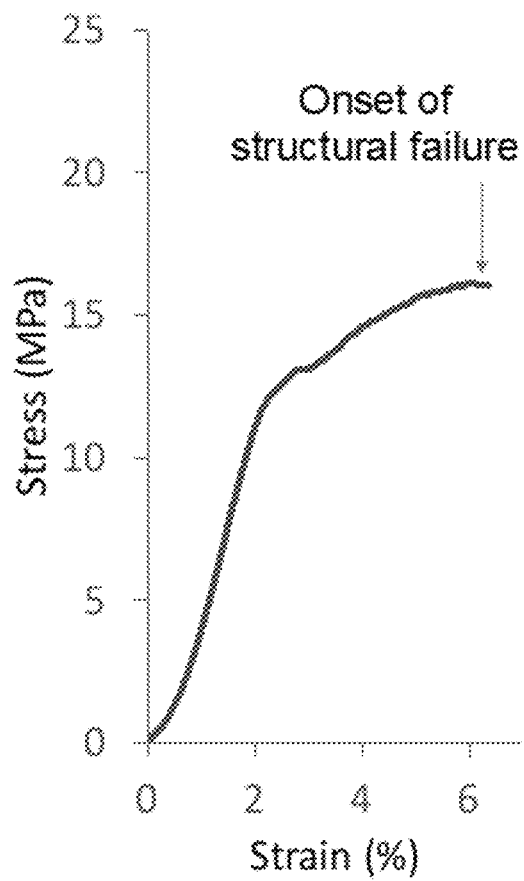

To confirm the effect of machining, XRD was conducted on one sample after machining (FIG. 46A), and again followed by annealing at 700° C. for 2 h (FIG. 46B). The monoclinic phase in the as-machined sample completely recovered to tetragonal phase during heat treatment. The dimensions of a sample with cellular structure (v=1.4 μm/s, G=5.4 K/mm) were measured with calipers (CD-6" ASX Absolute Digimatic Caliper, Mitutoyo) before compression, after compression, and after heat treatment (FIG. 47A), with the corresponding stress-strain curve shown in FIG. 47B. Compression testing was carried out until a stress-drop was detected, suggesting the onset of structural failure. During compression, the height was reduced, and diameter was increased, as expected; both were recovered by 43-44% during heat treatment, confirming shape recovery despite partial structural fracture.

References Corresponding to Example 2

[1] M. V. Swain, *Nature* 1986, 322, 234.
[2] P. E. Reyes-Morel, J.-S. Cherng, I.-W. Chen, *J. Am. Ceram. Soc.* 1988, 71, 648.
[3] J. Chevalier, L. Gremillard, A. V. Virkar, D. R. Clarke, *J. Am. Ceram. Soc.* 2009, 92, 1901.
[4] A. Lai, Z. Du, C. L. Gan, C. A. Schuh, *Science* 2013, 341, 1505.
[5] K. T. Faber, *Science* 2013, 341, 1464.
[6] X. Zeng, Z. Du, C. A. Schuh, C. L. Gan, *MRS Commun.* 2017, 7, 747.
[7] Z. Du, X. M. Zeng, Q. Liu, A. Lai, S. Amini, A. Miserez, C. A. Schuh, C. L. Gan, *Scr. Mater.* 2015, 101, 40.
[8] G. Subhash, S. Nemat-Nasser, *J. Am. Ceram. Soc.* 1993, 76, 153.
[9] X. M. Zeng, A. Lai, C. L. Gan, C. A. Schuh, *Acta Mater.* 2016, 116, 124.
[10] H. Z. Yu, M. Hassani-Gangaraj, Z. Du, C. L. Gan, C. A. Schuh, *Acta Mater.* 2017, 132, 455.
[11] X. Zhao, A. Lai, C. A. Schuh, *Scr. Mater.* 2017, 135, 50.
[12] X. M. Zeng, Z. Du, N. Tamura, Q. Liu, C. A. Schuh, C. L. Gan, *Acta Mater.* 2017, 134, 257.
[13] Z. Du, X. M. Zeng, Q. Liu, C. A. Schuh, C. L. Gan, *Acta Mater.* 2017, 123, 255.
[14] L. J. Gibson, M. F. Ashby, *Cellular Solids: Structure and Properties,* Cambridge University Press, 1999.
[15] S. Deville, *Adv. Eng. Mater.* 2008, 10, 155.
[16] N. Arai, K. T. Faber, *Scr. Mater.* 2019, 162, 72.
[17] K. Araki, J. W. Halloran, *J. Am. Ceram. Soc.* 2005, 88, 1108.
[18] H. Zhang, A. I. Cooper, *Adv. Mater.* 2007, 19, 1529.
[19] Q. Cheng, C. Huang, A. P. Tomsia, *Adv. Mater.* 2017, 29, 1703155.
[20] M. Rettenmayr, H. E. Exner, in *Encycl. Mater. Sci. Technol.* (Eds.: K. H. J. Buschow, R. W. Cahn, M. C. Flemings, B. Ilschner, E. J. Kramer, S. Mahajan, P. Veyssière), Elsevier, Oxford, 2001, pp. 2183-2189.
[21] M. E. Glicksman, *Principles of Solidification: An Introduction to Modern Casting and Crystal Growth Concepts,* Springer-Verlag, New York, 2011.
[22] M. Naviroj, Silicon-Based Porous Ceramics via Freeze-Casting Preceramic Polymers, Northwestern University, 2017.
[23] W. Kurz, D. J. Fisher, *Fundamentals of Solidification,* Trans Tech Publ, Aedermannsdorf, 1992.
[24] M. Naviroj, P. W. Voorhees, K. T. Faber, *J. Mater. Res.* 2017, 32, 3372.
[25] E.-J. Lee, Y.-H. Koh, B.-H. Yoon, H.-E. Kim, H.-W. Kim, *Mater. Lett.* 2007, 61, 2270.
[26] A. Preiss, B. Su, S. Collins, D. Simpson, *J. Eur. Ceram. Soc.* 2012, 32, 1575.
[27] M. Rettenmayr, H. E. Exner, *Ref. Module Mater. Sci. Mater. Eng.* 2016.
[28] Z. Du, P. Ye, X. M. Zeng, C. A. Schuh, N. Tamura, X. Zhou, C. L. Gan, *J. Am. Ceram. Soc.* 2017, 100, 4199.
[29] X. M. Zeng, Z. Du, C. A. Schuh, N. Tamura, C. L. Gan, *J. Eur. Ceram. Soc.* 2016, 36, 1277.
[30] S. M. Miller, X. Xiao, K. T. Faber, *J. Eur. Ceram. Soc.* 2015, 35, 3595.

Example 3: Additional Embodiments

Figure 8:
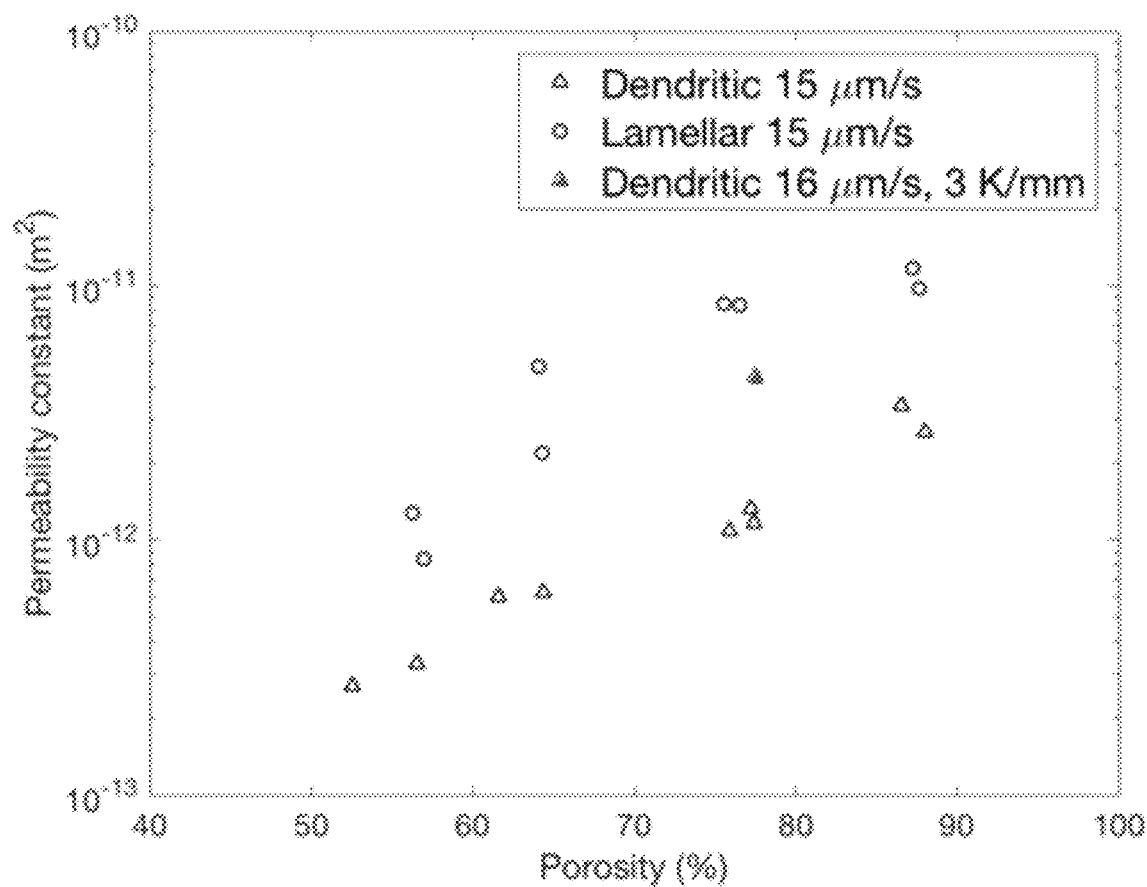
FIG. 8. Plot of permeability constant (m$^2$) vs porosity (%), which demonstrates that with freezing front velocity and temperature gradient control, permeability can be increased.
Figure 11:
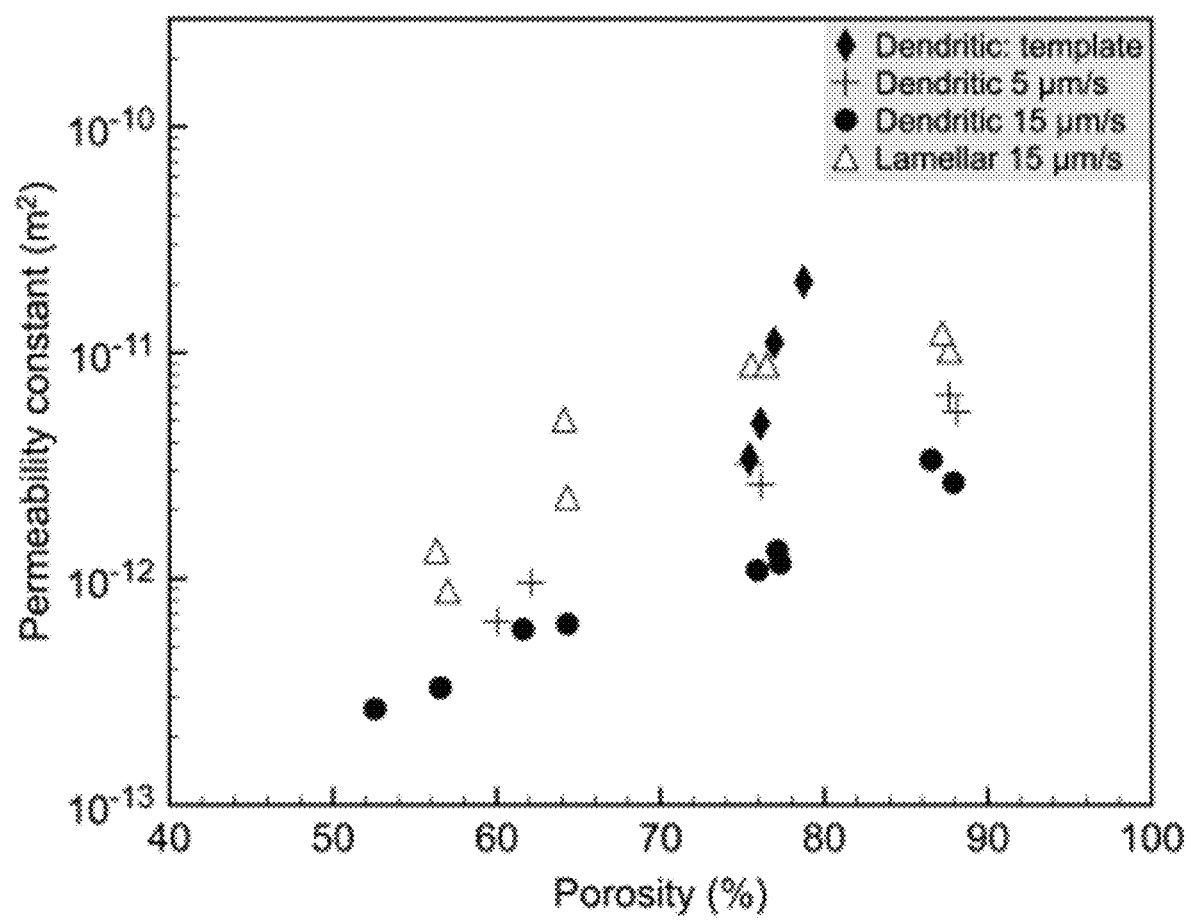
FIG. 11. Shown in the plot, the permeability constant increased six-fold with pore alignment. In the current study, with control over pore morphology through the temperature gradient, permeability can be controlled by altering primary pore fraction (dendritic to cellular pore morphology).

Permeability: Permeability is assessed by measuring the flow rate of water at various pressure drops. (Details can be found in Naviroj et al., Scripta Mater., 130 (2017) 32-36.) Typical permeability values for freeze-cast solids, in terms of the Darcian intrinsic permeability constant, are in the range of $10^{-14}$ to $10^{-10}$ m$^2$, and in general, scale with porosity (S. Deville, Freezing Colloids: Observations, Principles, Control, and Use, Springer International Publishing AG, 2017). By controlling nucleation of freezing crystals, and hence, the orientation of pores, permeability can be tuned. By using a grain-selection template, the orientation of the pore channels can be increased. Shown in FIG. 11, from M. Naviroj, Ph.D. Dissertation, Northwestern University, 2017, the permeability constant increased six-fold with pore alignment. In embodiments disclosed herein, with control over pore morphology through the temperature gradient, permeability can be controlled by altering the pore characteristics (such as dendritic to cellular pore type). FIG. 8 provides a plot of permeability constant (m$^2$) vs porosity (%), which demonstrates that with freezing front velocity and temperature gradient control, permeability can be increased.

Figure 29:
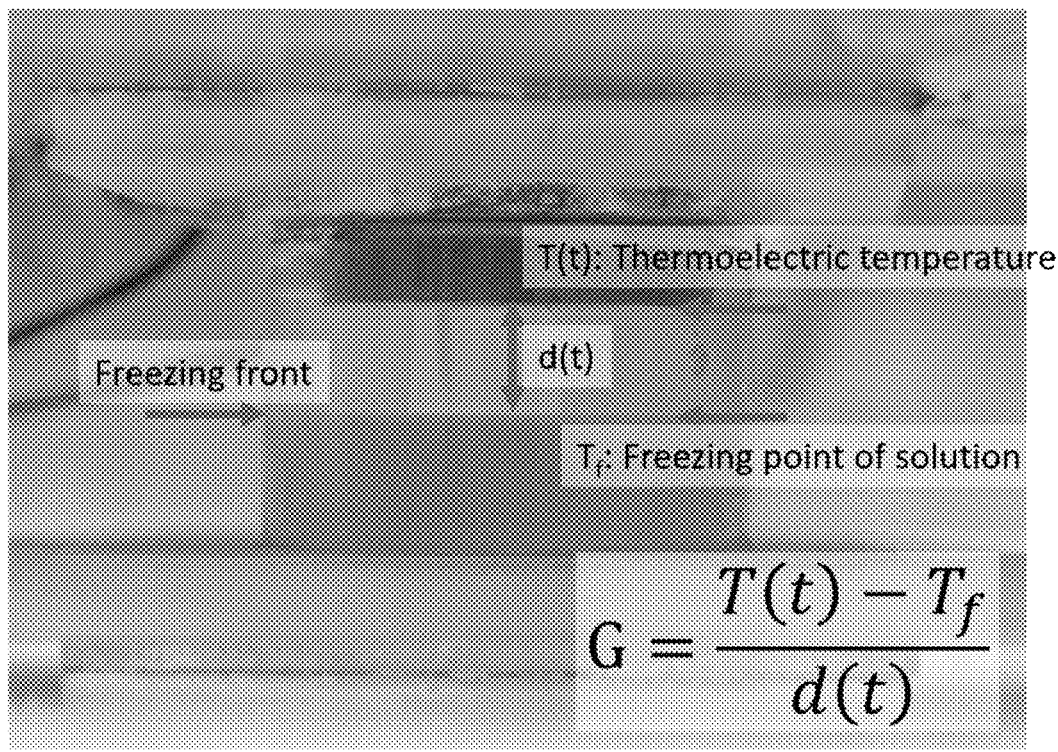
FIG. 29. A photograph of a device, also showing relevant parameters, for freeze casting, for example.
Figure 30:
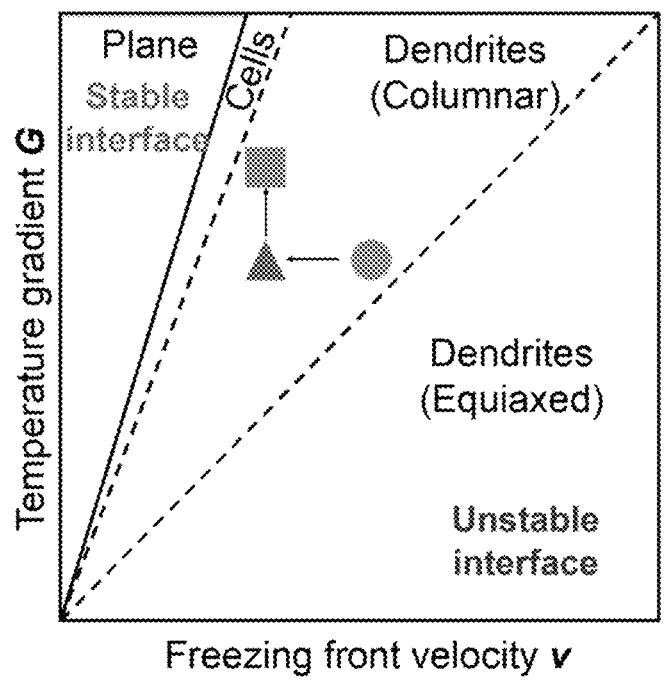
FIG. 30. Pore-structure stability map (thermal gradient vs. solidification front velocity) showing different pore-types obtained in different regions of the map during freeze casting.
Figure 31A:
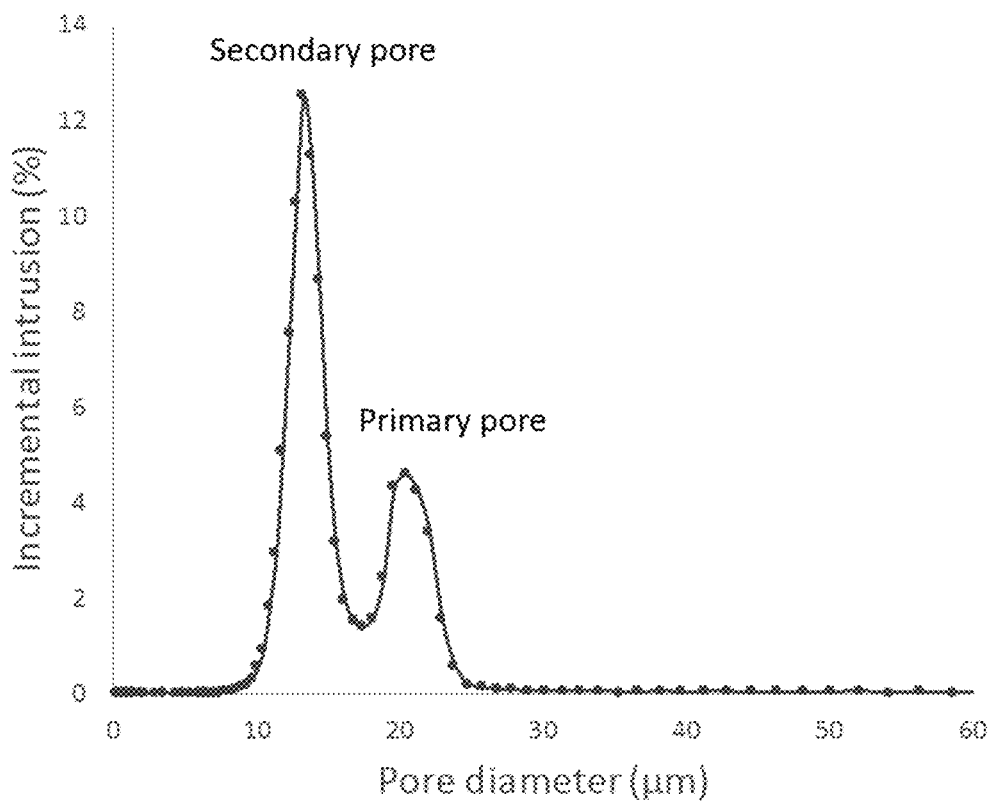
FIGS. 31A-31B.
Figure 31B:
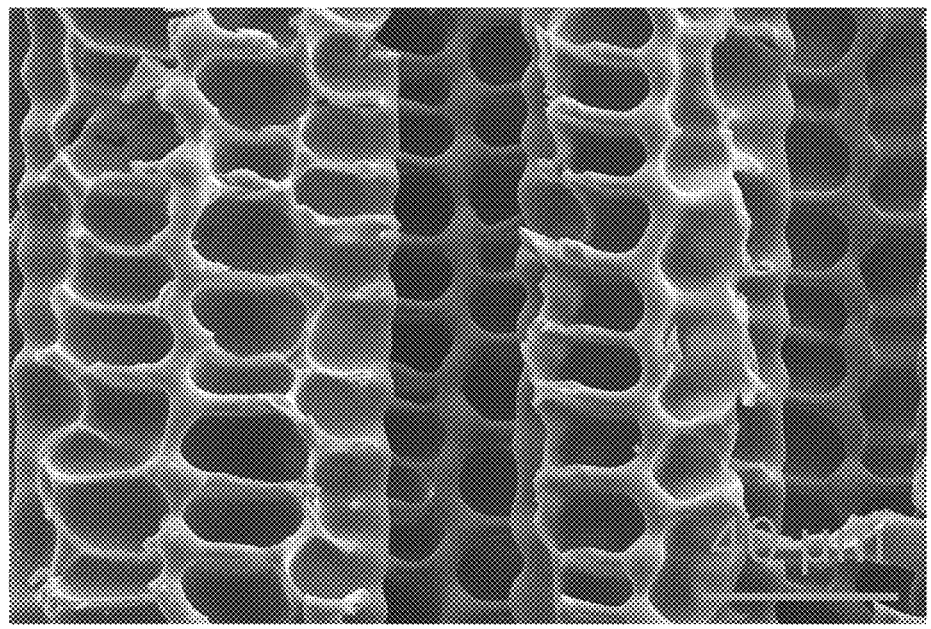
Figure 32A:
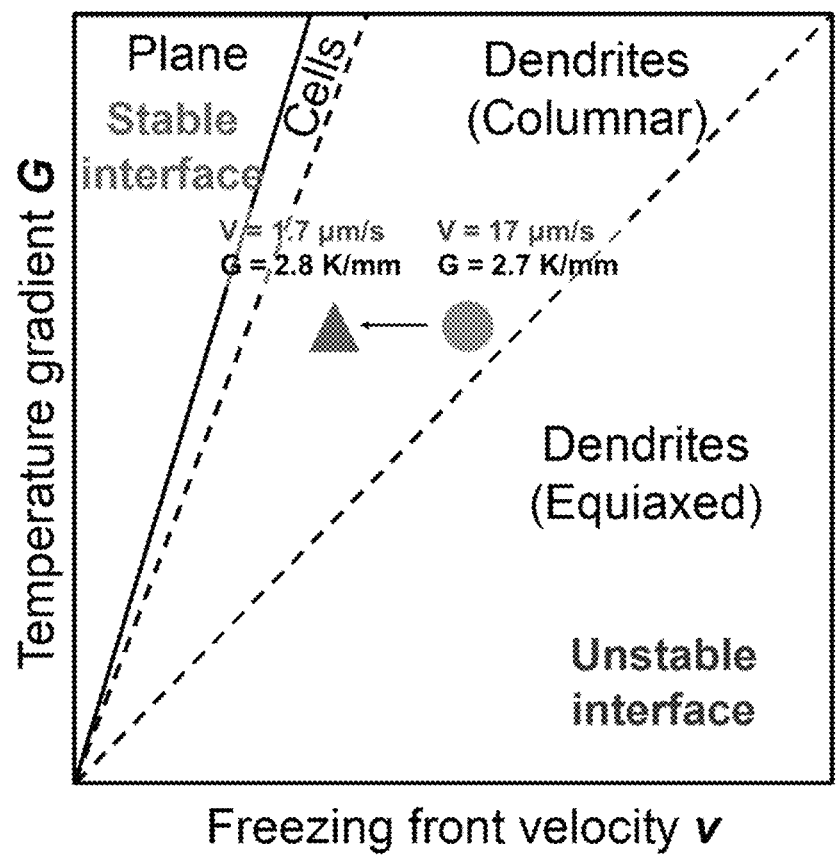
Figure 32B:
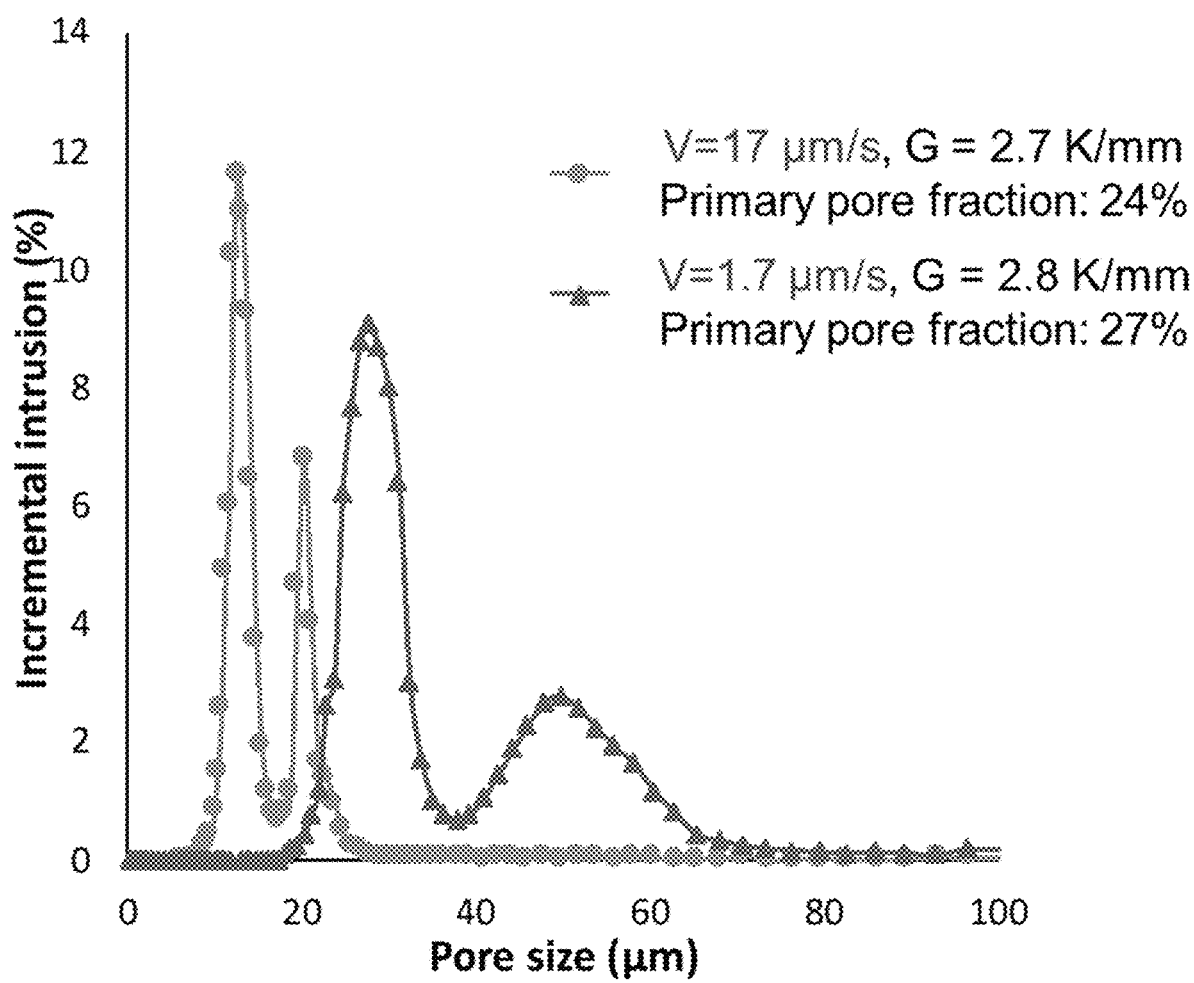
Figure 33A:
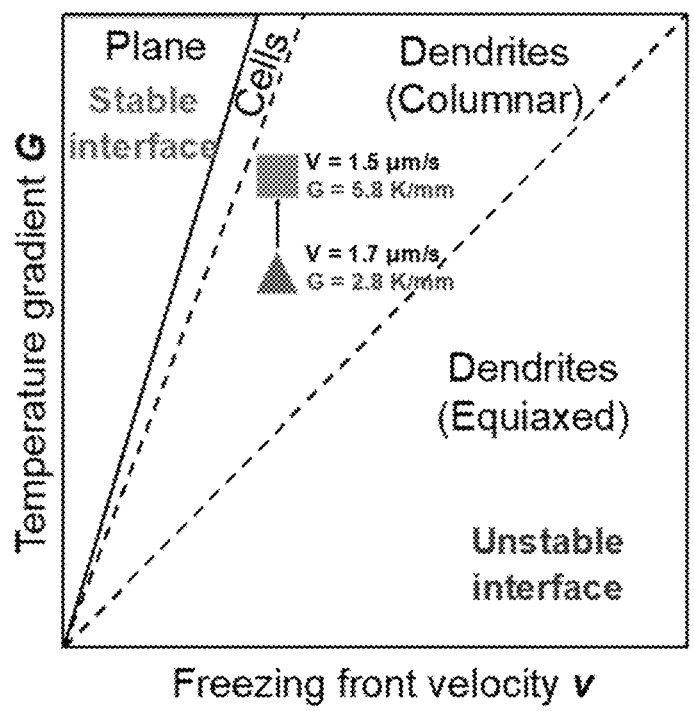
Figure 33B:
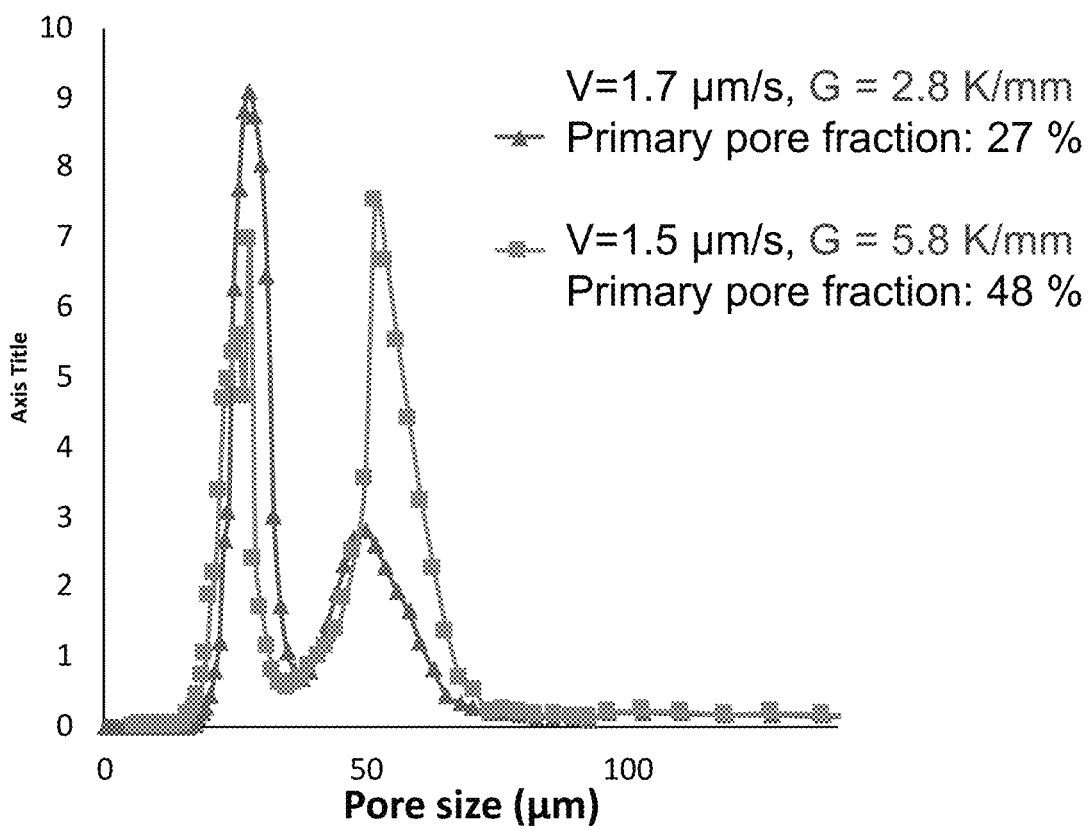

Pore sizes: Pore sizes are measured using mercury intrusion porosimetry. The maximum, or maxima in the case of multimodal distributions, are reported as pore size. Pores which are in direct contact with the thermoelectric freezing surface are not included in pore size measurement. For freeze-cast ceramics, pore sizes are typically in the range of 4 μm to 500 μm (S. Deville, Freezing Colloids: Observations, Principles, Control, and Use, Springer International Publishing AG, 2017). The size depends upon the freezing kinetics, i.e., the freezing front velocity and the temperature gradient: the temperature difference over the freezing dimension (FIG. 29).

Figure 12A:
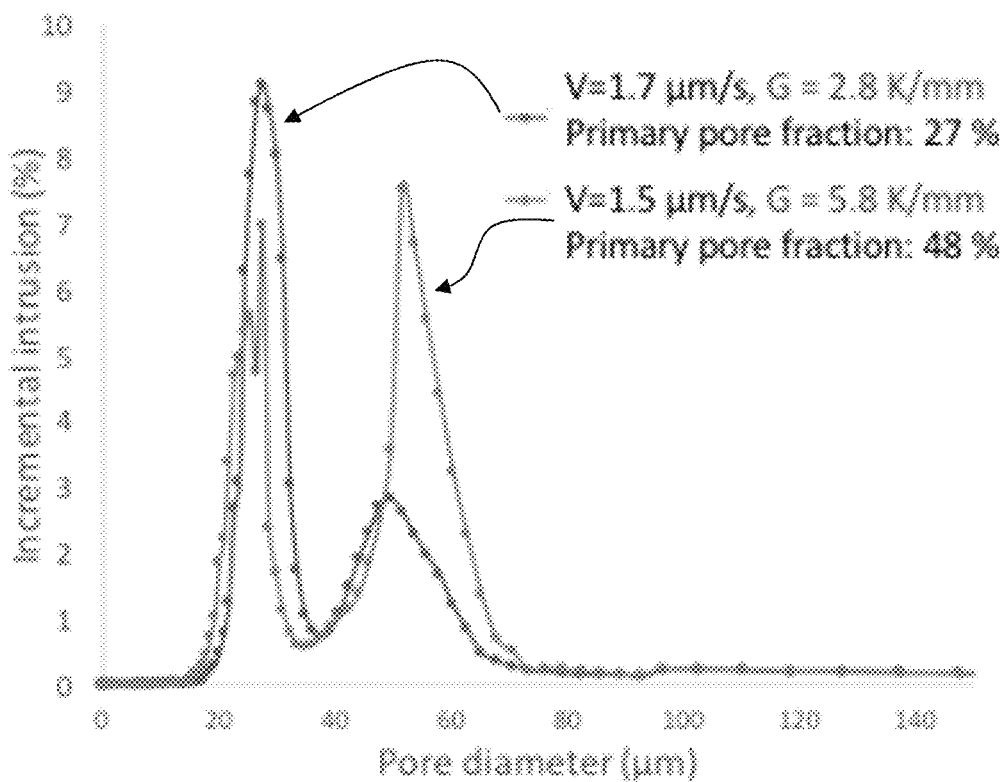
FIGS. 12A-12B. Pore size distributions based on mercury intrusion porosimetry. Incremental intrusion represents pore volume in terms of vol. %. The primary pore volume and secondary arm volume can be calculated by summing incremental intrusion for each peak. Through control of the temperature gradient, the ratio of primary pore volume to secondary arm volume changes (48:52 vs 27:73), shown in FIG. 12A, with little change in pore size.
Figure 12B:
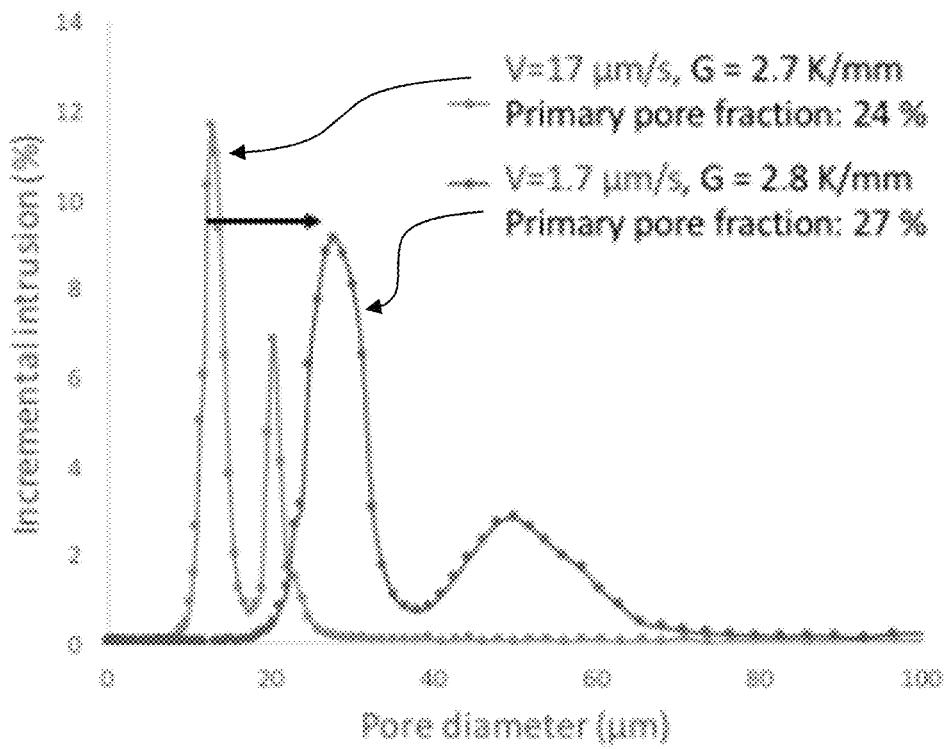

Included here is disclosure of control over pore sizes and volumes in dendritic pore structures, where a dendritic pore consists of a primary pore channel and secondary arms. From mercury intrusion porosimetry data, the ratio of the primary pore volume and secondary arm volume can be calculated. FIGS. 12A-12B show plots of incremental intrusion as a function of pore size. Incremental intrusion represents pore volume in terms of vol. %. The primary pore volume and secondary arm volume can be calculated by summing incremental intrusion for each peak.

Through control of the temperature gradient, the ratio of primary pore volume to secondary arm volume changes (48:52 vs 27:73), shown in FIG. 12A, with little change in pore size.

Figure 13:
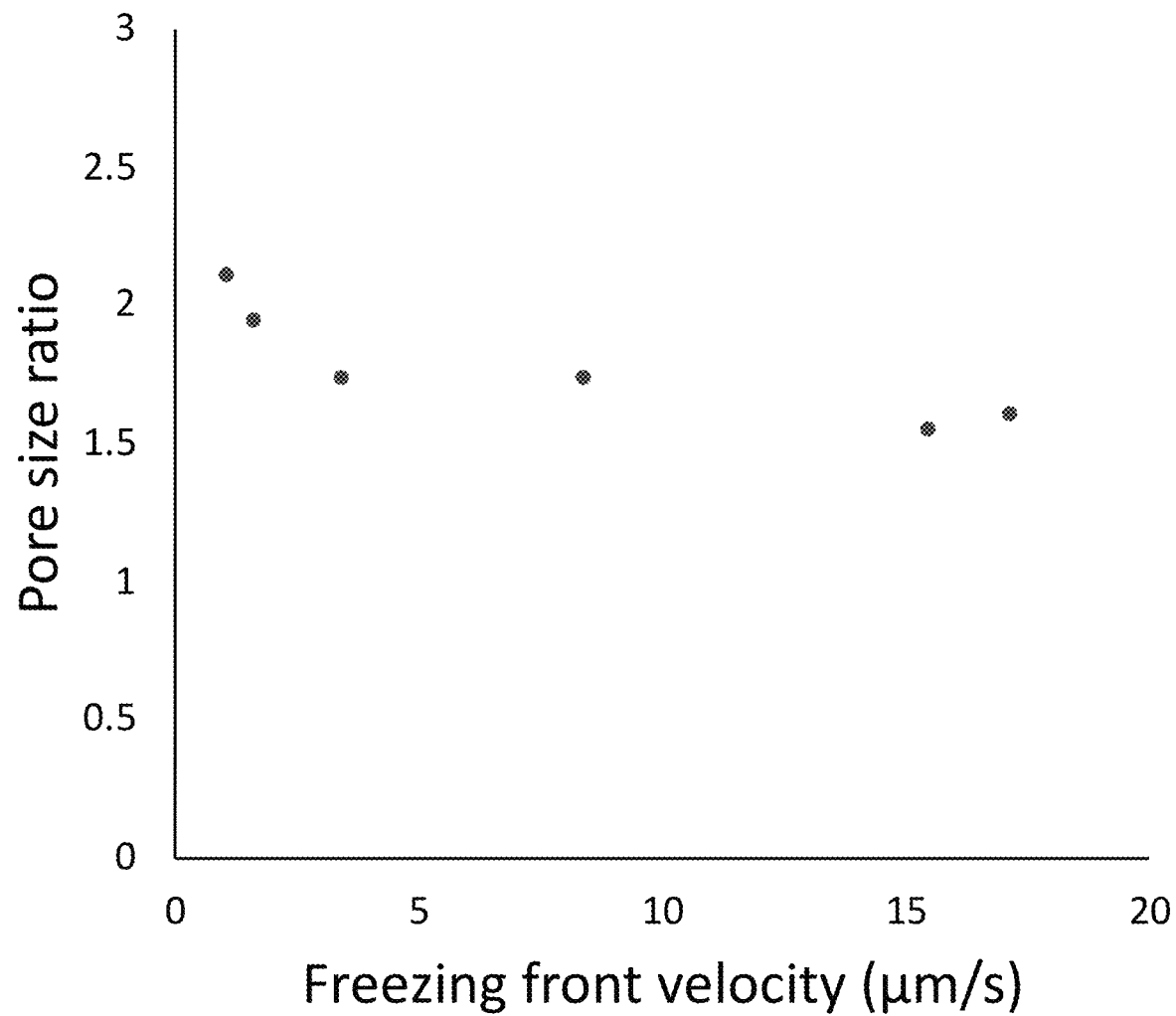
FIG. 13. Plot showing that there is little change in the ratio of the primary pore size to secondary arm size, except at low freezing front velocities.

By controlling the freezing-front velocity, the primary pore and secondary arm sizes change (see FIG. 12B). There is little change in the ratio of the primary pore size to secondary arm size, except low freezing front velocities (See FIG. 13). All the freeze casting exemplified in FIG. 13 took place at temperature gradients of ~3K/mm.

Functionality (built-in): Through appropriate choice of dendritic solid precursor it is possible to design the dendritic ceramic to exhibit useful properties. These properties include electrical conductivity (through choice of ceramic powder or second phase additions to the suspension or solution), catalytic capabilities (through the inclusion of complexed metal ions, electrocatalysts, etc.), hydrophilic/hydrophobic surfaces (through material choice), pH responsive surfaces (through material choice), mechanical robustness (through reinforcement of pore walls or by interwall bridges), thermally response, etc.

Functionalization: The pores disclosed herein be functionalized with a variety of functional groups to assist in the separation of complex fluids. An illustrative example is the functionalization of a dendritic SiOC ceramic with polyethylene glycol (PEG) as denoted below. This description is meant purely as an example formulation and is not meant to restrict the scope of the invention. The invention is to encompass any number of surface functionalizations of dendritic SiOC or other dendritic ceramics according to established processes found in the literature.

As an exemplary functionalization protocol, since SiOC has silica nanodomains encased with free carbon (Saha, A. et al.), the SiOC membrane is first treated with NaOH to etch away a layer of the silica nanodomain and develop surface silanol groups. The membrane is next treated with HCl to neutralize remaining hydroxyl groups and then rinsed with water. The membrane is then treated with 3(aminopropyl) trimethoxysilane to provide surface bound amine groups for further functionalization. The amine groups are then reacted with polyethylene glycol acrylate (PEGA) to covalently bond the PEG molecule to the surface. It may be seen that alternative functionality may be easily added to the dendritic ceramic through the choice of appropriate chemistry.

Selectivity: These ceramics are able to achieve selective separation of particles based on size, wherein selective separation is defined as the ability to reduce the percentage of one particle type in comparison to another. For example, through careful control of the main channel shape and size, particles larger than an indicated size will be unable to penetrate the ceramic and will therefore be effectively removed from the solution. Selectivity may also be achieved through control of flow rate and size of side cavities. Through manipulating the flow rate, we are able to determine the distance diffused by particles of various sizes while flowing through the ceramic. As the distance diffused increases the number of particles "captured" in the side cavities increases. As the diffusivity of particles in laminar flow is linearly related to particle size, a larger particle will diffuse a shorter distance in a set amount of time in comparison to a smaller particle. This difference in diffusive distances allows for selective retention of smaller particles while the majority of large particles pass through the membrane. Side cavities add to the selectivity of the flow rate by excluding particles above a given size as seen in the relation below. Wherein $d_p$ is the distance the particle has travelled during its residence time in the membrane, h is the height of the side cavity, $L_m$ is the length of the main channel, and $R_p$ is particle radius.

$$d_p * \left(\frac{h}{L_m}\right)^{\frac{1}{2}} < R_p$$

For particle sizes screened at the surface we would expect a reduction in the particle concentration of 99%.

For particles which pass through the membrane we will reduce the number of particles below a certain size by at least 50% while allowing 75% of particles larger than the chosen size to exit the ceramic.

Capture Efficiency: capture refers to retaining particles within the bulk of the dendritic ceramic while not counting those screened at the surface. As described above, the capture of particles is influenced by the flow rate, main channel dimensions, and side cavity dimensions. The dendritic ceramic will allow for capture of small particles while either rejecting large particles at the surface or allowing them to pass through the membrane. The dendritic ceramic will capture at least 50% of a chosen particle size per pass. The selectivity of this capture is outlined above.

Thermal operability/stability range: Generally ceramic materials are thermally stable up to ~67% of their melting points. For low temperature operation, SiOC has been known to be stable at 77 K (H. Zhang et al., Macro/mesoporous SiOC ceramics of anisotropic structure from cryogenic engineering, Materials & Design, 134 (2017) 207-217).

Chemical Compositions: Polymer-derived ceramics can be cast as solutions, and may include but are not limited to Si-based ceramics (Columbo reference), Si—Ti—C—O ["Development of a new continuous Si—Ti—C—O fiber using an organometallic polymer precursor", Yamamura, T., Ishikawa, T., Shibuya, M. et al. J Mater Sci (1988) 23: 2589], Si—Al—O—N ["Si—Al—O—N Fibers from Polymeric Precursor: Synthesis, Structural, and Mechanical Characterization" G. D. Soraru, M. Mercadini, R. D. Maschio, F. Taulelle, F. Babonneau, J. Am. Ceram. Soc. 76 (1993) 2595-2600.], and B-based ceramics ["Evolution of structural features and mechanical properties during the conversion of poly[(methylamino)borazine] fibers into boron nitride fibers", S. Bernard, K. Ayadi, M.-P. Berthet, F. Chassagneux, D. Cornu, J.-M. Letoffe, P. Miele, J. Solid State Chem. 177 (2004) 1803-1810.] Each of these references is incorporated herein in its entirety to the extent not inconsistent herewith. Compositions may also include, but are not limited to, oxides, carbides, nitrides, sulfides, and combinations of these, from powders.

Homogeneity: Structures can be made to be homogeneous along the height (freezing direction) by imposing a constant freezing front velocity (with the exception of the boundary layer against the cold plate). Structures can be made to be heterogenous, specifically in the form of a two-layer structure consisting of dendritic pores and cellular pores. Dendritic pores are created by imposing lower temperature gradient and higher freezing front velocity whereas cellular pores are created by imposing higher temperature gradient and lower freezing front velocity.

Figure 14:
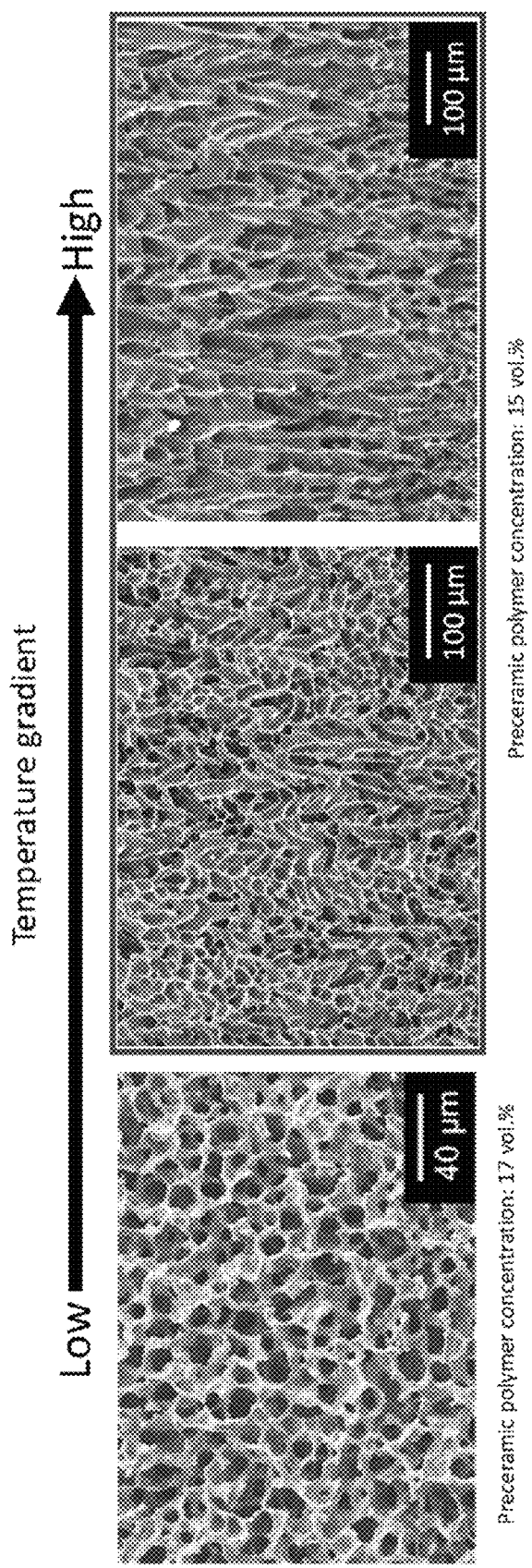
FIG. 14. SEM images show longitudinal view (cross-section parallel to freezing direction) of SiOC prepared with cyclooctane as the solvent. Middle and far right panels demonstrate greater directionality.

Directionality: Freeze casting with cyclooctane (low Jackson α factor) results in non-directional sponge-like or seaweed-type structure (see FIG. 14, far left). However, by imposing a higher temperature gradient during crystal growth the directionality of crystals improves along with the directionality of the pores.-SEM images show longitudinal view (cross-section parallel to freezing direction) of SiOC prepared with cyclooctane as the solvent. FIG. 14, middle and far right panels demonstrate greater directionality.

Example 6: Additional Embodiments

A freeze-cast material can be formed of a composite (such as a nanocomposite). For example, the solid walls of the pores comprise a multiphase solid material in which one of the phases comprises constituents (e.g., particulates, nanocrystals, nanowires, nanotubes) that have one, two or three dimensions of less than 100 nm. For example, in addition to the pore wall composition being formed of a ceramic material, the pore wall composition can also comprise an additive material such as nanowires, such as catalytically active nanowires.

A freeze-cast material can have mechanical, electrical, thermal, optical, electrochemical, catalytic properties that differ markedly from that of the individual component materials.

A method for making a freeze-cast material system can include the following process details:

1. Liquid formulation casting onto a base plate, impose chilling of the base plate and impose a constant flux of IR light on the top surface to create and control the temperature gradient (fixed flux gives approximately fixed gradient), with the decrease in $T_{base}$ dictating how the temperature at each position through the thickness decreases with time. For example, casting can be performed using a doctor blade. The infrared light flux on the top surface creates a uniform temperature gradient that remains constant through the thickness of the layer undergoing controlled freezing and the rate of transient cooling of the lower plate controls the rate of temperature decrease at all points through the thickness.

2. A liquid formulation is continuously extruded onto a web that is translating continuously in the x-direction. The material translates between two plates that are surfaces for heat exchange with the liquid formulation. There is a large difference between the temperatures of the top and bottom plates creating a steep temperature gradient through the thickness, designated as the z-direction. The temperature profile of the plates does not change in time. The sample is transiently cooled due to its translation in the x-direction. The temperature difference between the top and bottom surfaces is constant. The temperature of the lower plate is controlled to create a gradual gradient in the x-direction. That is, the temperature is colder and colder with distance from the extrusion dye. The temperature of the top plate decreases with x in parallel with the decrease in temperature of the lower plate. The gradient in temperature in the x-direction is less than 1% of the temperature gradient in the z-direction. The material being freeze cast is translated in a solid body motion in the x-direction to impose a constant gradient in the z-direction with a rate of decrease of temperature that is the product of $v_x$ $(gradT)_x$. Thus, the translation velocity $v_x$ can be used to control of the velocity of the crystallization front without changing the x-dependence of the temperature profile in the plates. (Analogous to T. Zheng, J. Li, L. Wang, Z. Wang, J. Wang, Implementing continuous freeze-casting by separated control of thermal gradient and solidification rate, Int. J. Heat Mass Transf. 133 (2019) 986-993.

Figures 16A, 16B:
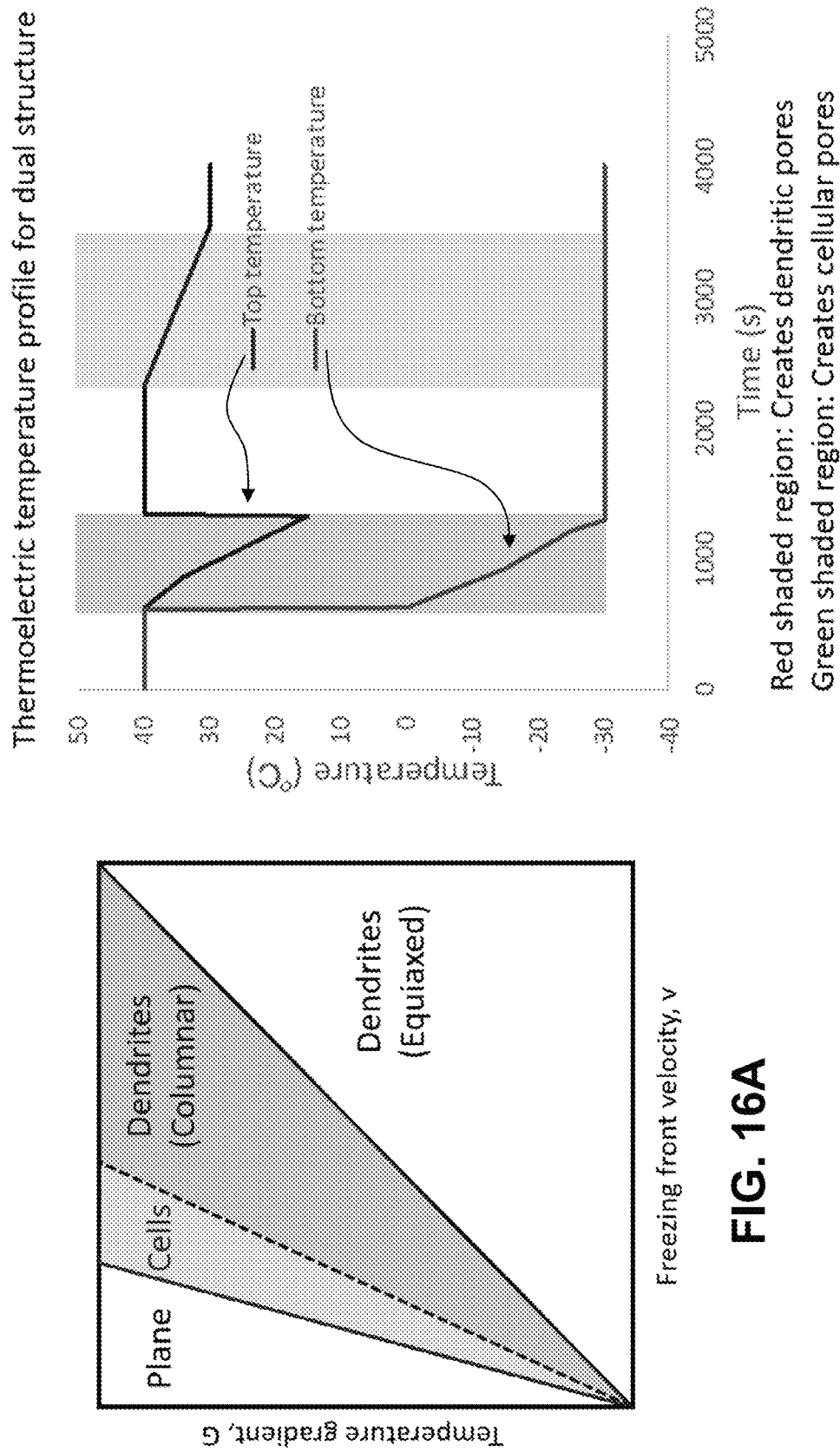
FIGS. 16A-16B.

3. For production of a dual zone type material, the two plates can have a piecewise continuous linear T gradient in the x-direction and material being translated in a solid body motion in the x-direction to impose a first constant T gradient $(gradT)_{x,1}$ in a first zone and a second constant T gradient $(gradT)_{x,2}$ in a second zone such that translation of the material at a constant speed. For example, the plates close to the extrusion die can impose a small temperature gradient in the z-direction to produce an initial pore layer with dendritic structure. At a position x that provides the desired thickness of the zone 1 structure, the temperature of the top plate can be controlled to have a step up in temperature that imposes on the translating composition an abrupt increase in temperature of the top surface as illustrated in FIG. 16B. This process achieves continuous production of a material with a first pore structure in zone one and a second, monolithic pore layer. The process can produce in Zone 2 a plurality of pores that are continuous with the pores in Zone 1. The process can produce in Zone 2 between 90% and 110% as many main channels as in Zone 1.

In another embodiment, a method for making multiple freeze-cast materials comprises two identical freeze-casting set-ups with common temperature controllers of the first heat exchange surface and of the second heat exchange surface, where in the first surface and the second surface are opposite of each other. The peak in the pore size distribution of the freeze-cast materials from the two freeze-casting set-ups were within 10%. This paves another way for scale up of the method described herein.

Example 7: Dual-Zone Structures and Thermally-Conductive Spacers

Figure 15A:
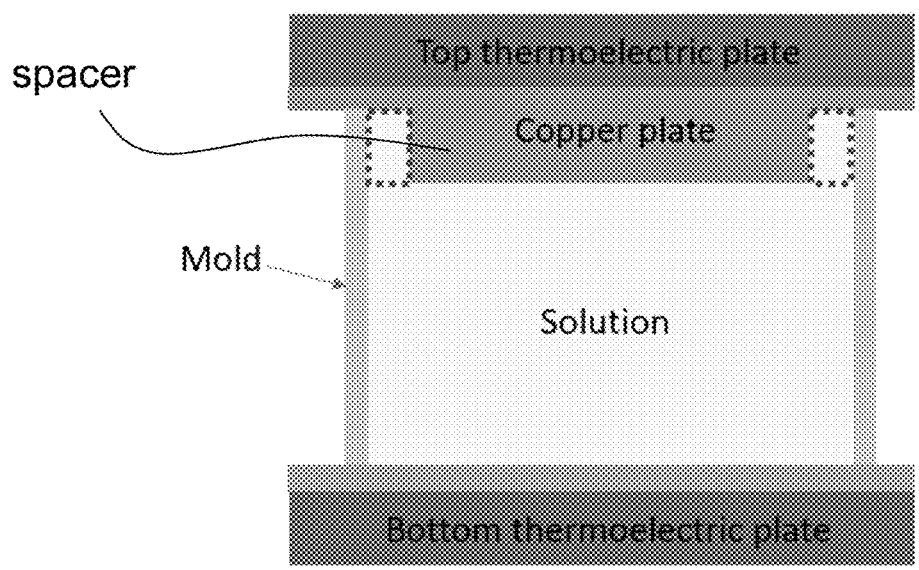
FIGS. 15A-15B.

In order to accommodate the shrinkage of the solution during freezing, a part of the copper plate can be inserted into the freeze-casting setup (e.g., into the mold, or sides of container containing the dispersion), as illustrated in FIG. 15A. The space created between inserted copper and mold acts as a reservoir of solution (indicated by dashed line) and ensures that the solution has contact with copper plate during freezing for optimal heat exchange.

Figure 17:
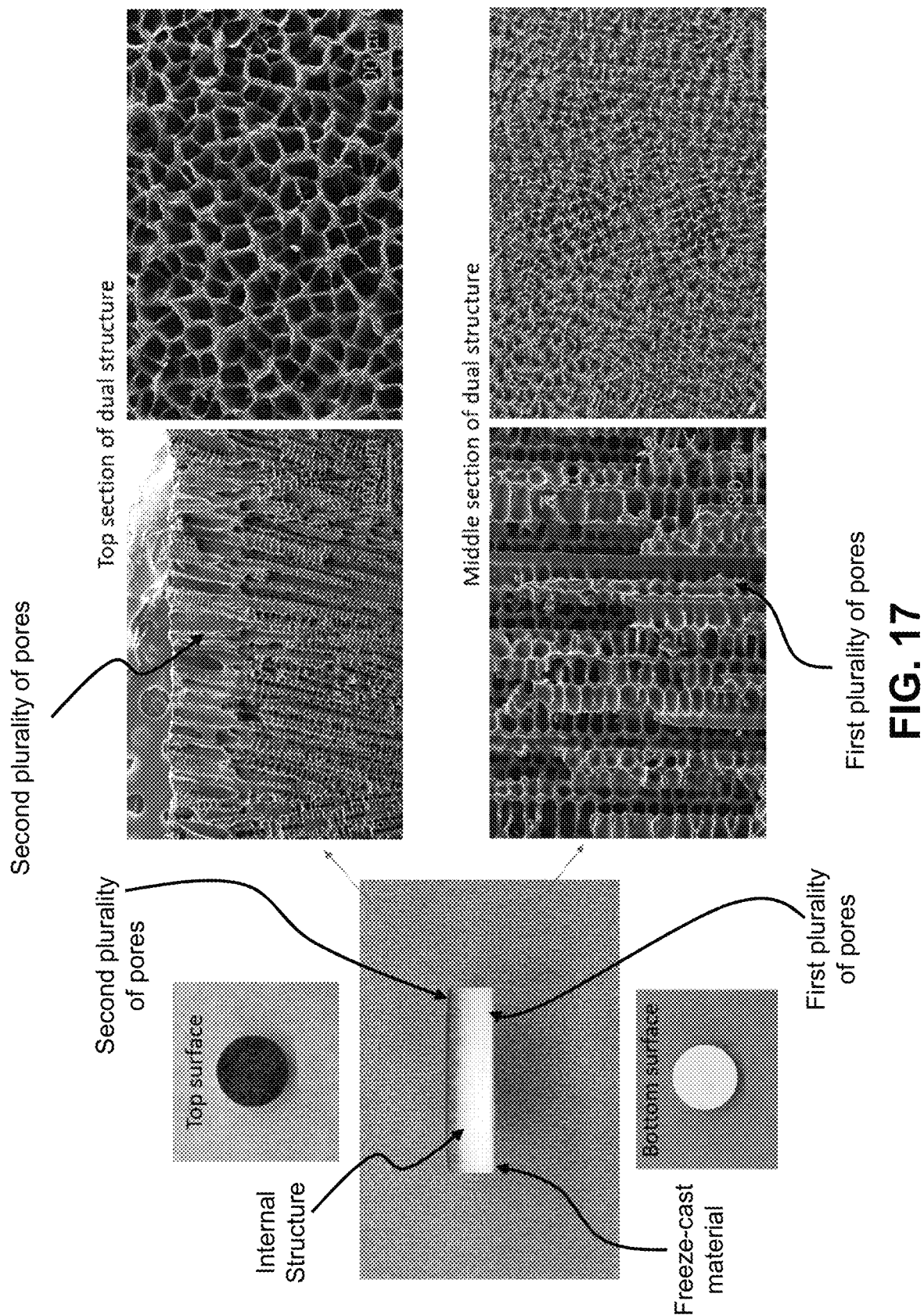
FIG. 17. A series of views of a freeze-cast material having two types of pores. Such a freeze-cast material can be formed by the process depicted in FIG. 16B, for example. Photographs show a top surface, a side view, and a bottom surface of the freeze-cast material. The two top and right-most images are electron microscope images of a side-view and a top-view of cellular pores in the top zone of the freeze-cast material. The two bottom and right-most images are electron microscope images of a side-view and a top-view of dendritic pores in the bottom zone of the freeze-cast material. The materials was pyrolyzed with water to remove carbon. Bottom surface color appears white because of reduction in carbon whereas top surface appears black in color because of remnant carbon due to thicker walls in cellular region.
Figure 18:
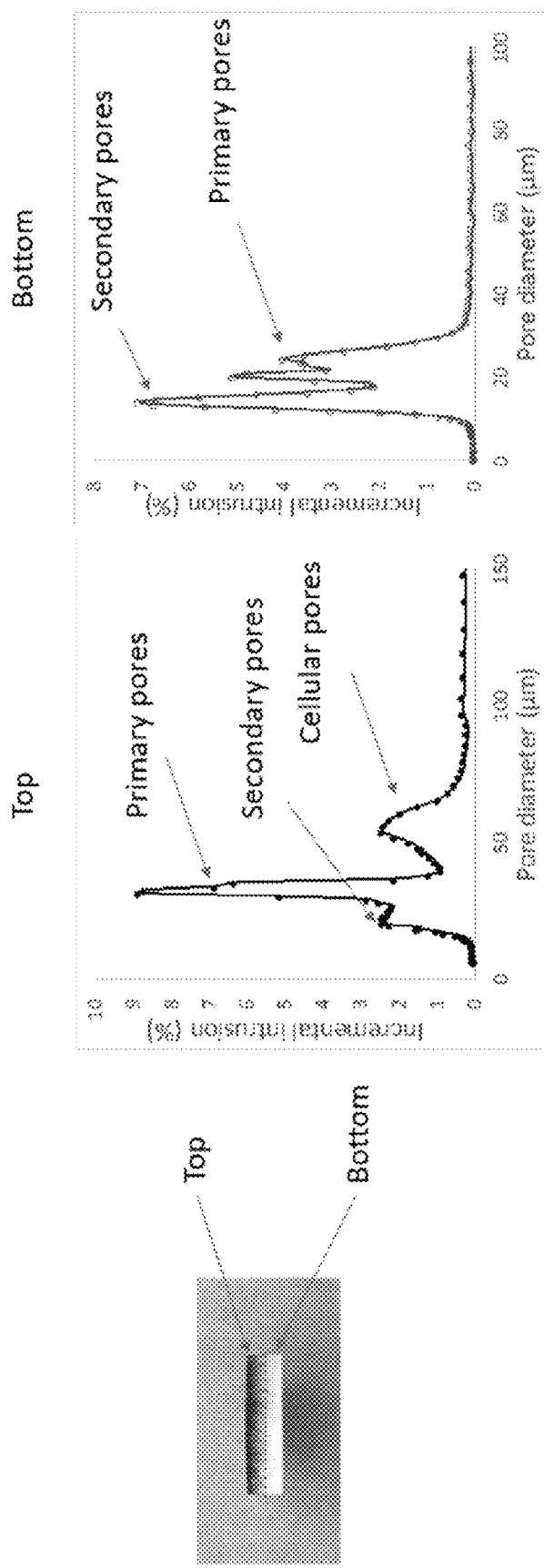
FIG. 18. Pore size distributions of the top (cellular) and the bottom (dendritic) zones of the freeze-cast material of FIG. 17.

For characterization of a dual-zone structure (also referred to as a dual-pore structure), membranes can be cut into half and mercury intrusion porosimetry performed on top part and bottom part. As an illustrative example, FIG. 16B shows conditions during freeze-casting for obtaining a internal structure. The top part of the internal structure still contains dendritic pores as shown in the pore size distribution since the cellular region is very thin (200-300 μm). The thickness of the original sample was roughly 3.2 mm, and after cutting into half, both top part and bottom part are 1.4 mm thickness. The pore structure is also show in the images of FIG. 17. FIG. 18 shows pore size distributions for the top (cellular) zone (left plot) and the bottom (dendritic) zone (right plot).

Example 8: Pore Morphologies Tailored for Flow and Filtration

In certain embodiments, freeze casting is a ceramic processing method that can tailor the orientation, size and morphology of the pores by changing freezing front velocity, solvent, or dispersed species concentration. However, fundamental understanding in the art, prior to this disclosure, is lacking to guide selection of the temperature gradient to provide a desired degree of undercooling and, hence, pore structure. Solution-based freeze casting of a preceramic polymer is used herein as a model system, and the temperature of the freezing solution is controlled from the top and bottom to precisely control the temperature gradient. The effects of the temperature gradient on the resulting freezing front velocity and pore morphology are disclosed herein. Mercury intrusion porosimetry reveals the size distribution for both primary pores and secondary arms. Furthermore, a transition from dendritic to cellular pores is disclosed herein by further tuning temperature gradient, freezing front velocity and preceramic polymer concentration. Dendritic pore geometries open new opportunities for filtration: primary pores set a cutoff size for particles entering and secondary arms offer slow recirculation in the "secondary arms" to delay particles that are small enough to enter them.

This Example provides additional descriptions with reference to FIGS. 22-40.

Figure 26A:
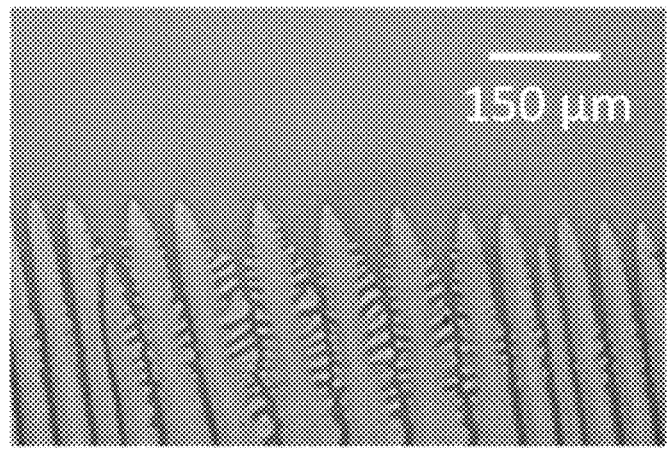
FIGS. 26A-26D.
Figure 26B:
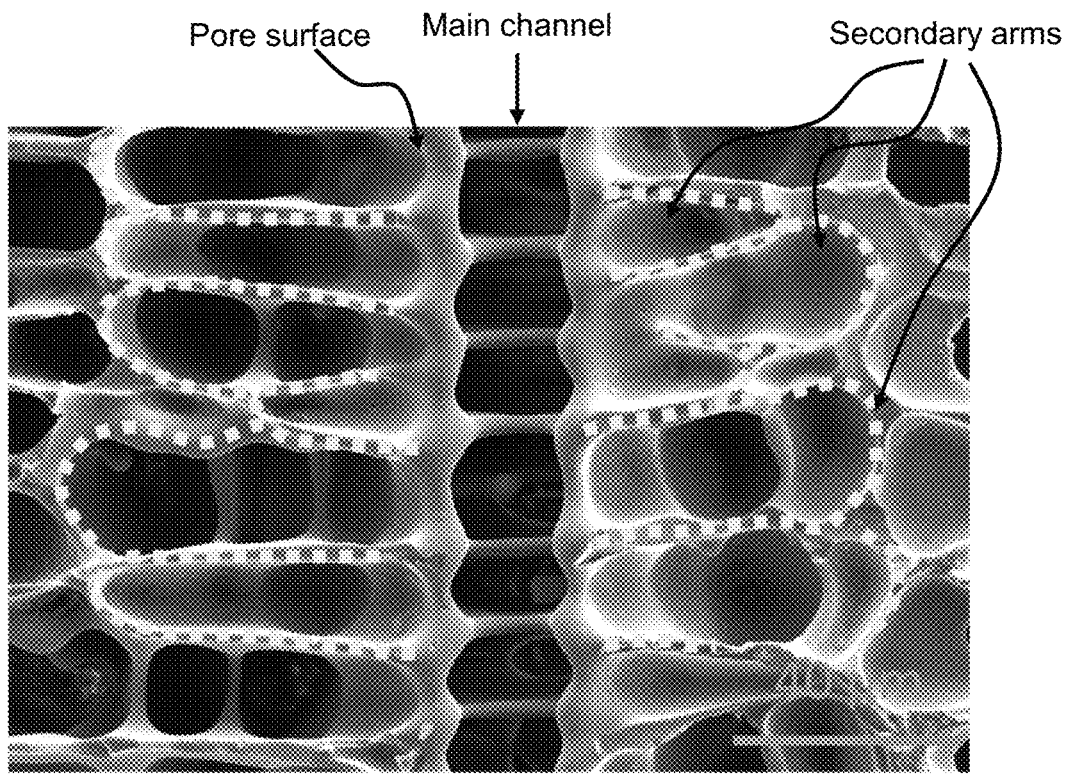
Figure 26C:
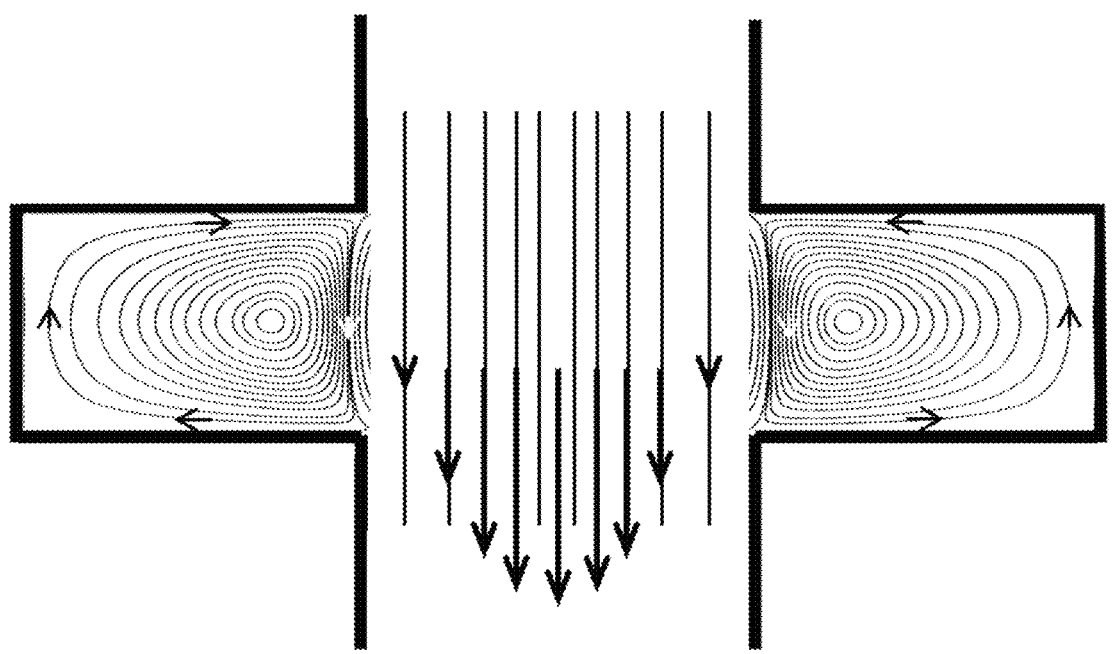
Figure 26D:
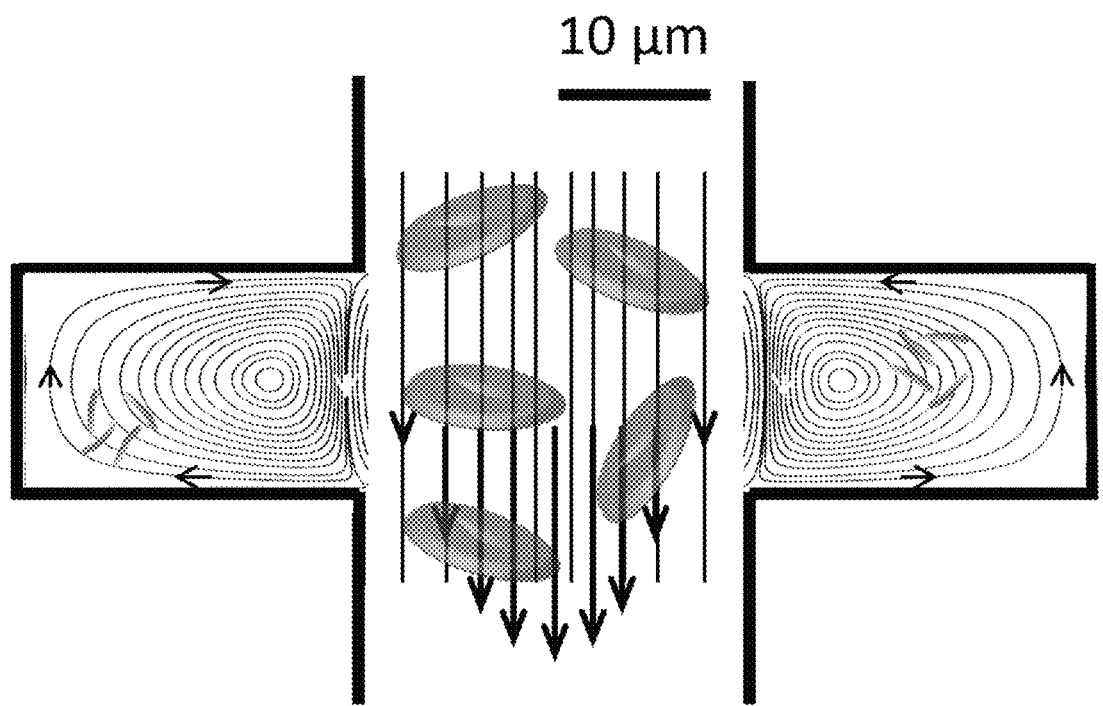
Figure 27A:
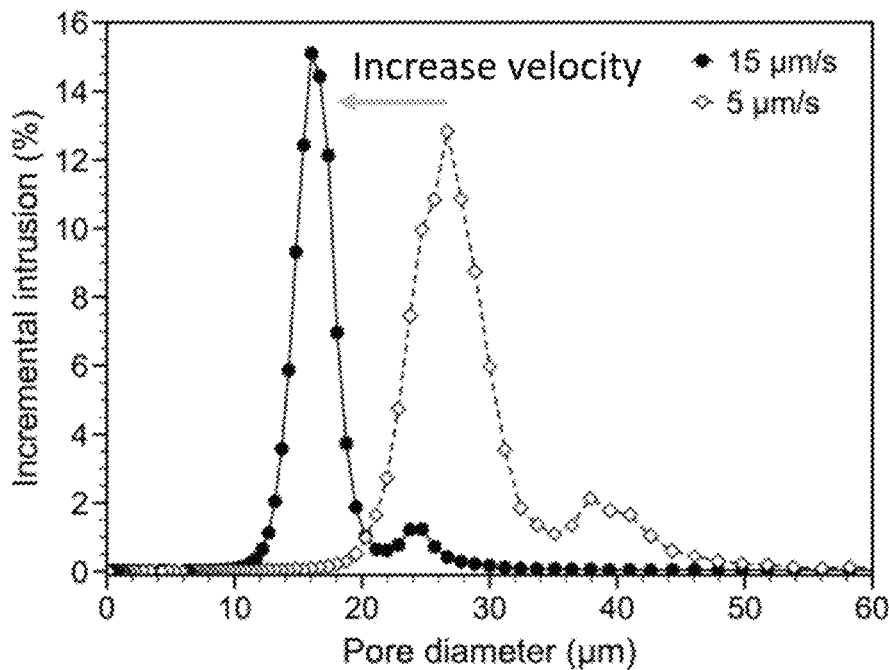
FIGS. 27A-27B.
Figure 27B:
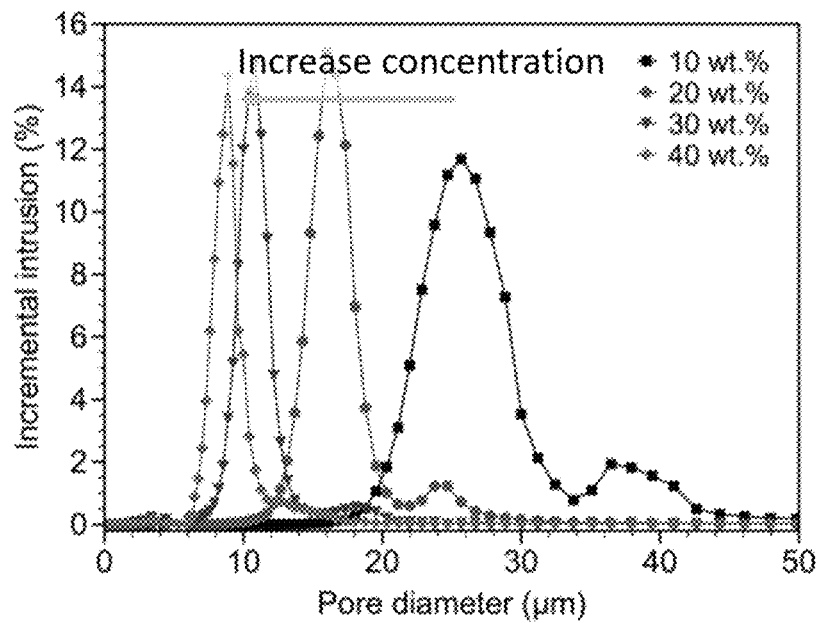
Figure 28:
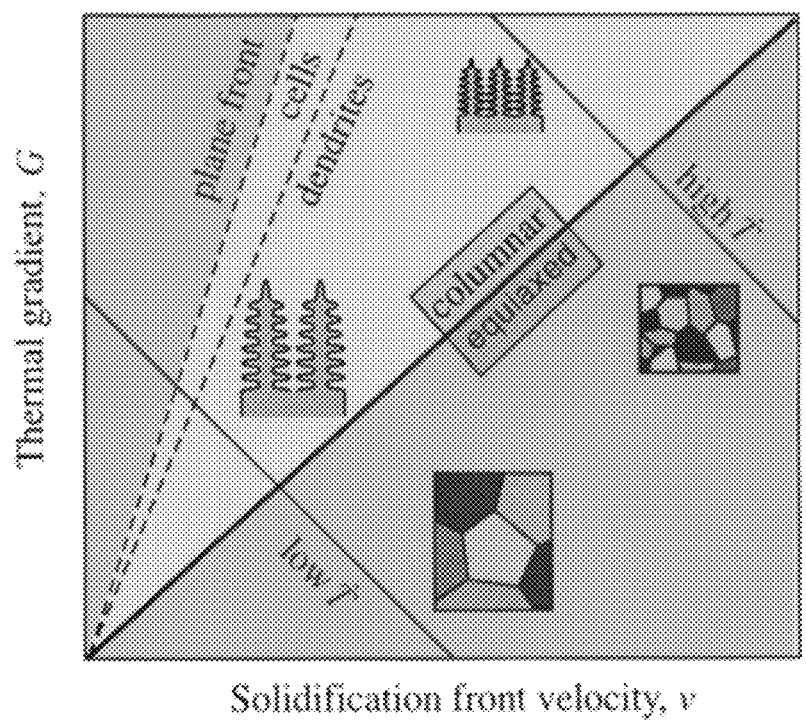
FIG. 28. Pore-structure stability map (thermal gradient vs. solidification front velocity) showing different pore structures obtained in different regions of the map.

FIG. 26B shows a dendritic pore structure including the primary pore in the center and secondary arm which are templated by branches as indicated by dotted lines. When a laminar fluid flows through the primary pore, it creates a recirculation flow inside the secondary arm, which flow rate is much slower than flow in primary pores.

By tuning the pore size as disclosed in embodiments here, one can design pores such that large blood cells flow through whereas small-sized pathogen or platelet can enter into recirculation to concentrate them into a small volume. One of the advantages of the freeze-cast membranes disclosed here is that there are thousands of secondary arms to trap of pathogens in a small volume of membrane.

It is important to control pore size since it will affect the flow inside the cavity. This can be achieved via certain embodiments of methods disclosed herein.

Temperature gradient is another important parameter to control. From the solidification literature, one can find stability-microstructure maps, here called the pore-structure stability map (e.g., FIG. 28) which suggest that one can modify the freezing microstructure to three different crystal morphologies: planar, columnar and equiaxed by controlling freezing velocity and temperature gradient. In freeze casting, cells or columnar dendrites which produce directionally aligned pores are of interest. In most of the freeze casting studies, only freezing velocity is controlled, but independent control in freezing velocity and temperature gradient, would allow exploration of a pore stability map and use this method to design pore structures.

Figure 15B:
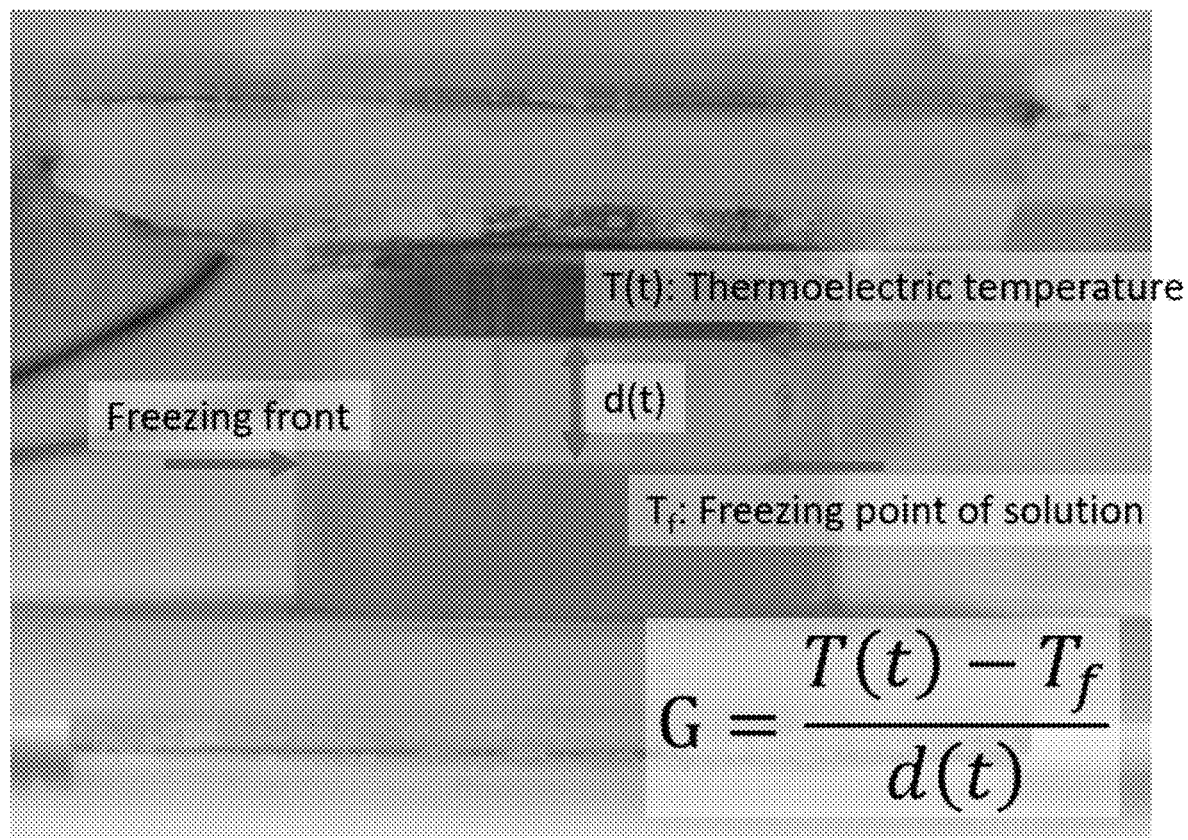

To control the temperature gradient, a thermoelectric plate (a surface for heat exchange with the liquid formulation/dispersion) can be placed at bottom and top of the mold (e.g., see FIG. 29). By assuming that the freezing front is at the freezing point of polymer solution, one can define the temperature gradient which is calculated by dividing temperature difference between top thermoelectric and freezing front by the distance between top thermoelectric plate and freezing front (FIG. 15B). The small "t" means that temperature, T, is a function of time.

Exemplary experimental details for demonstrating particle separation using certain membranes disclosed herein: Solvent=Cyclohexane; Preceramic polymer=Polysiloxane, which can be pyrolyzed to from SiOC

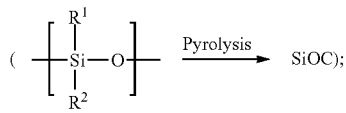

Polymer concentration=20 wt. % (Porosity ~77%). A variety of different freezing conditions are used to form membranes with different pore characteristics, which are characterized according to their particle capture efficiency.

Pore size distribution data (e.g., FIGS. 31-33) show an example of pore size distribution of dendritic pores. The dendritic pores have characteristic bimodal features. The larger peak of the mercury intrusion porosimetry plots (e.g., FIG. 31A) corresponds to the primary pore and smaller pore peak corresponds to the secondary arms. One can also determine fraction of the primary pore and the secondary arms by summing up each peak.

Change in freezing front velocity at constant gradient (FIGS. 32A-32D): the freezing front velocity is decreased (10×) while temperature gradient is fixed. The intensity in the pore-structure stability map corresponds to the marker for the curve in pore size distribution data. Both primary pore size and secondary arm size increased as freezing velocity decreased. The condition with higher freezing velocity has 24% of primary pore out of total pore volume. Decreasing the freezing front velocity, primary pore fraction is 27% so there is a slight increases in primary pore fraction. As freezing velocity decreases at same temperature gradient, the cellular region is approached on the pore-structure stability map, where there are only primary pores effectively.

As an illustrative, non-limiting example, the following protocols can be used for particle flow-through demonstration: Membrane Diameter=15 mm, Thickness=1.5 mm, Porosity=~77%, 10 micron particles at a concentration of 173,000/ml and 2 micron particles at a concentration of 2,270,000/ml. Droplet Penetration Protocol can be as follows. 1. Immerse the ceramic membrane in water by placing in a scintillation vail filled with ~10 mL of water. 2. Place the vial under house vacuum for 2 hours or until the membrane sinks to the bottom of the vial while still under vacuum. 3. Once the membrane has been infiltrated with water, prepare 16 glass slides by placing a 0.2 um cut-off nucleopore filter on each slide (current diameter is 25 mm). Label the slides with waterdrops 1-15 and one slide with suspension drop. 4. Prepare a particle suspension by adding 20 uL of 1% w/v 10-micron stock suspension to 2 mL of water. Then add 2 uL of 1% w/v 2-micron stock suspension. 5. Place the wet membrane on the first piece of filter paper and add 75 uL of particle suspension and allow to sit for three minutes. 6. After three minutes, touch a piece of Whatman filter paper to the meniscus formed at the bottom edge of the membrane to pull the remaining fluid through the membrane. Usually hold it until the membrane's top surface starts to look textured again. 7. After pulling through the remaining suspension, move the ceramic membrane to the next nucleopore filter labeled as water drop 1. 8. Once the membrane has been placed on the filter, add 75 uL of water to the top membrane surface and allow it to sit for 3 minutes. 9. Upon completion of the three minutes, touch a piece of Whatman filter paper to the meniscus formed at the bottom edge of the membrane to pull the remaining fluid through the membrane. 10. After pulling through the remaining water, move the ceramic membrane to the next nucleopore filter. 11. Repeat steps 8-10 until 15 water drops have been added to the membrane's top surface. 12. Once all 15 water drops have been added, allow the nucleopore filters to dry. 13. After the filters are dry, image them under the fluorescent microscope and take 30 randomly placed images for both the 2-micron and the 10-micron particles. Images (FIG. 34) are within the drying ring established from the drying of the water on the nucleopore filter.

Figure 34A:
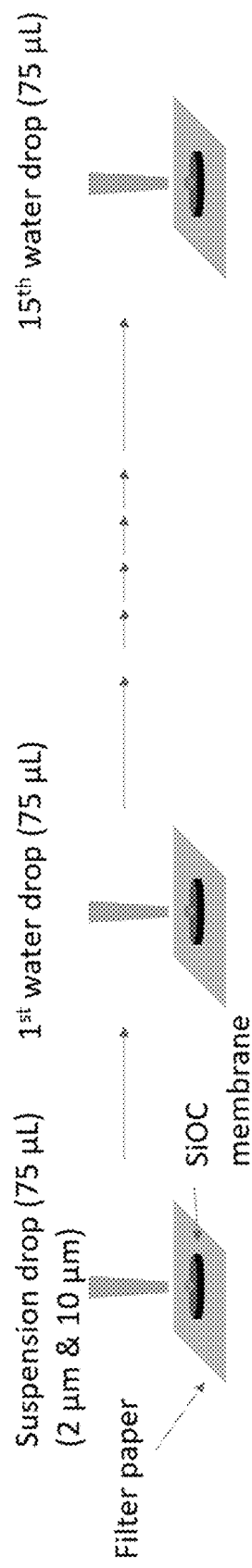
FIGS. 34A-34D. Flow-through experiment; membranes diameter: 15 mm, thickness: 1.5 mm, porosity: 77%.
Figure 34B:
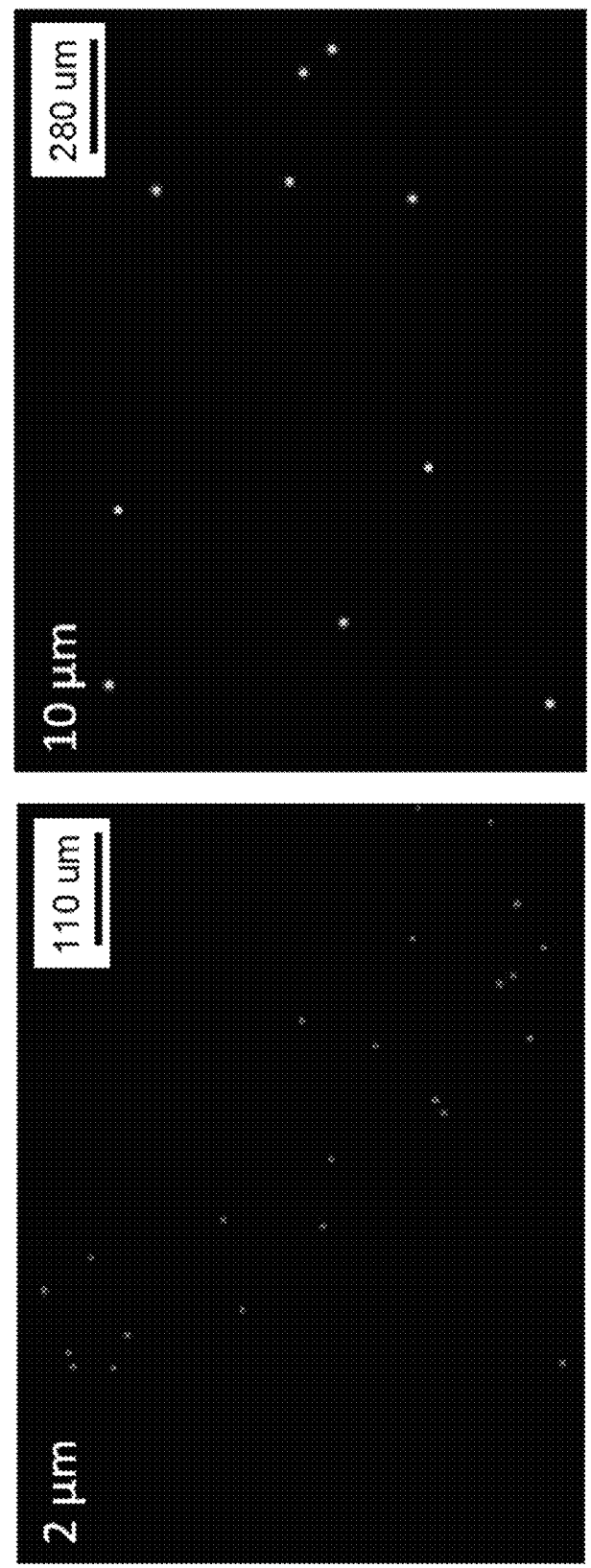
Figure 34C:
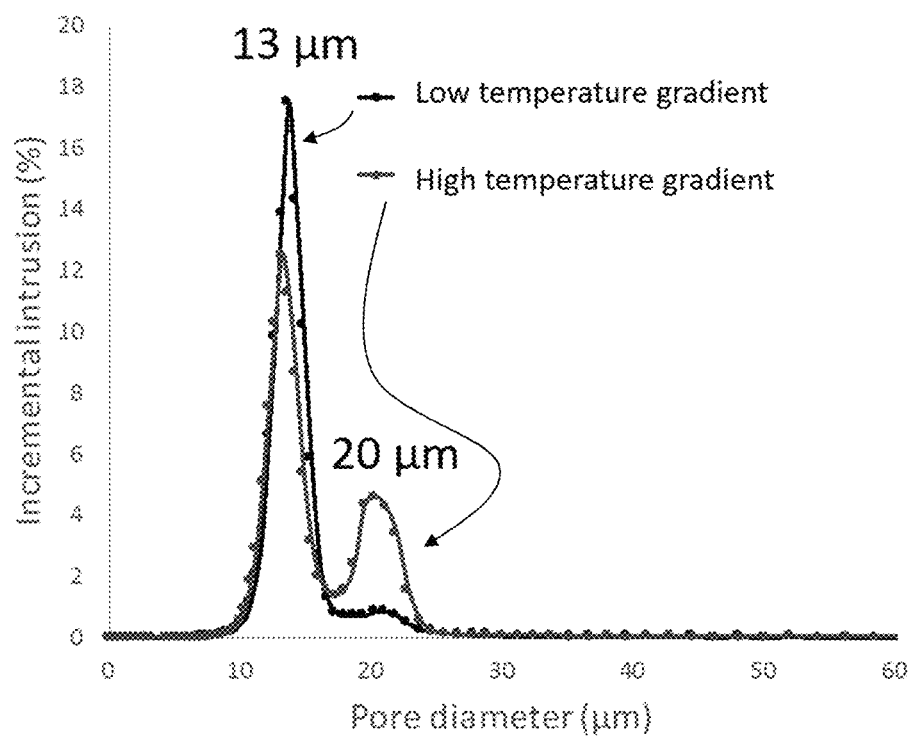
Figure 34D:
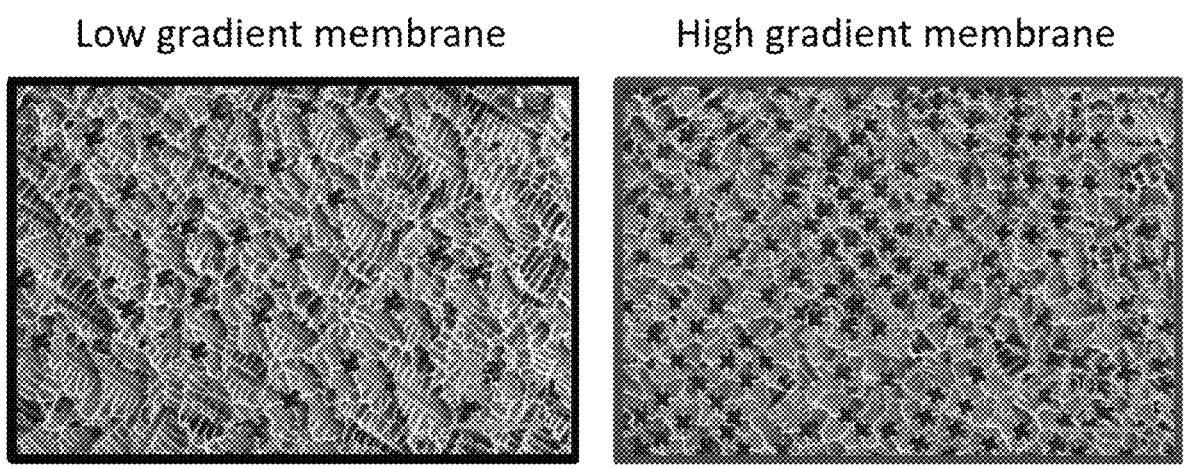
Figure 35A:
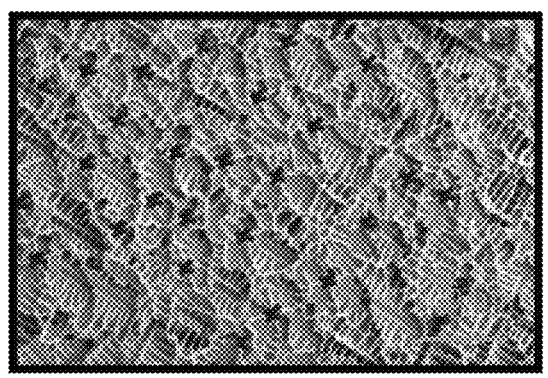
FIGS. 35A-35C. Flow-through filtration result (low gradient membrane).
Figure 35B:
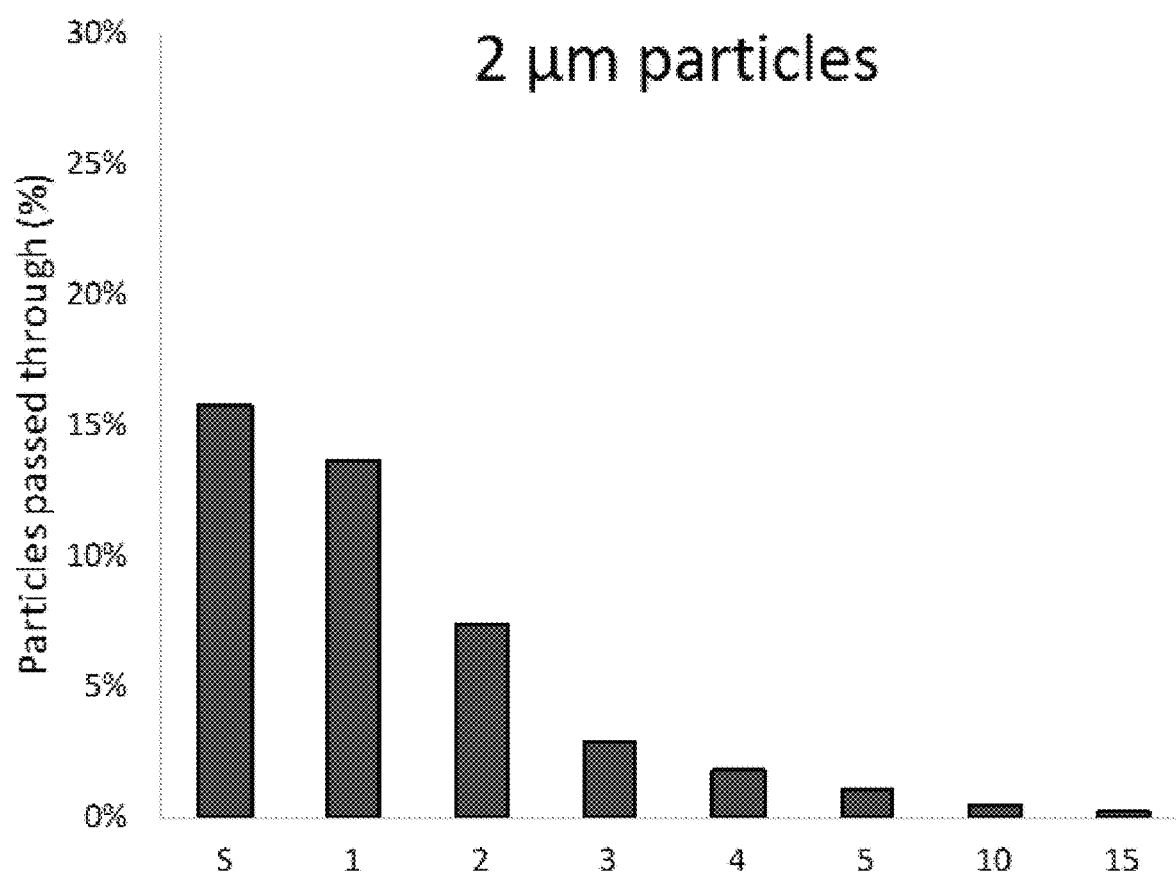
Figure 35C:
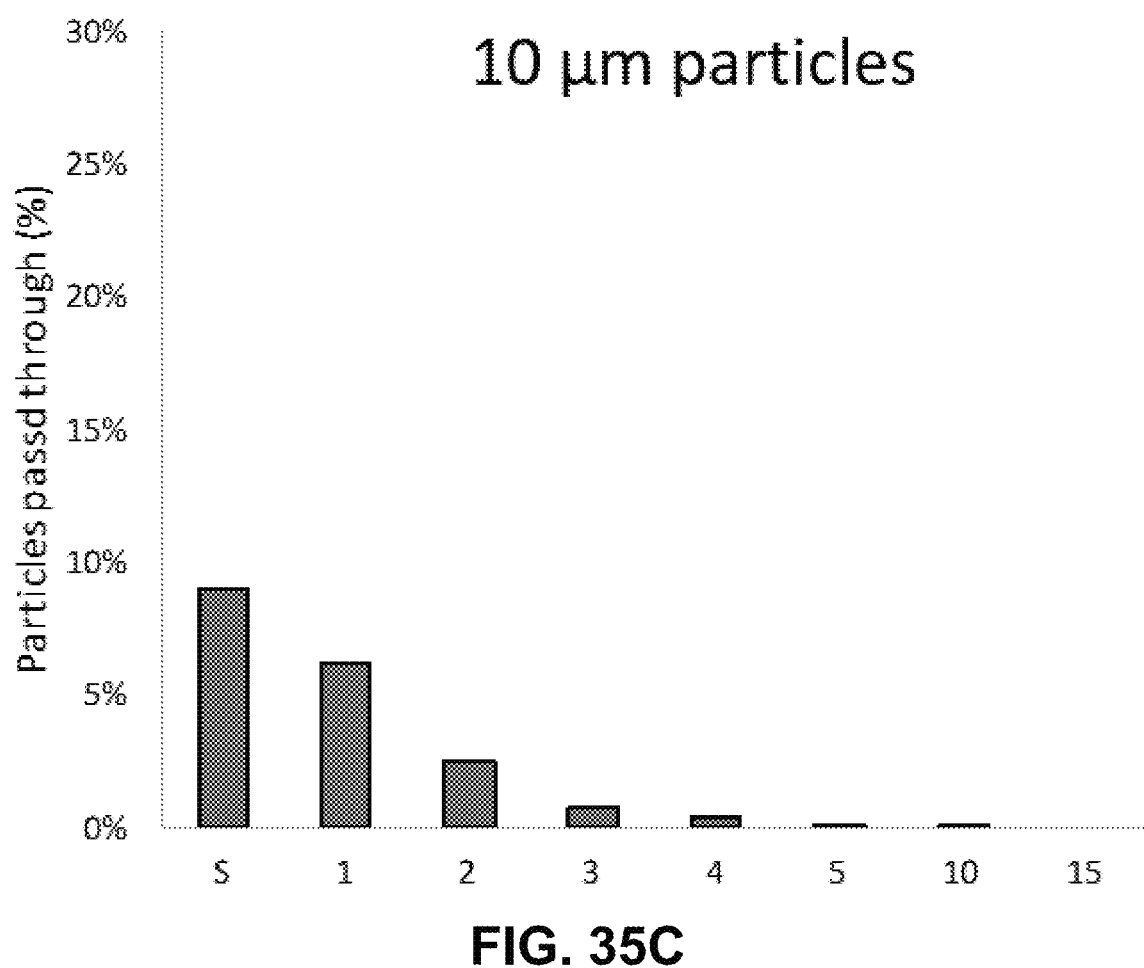
Figure 36A:
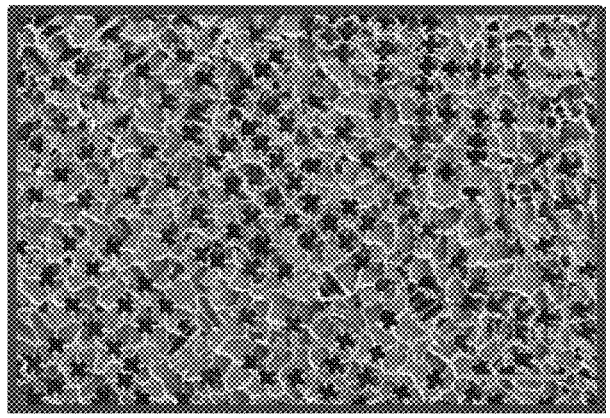
FIGS. 36A-36C. Flow-through filtration result (high gradient membrane).
Figure 36B:
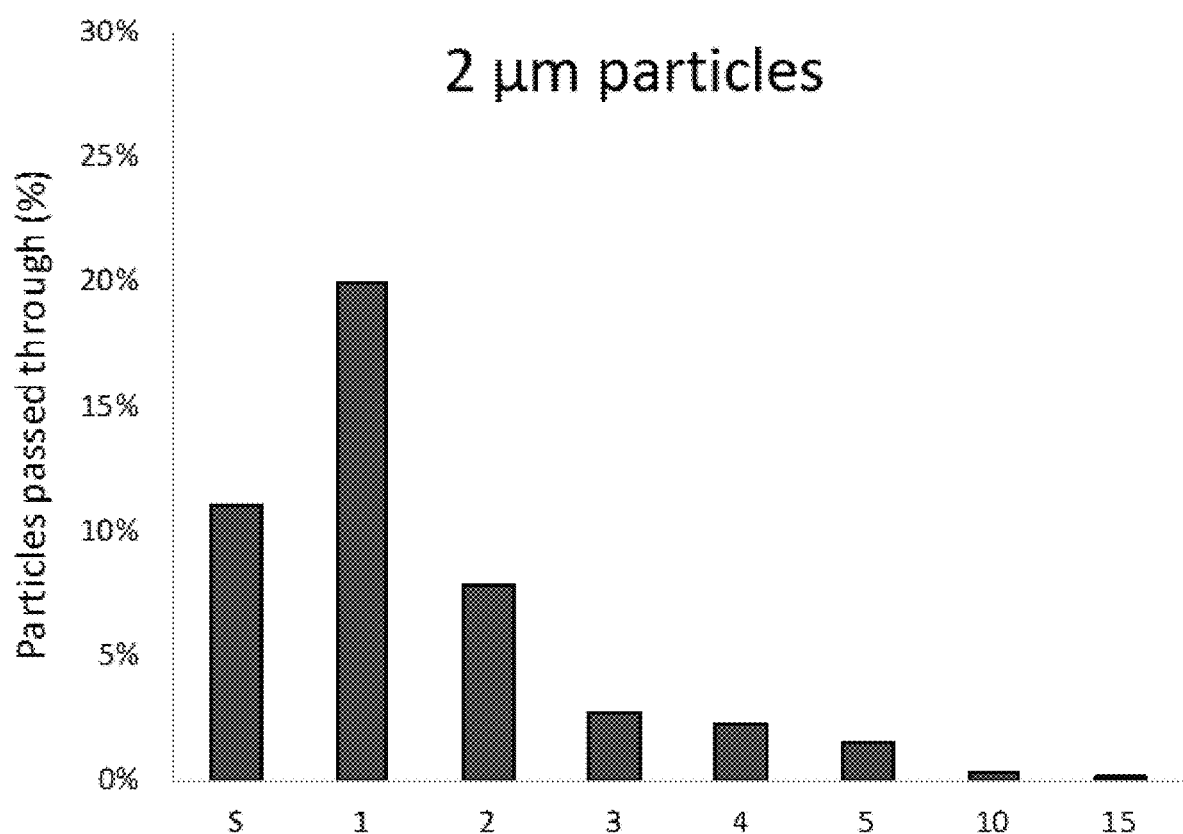
Figure 36C:
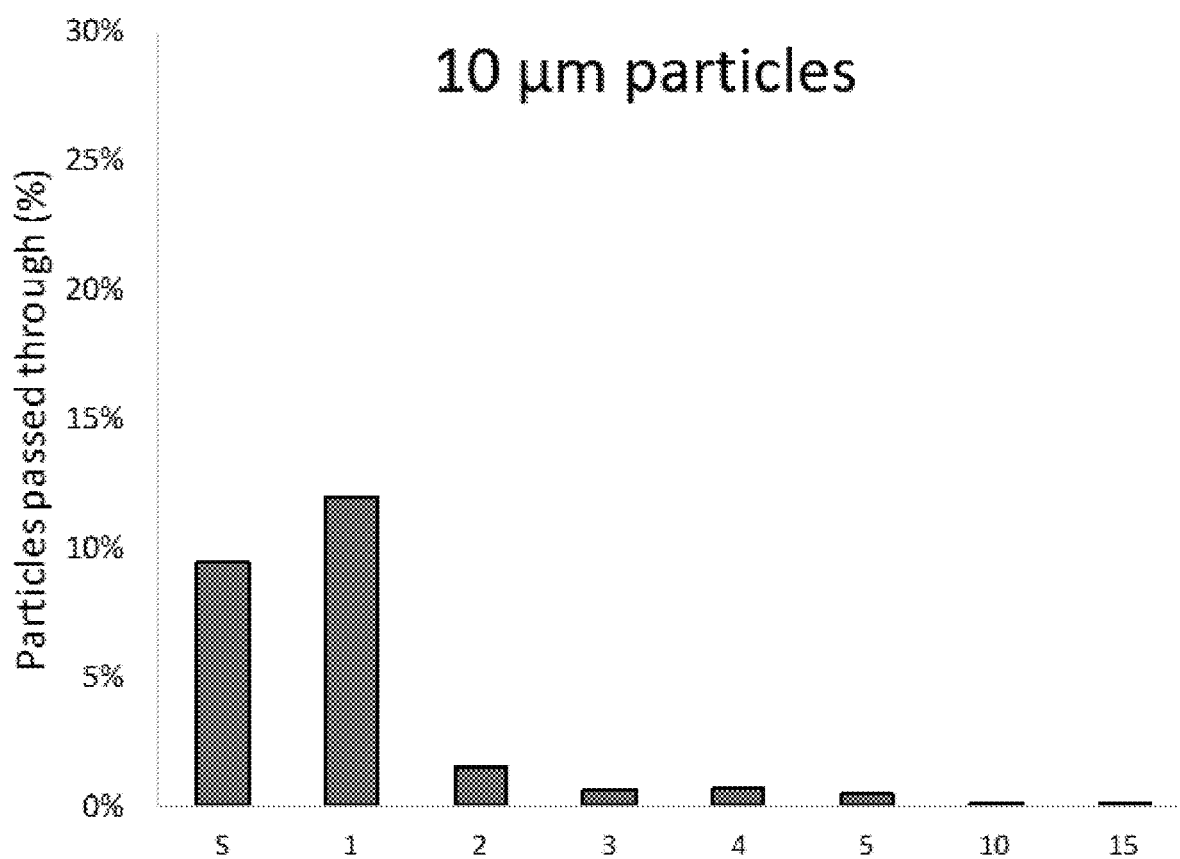

In reference to FIG. 34C, low temperature gradient results in primary pore fraction of 8% and secondary arm fraction of 92%. High temperature gradient results in primary pore fraction of 25% and secondary arm fraction of 75%.

Figure 37A:
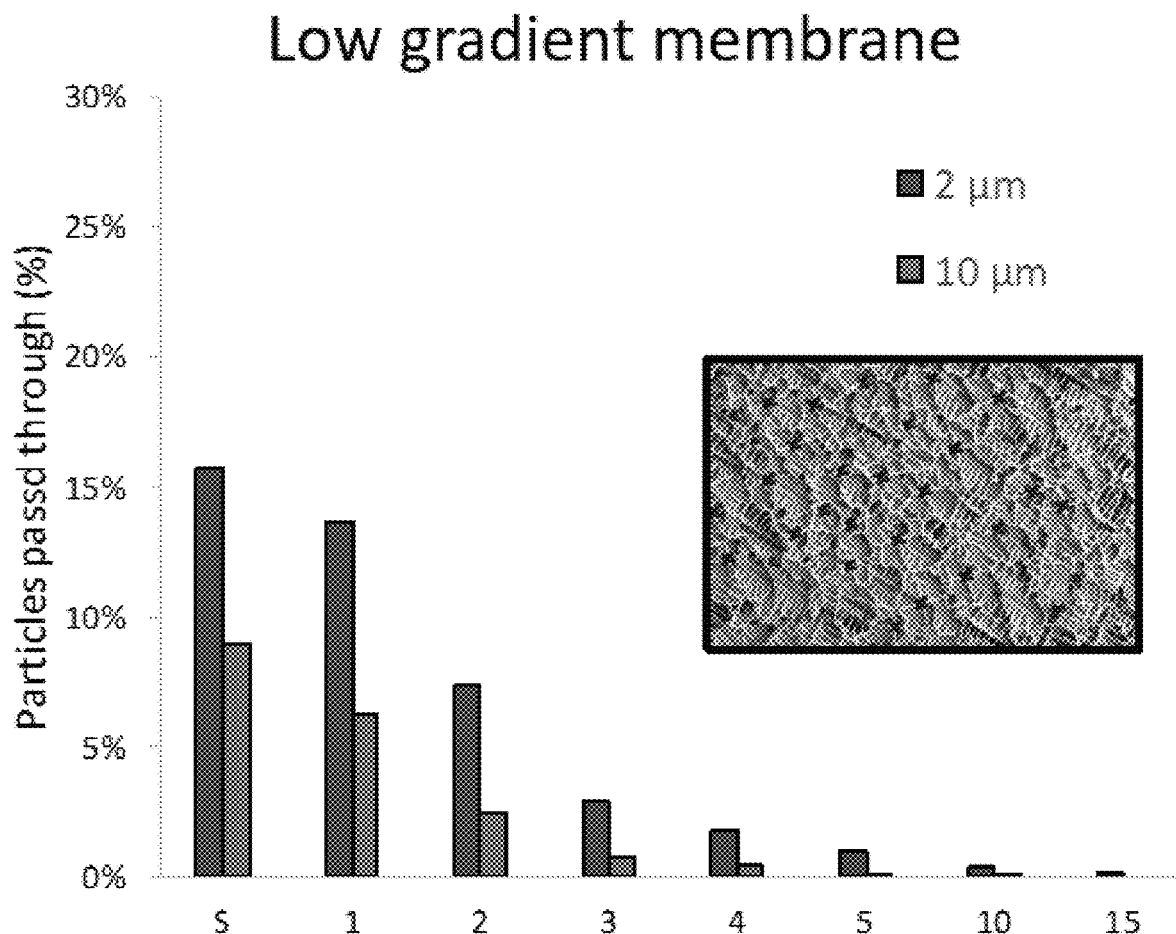
FIGS. 37A-37B. Slow flow rate delayed particle penetration.
Figure 37B:
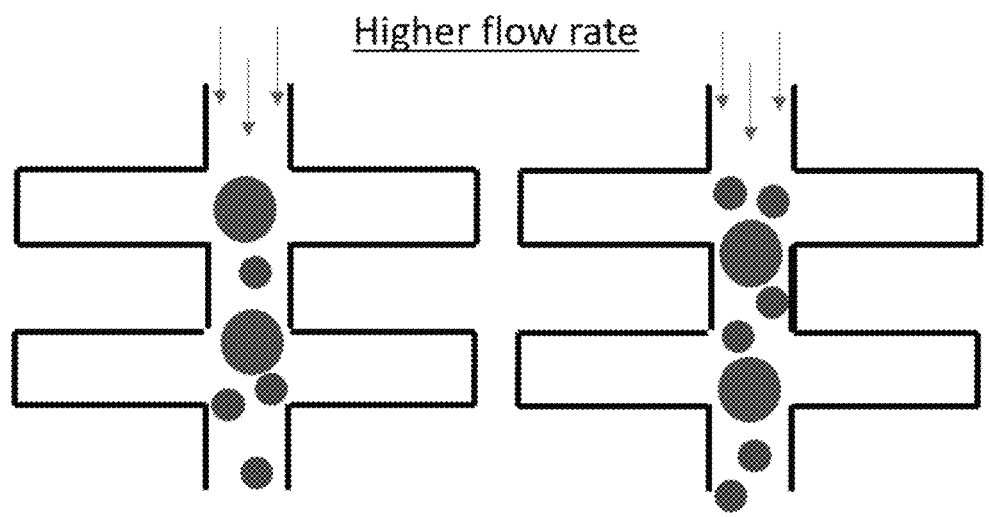
Figure 38A:
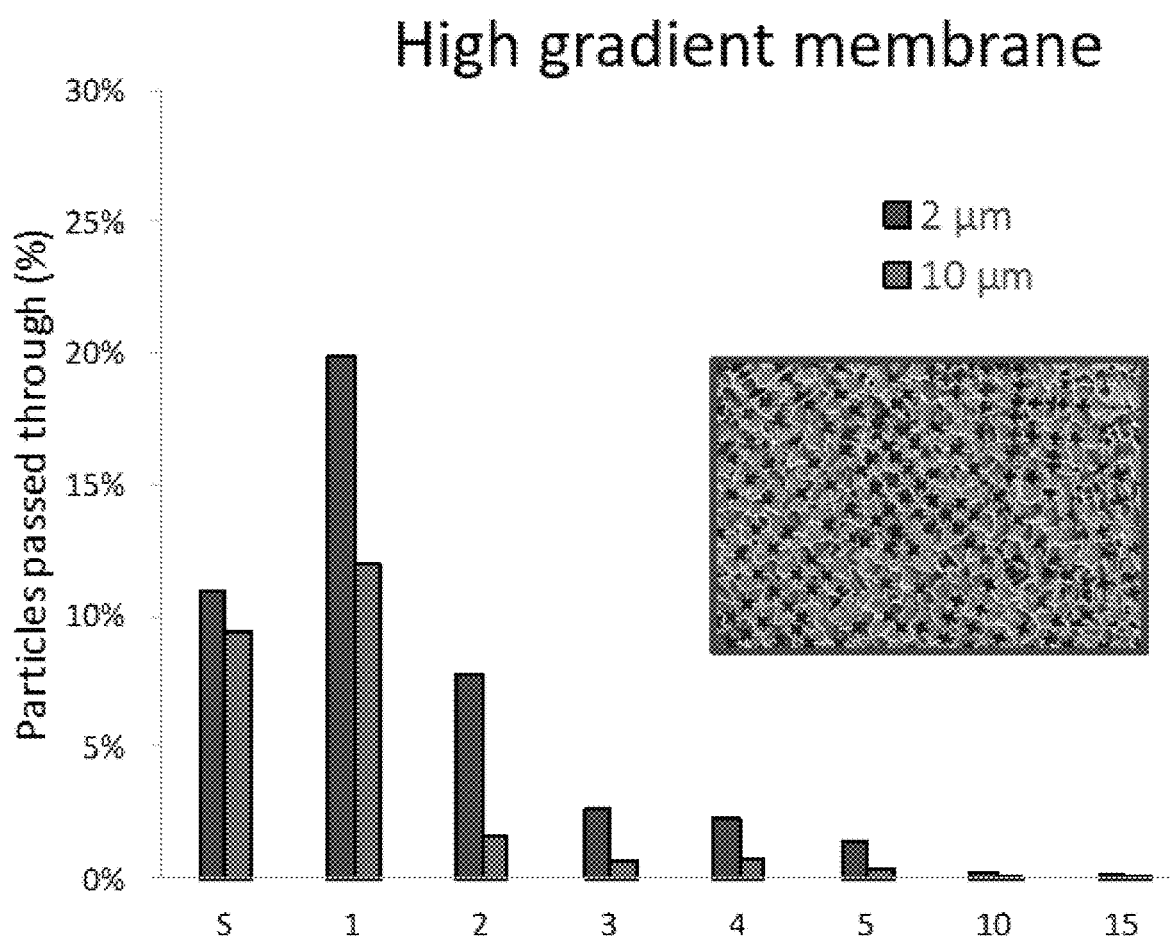
FIGS. 38A-38C. Slow flow rate delayed particle penetration.
Figure 38B:
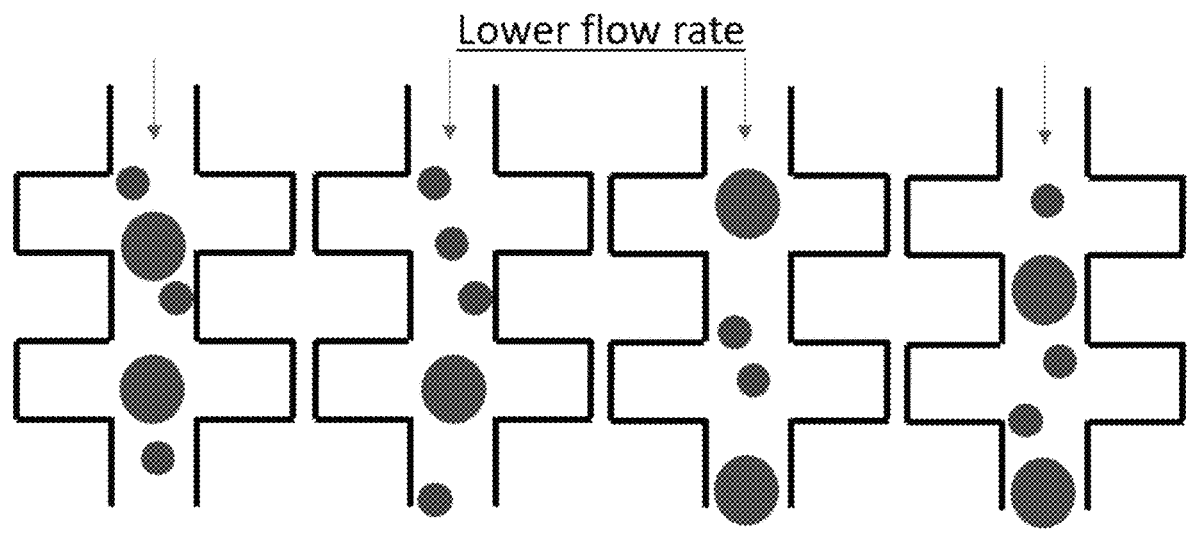
Figure 38C:
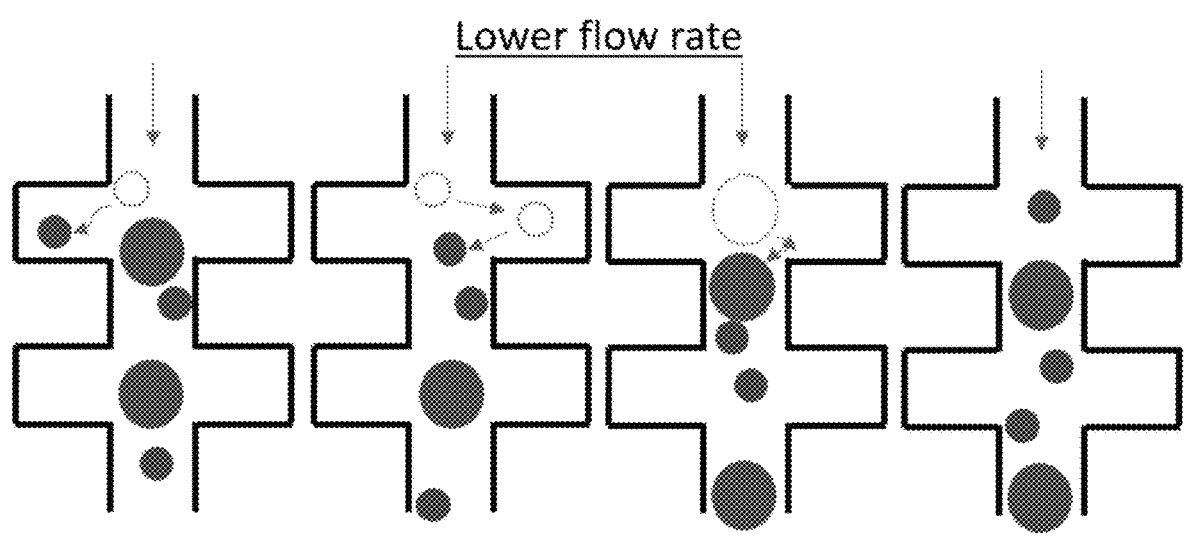

The following table (Table 1) summarizes flow-through filtration results shown in FIG. 37A obtained at an average Peclet number of 32100 for 10 μm particles and 6400 for 2 μm particles:

TABLE 1

|  | Total particles | |
| --- | --- | --- |
|  | 2 μm | 10 μm |
| Low gradient membrane | 40% | 24% |
| High gradient membrane | 45% | 24% |

Figure 39A:
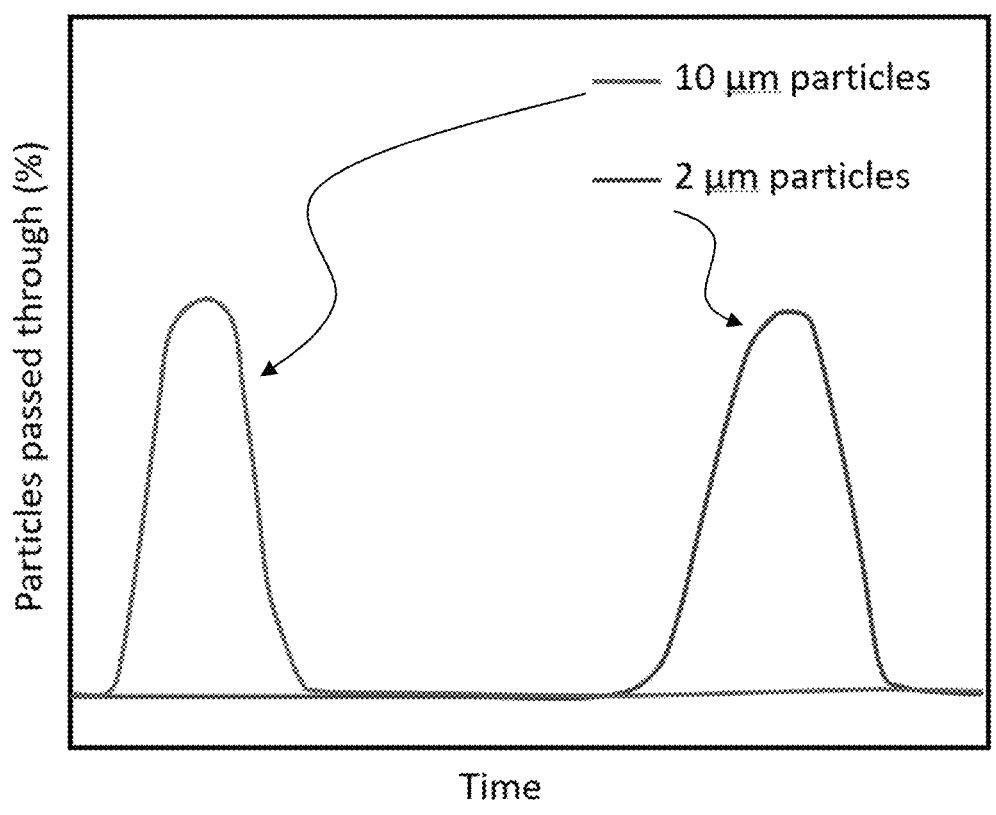
FIGS. 39A-39B. Ideal curve for flow-through experiment.
Figure 39B:
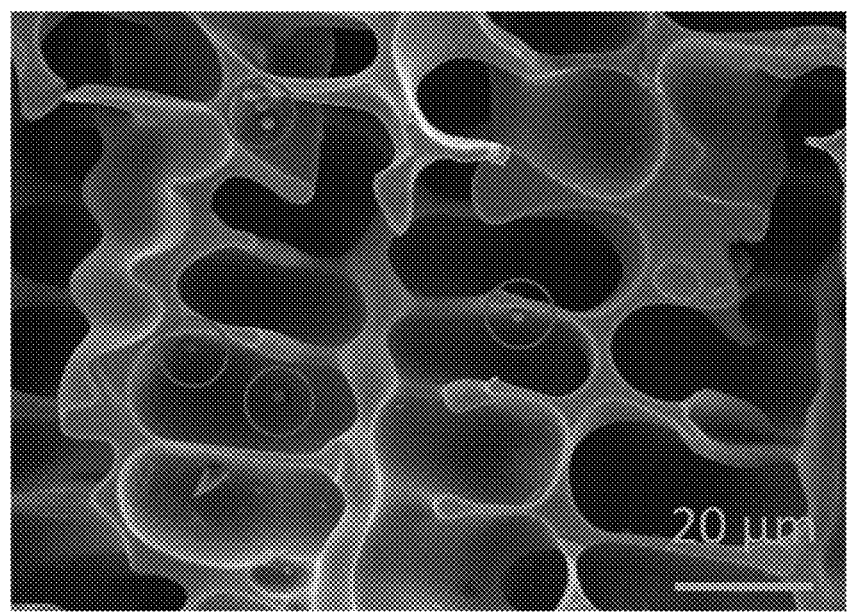
Figure 40:
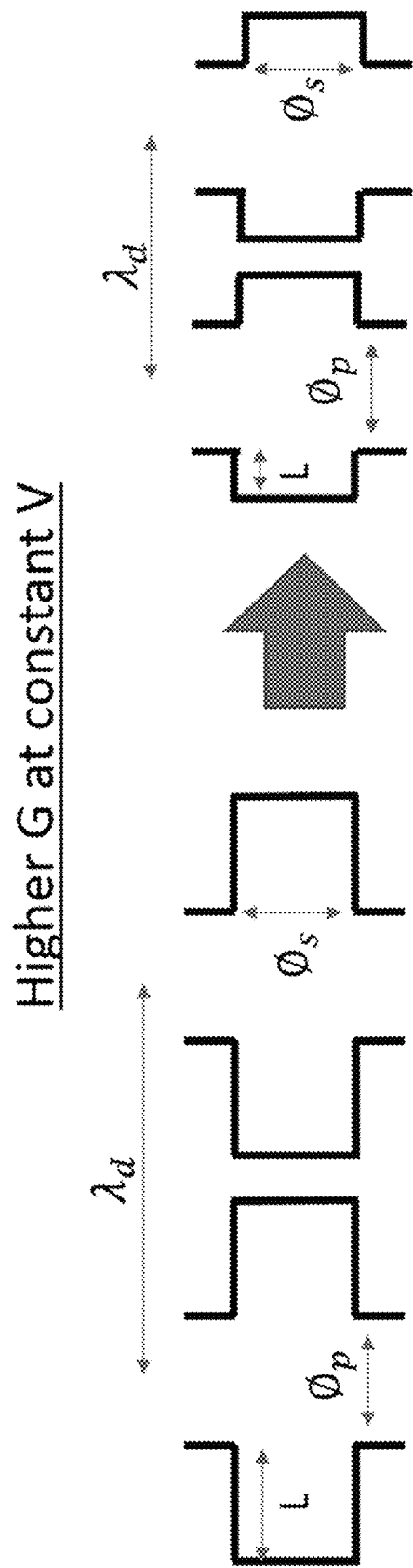
FIG. 40. Schematic illustrative effect of pore structure produced with higher temperature gradient at constant freezing front velocity during freeze casting.
Figure 41A:
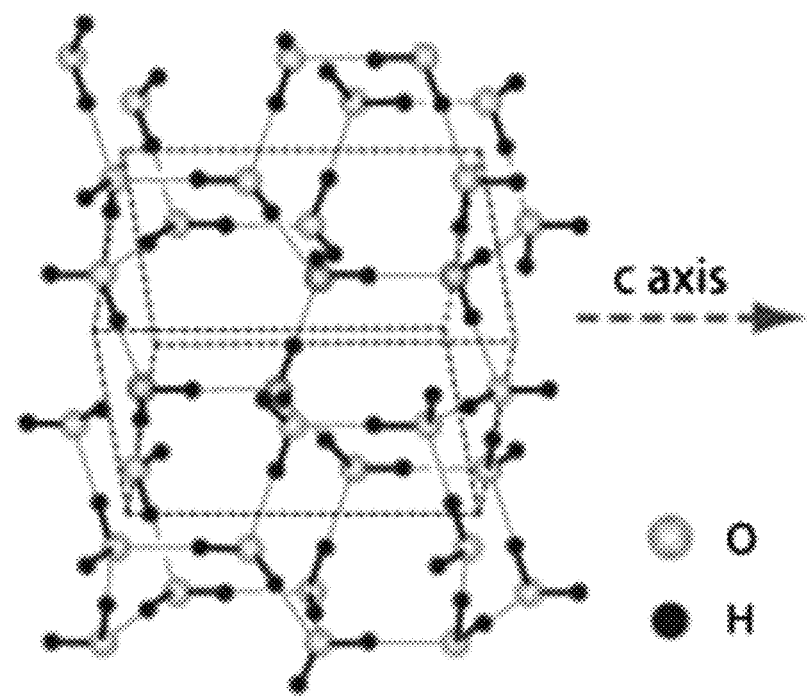
FIGS. 41A-41C. Solidification and crystal growth.
Figure 41B:
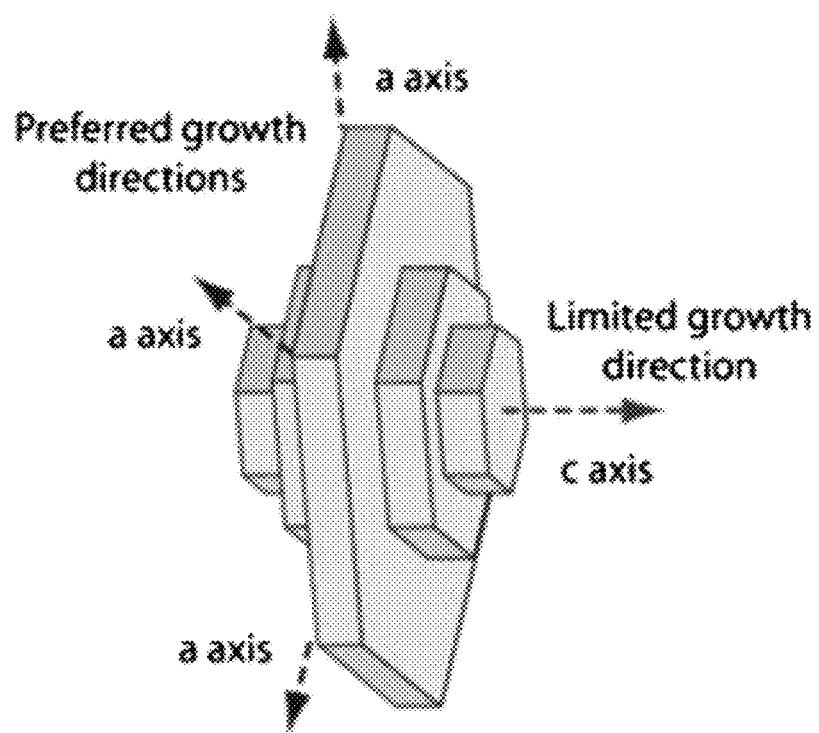
Figure 41C:
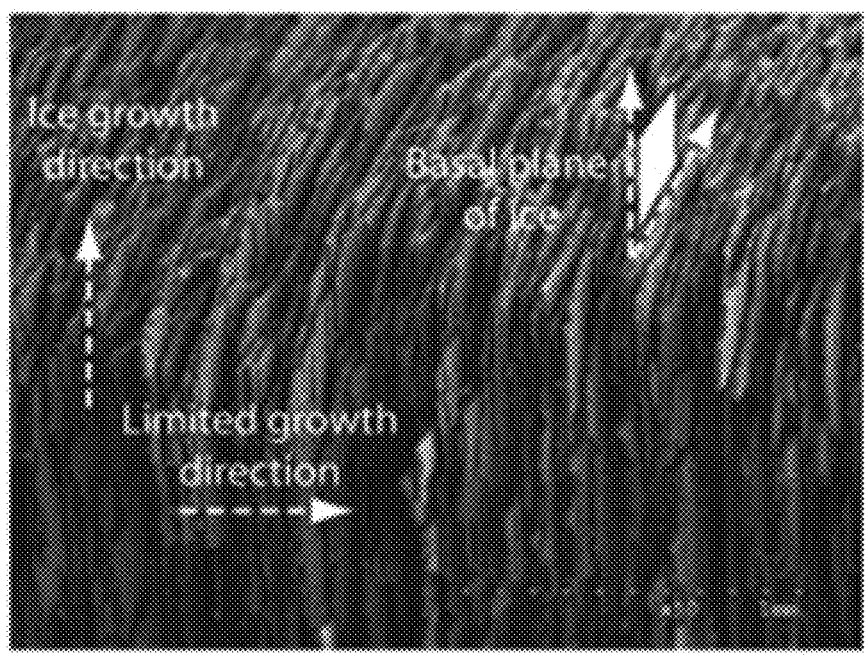
Figure 42:
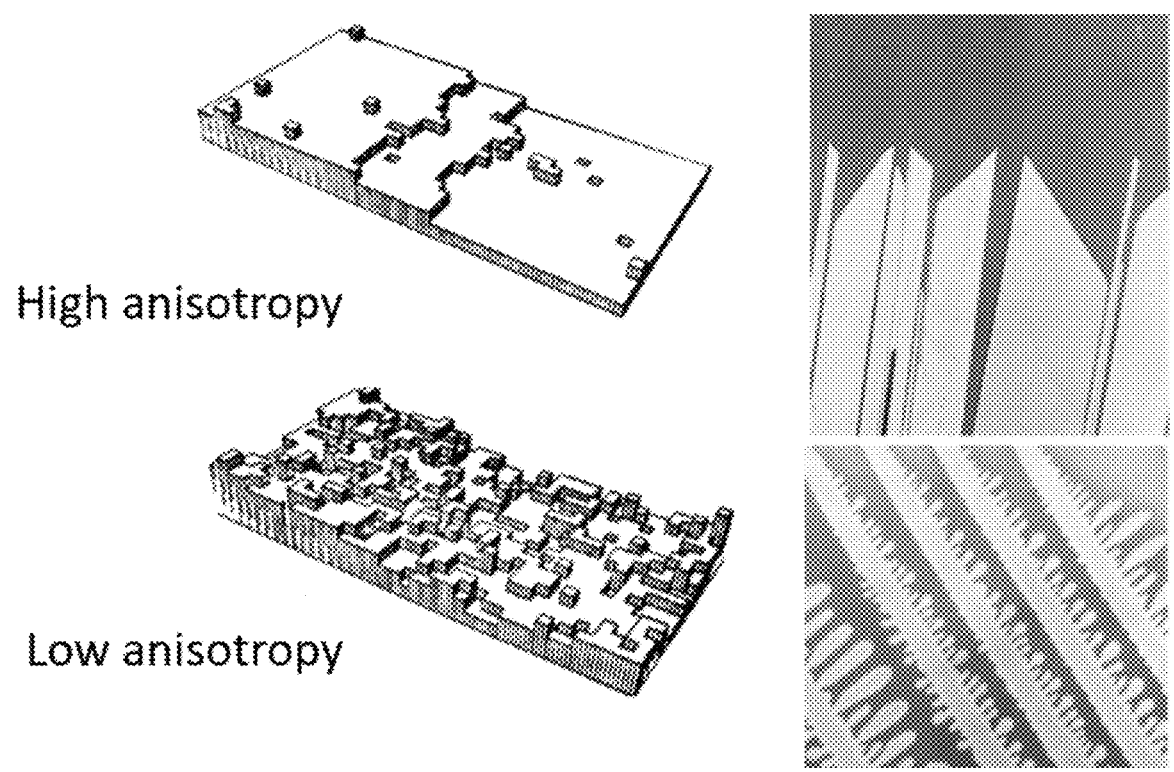
FIG. 42. Schematic and images corresponding to solidification and crystal growth—high anisotropy and low anisotropy.
Figure 43:
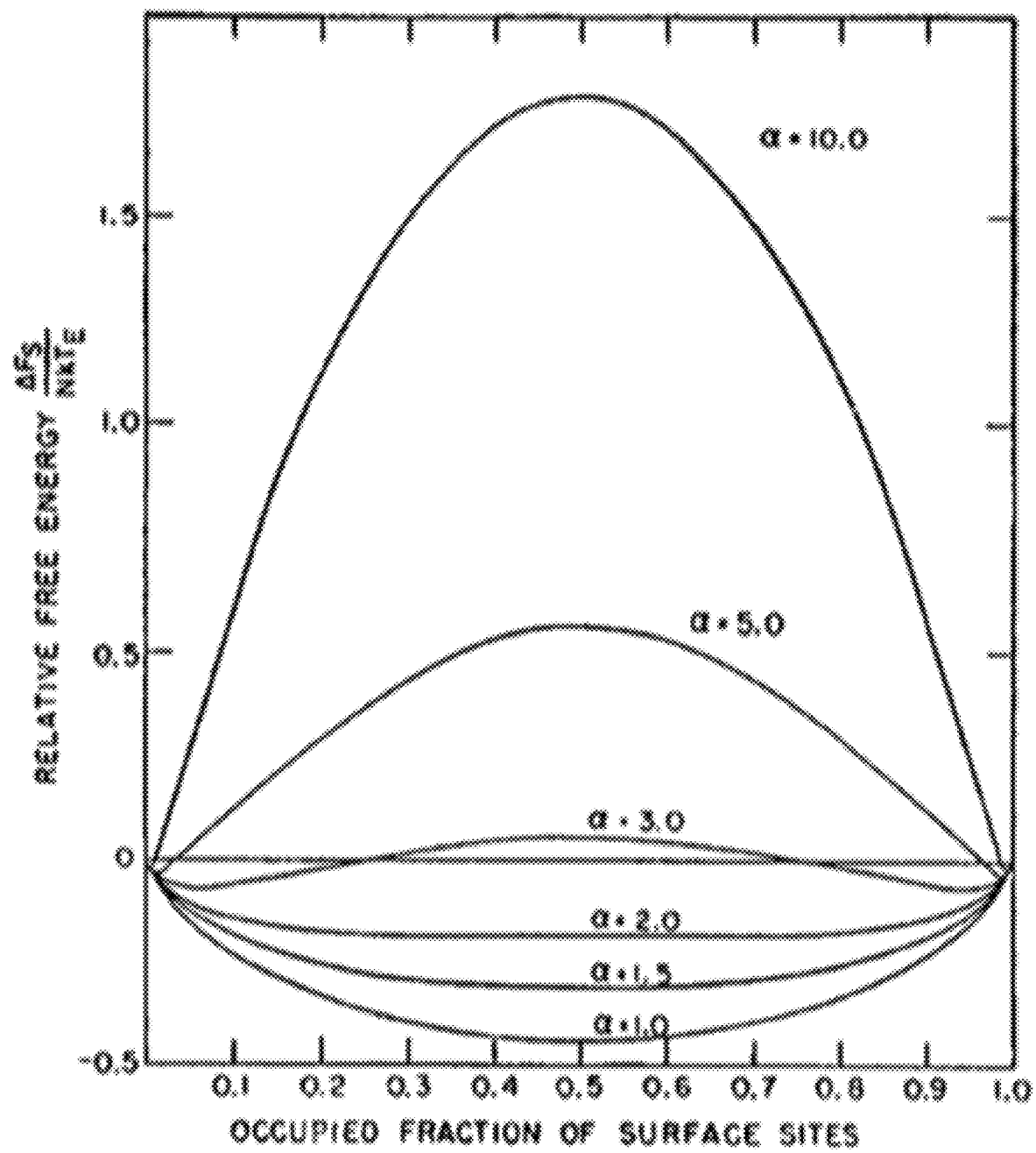
FIG. 43. Plot of relative free energy vs. occupied fraction of surface sites.

The flow rate in both membranes (high and low temperature gradient; FIG. 37A, for example) can be approximately same. The 10 μm particles (red blood cells/white blood cells) can come out first and the smaller 2 μm particles are delayed and passed through the membrane later (FIG. 39A).

In summary, it is demonstrated that independent control of freezing front velocity and temperature gradient can control porous structure. For example, temperature gradient change at constant freezing front velocity changes dendrite spacing. Increase in primary pore fraction decreases flow velocity in primary pores and delays particle penetration.

Example 9: Solvent Selection

FIGS. 41-45 pertain to the discussion in this Example. The Jackson alpha factor is defined as:

$$\alpha = \frac{\eta}{Z}\frac{L}{kT_m},$$

where: η=Number of nearest neighbor sites adjacent to an atom on the interface; Z=total number of nearest neighbor of an atom in the crystal; L=latent heat of fusion; k=Boltzmann constant; and $T_m$=melting point. For most closest-packed crystal structures, η/Z=⅔. For large α, the lowest free energy configuration of the interface is with a few extra adatoms and a few missing atoms in the layer below. For small α, less than 2, the lowest free energy of the interface occurs when the interface is half covered with adatoms, that is, the surface is rough on the atomic scale.

Pore formation behavior can be studied using polymethylsiloxane (MK resin; e.g., 17%), for example, to study solution freeze casting to produce SiOC. Solvents can be selected with increasing Jackson alpha factor to tune pore characteristics (e.g., pore-type). Resulting pores have increasing anisotropy for solvents from top to bottom (FIG. 44) of the following table (Table 2):

TABLE 2

| Solvent | Tm (K) | Latent Heat (kJ/mol) | L/(R * Tm) |
|---|---|---|---|
| Cyclooctane | 288 | 2.41 | 1.01 |
| Cyclohexane | 280 | 2.68 | 1.15 |
| Tert-Butanol | 298 | 6.70 | 2.71 |
| Dioxane | 284 | 12.30 | 5.21 |
| Dimethyl carbonate | 275 | 13.22 | 5.78 |
| p-Xylene | 286 | 17.12 | 7.08 |

The term L/RT is an entropic term. The entropic term of cyclohexane is 1.15. Cyclohexane can have a face-centered cubic structure so η/Z can be ⅓ in <111> plane, such that α=(η/Z)(L/k/TM)=1.15*⅓=0.38 on <111>. This term will depend on crystallographic plane and there are large number of crystallographic terms in one solvent. For example, for η/Z can be ⅔ for SC lattice for <100> interface, ½ for FCC lattice for <111> interface, and ⅓ for BCC lattice for <110> interface, where SC: simple cubic structure, FCC: face-centered cubic structure, BCC: body-centered cubic structure). With respect to other solvents: dioxane can have a monoclinic crystal structure, so one can approximate α=(η/Z)(L/k/TM)=5.21*⅔=3.47 on <100>. Solvent TBA can have a rhombohedral crystal structure, such that one can approximate for <0001> plane, α=(η/Z)(L/k/TM)=2.71*¾=2.03 on <0001> plane.

The dispersed species (dispersed solids; e.g., preceramic polymers or ceramic powders) are large on an atomic scale, thus they have no effect on atomic scale processes such as facet growth. However, they are small on the scale of the dendrite tip. Since the thermal or solute field decays on a scale of the tip radius, the fields can be described by effective diffusion coefficients given by a mixture of ceramic and liquid thermal properties. However, dispersed species affect dendritic growth by introducing small length scale (on the scale of tip) fluctuations in the temperature or solute fields or the shape of the dendrite. Dendritic growth depends on the existence of a stable tip (one that does not split). This stability is a result of the anisotropy in the solid-liquid interface energy. However, if the noise is sufficiently large, then this can overwhelm the effects interfacial energy anisotropy and destabilize the tip. This leads to tip splitting and/or seaweed structures (FIG. 45A). The larger the anisotropy, the more noise that is required to destabilize the tip. So the large interfacial anisotropy materials in the experiments still grow dendritically, but the small anisotropy materials do not in the presence of dispersed species. Optionally, small deviations in the local temperatures and/or small perturbations in the shape due to the dispersed species can be considered noise. This is only because the dispersed species are small on the scale of the dendrite tip. If the dispersed species are larger than the dendrite tip, then the dendrite shapes can be distorted by the dispersed species, but the seaweed structure does not appear. The formation of the dendrites relies on the presence of a sufficiently strong interfacial anisotropy. Additional reference: Akamatsu and Faivre, *Phys. Rev. E,* 58, 3302 (1998)

Figure 48:
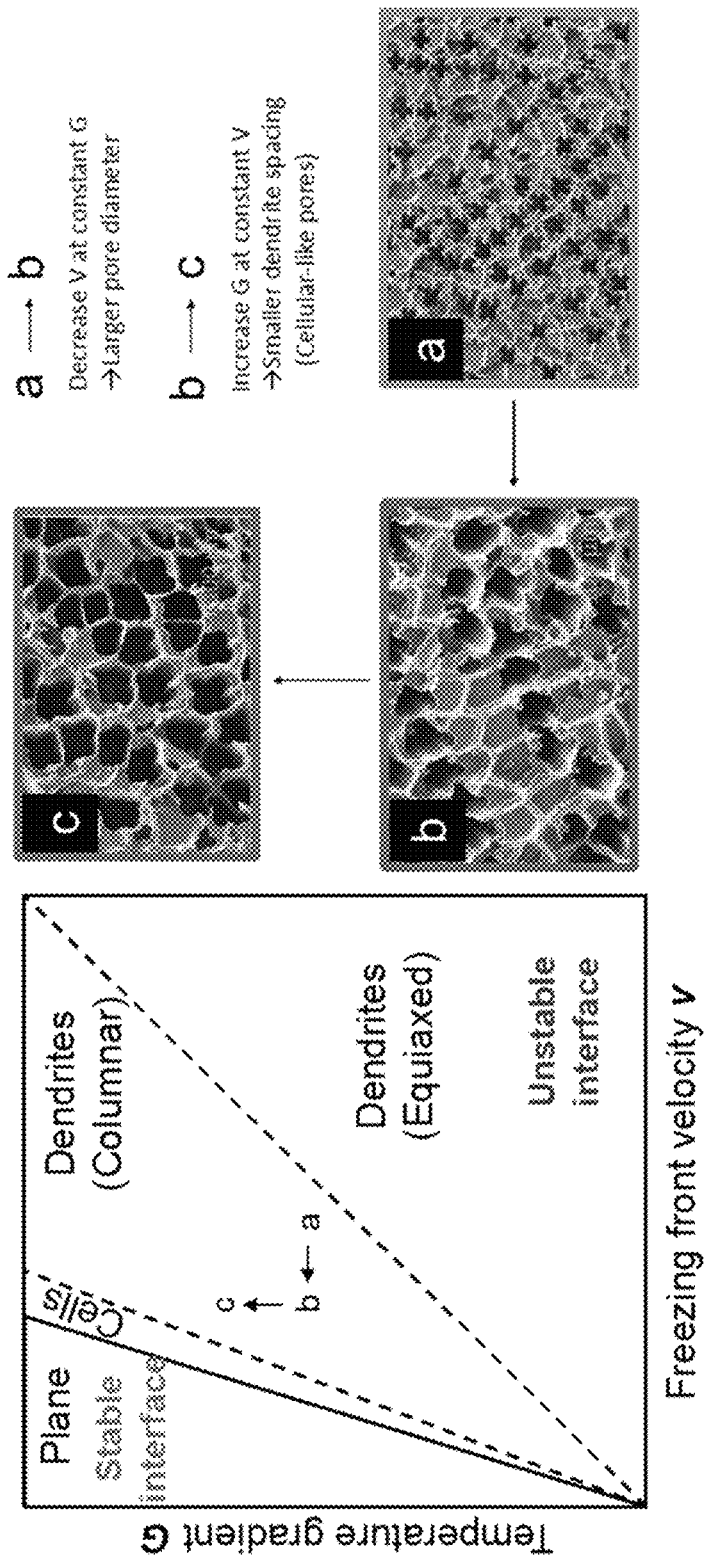
FIG. 48. Pore-structure stability map and images of pores corresponding to indicated regions of the pore-structure stability map.

Example 10: Additional Descriptions and Embodiments for Forming Freeze-Cast Materials FIG. 48. Pore-structure stability map and images of pores corresponding to indicated regions of the pore-stability map.

Figure 49:
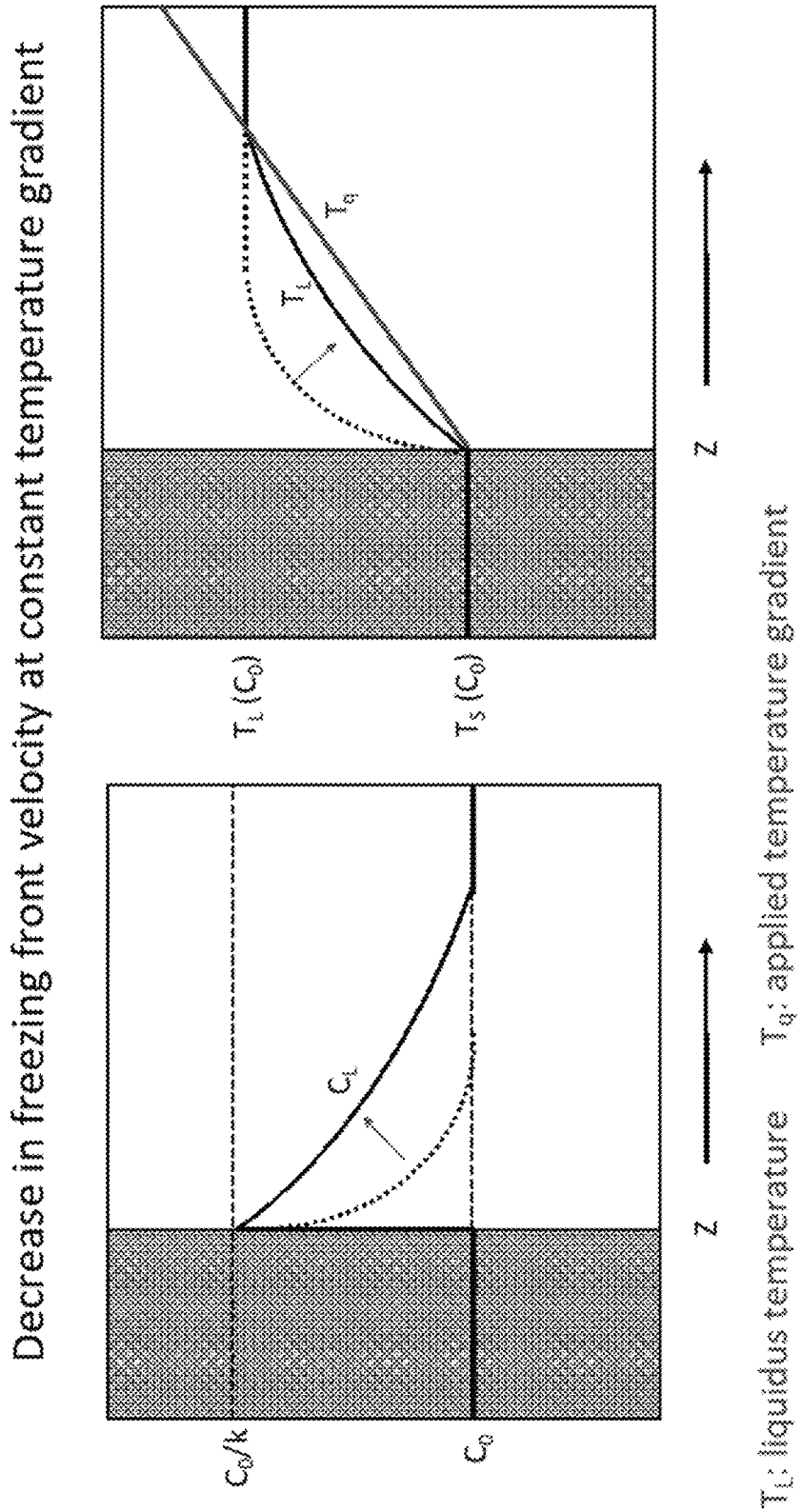
FIG. 49. Schematic showing concentration gradient (left panel) and schematic showing liquid temperature gradient (right panel) versus position during freeze-casting for the condition where freezing front velocity (v) is decreased at constant temperature gradient (G) (e.g., from a point to b point in the pore-structure stability map of FIG. 48). The term $T_L$ represents liquidus temperature and the term $T_q$ represents applied temperature gradient. Decrease in v gives more time for solute to diffuse and results in change in concentration gradient. This changes the liquidus temperature gradient and changes the degree of undercooling. With further continued decreasing freezing front velocity at constant temperature gradient, the pore-type can become cellular ("cells" in FIG. 48 pore-structure stability map) and or eventually have a planar front ("plane' in FIG. 48 pore-structure stability map).

FIG. 49. Schematic showing concentration gradient (left panel) and schematic showing liquidus temperature gradient (right panel) versus position during freeze-casting for the condition where freezing front velocity (v) is decreased at constant temperature gradient (G) (e.g., from point a to point b in the pore-structure stability map of FIG. 48). The term $T_L$ represents liquidus temperature and the term $T_q$ represents applied temperature gradient. Decrease in v gives more time for solute to diffuse and results in change in concentration gradient. This changes liquidus temperature gradient and changes the degree of undercooling. With further continued decreasing freezing front velocity at constant temperature gradient, the pore-type can become cellular ("cells" in FIG. 48 pore-structure stability map) and or eventually have a planar front ("plane' in FIG. 48 pore-structure stability map).

Figure 50:
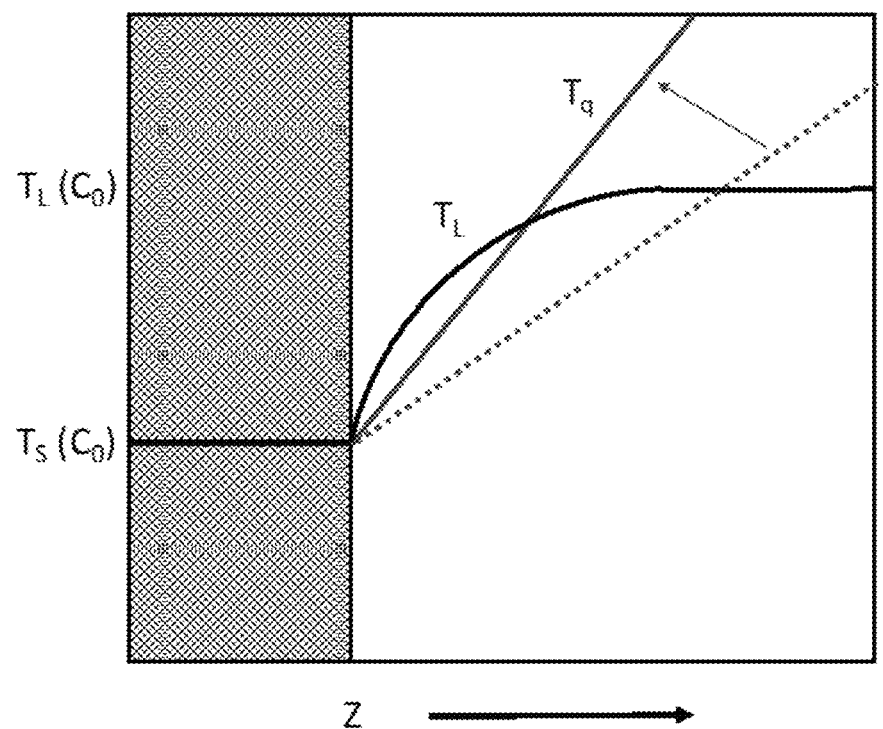
FIG. 50. Schematic showing liquidus temperature gradient versus position during freeze-casting for the condition where freezing front velocity (v) is held constant and temperature gradient (G) is increased (e.g., from point b to point c in the pore-structure stability map of FIG. 48).

FIG. 50. Schematic showing liquidus temperature gradient versus position during freeze-casting for the condition where freezing front velocity (v) is held constant and temperature gradient (G) is increased (e.g., from point b to point c in the pore-structure stability map of FIG. 48).

When the condition, $dT_L/dz = dT_q/dz$ at z=0 (solid liquid interface), is met, the freezing front is planar front. The boundary line between plane and cell in the pore-structure stability map is expressed by the following equation (See Glicksman [1]):

$$\frac{G}{v} = \frac{m_l}{D_l}\left(\frac{k_0 - 1}{k_0}\right)C_0$$

where: $m_l$ is liquidus slope; $D_l$ is diffusivity of solute in liquid; $k_0$ is distribution coefficient ($k_0 \equiv c_s/c_l$); where $c_s$ is the solute concentration in solid and $c_l$ is the solute concentration in liquid and $C_0$ is initial concentration of solute. If v and G are close to the boundary line in the map, resulting pores can be cellular. If v and G are far from the boundary line, resulting pore can be dendritic. In addition, $C_0$ and $D_l$ are parameters which change the slope of the boundary line in the pore-structure stability map. For example, a decrease in concentration (of dispersed species in liquid formulation, such as preceramic polymer) can result in decrease in the slope of the boundary line which makes it more likely to result in cellular pores. In other words, lowering concentration of preceramic polymer in the liquid formulation can allow one to deterministically form cellular pores during freeze-casting, for example. We disclose that the above equation can guide a skilled person in the part to predictably determine and deterministically obtain pores of desired pore-type, such as cellular vs. dendritic. It is also noted that the concentration of dispersed species can be carefully selected so that pore walls themselves do not have additional porosity in order to have pores that are fluidically isolated from other pores of the same zone (e.g., fluidically isolated along an axis that is not the primary growth axis; e.g., fluidically isolated in a transverse direction with respect to a longitudinal axis of the pore).

It is also noted that DSC can be useful, for example, to determine solidus and liquidus temperature. Also, one can determine the thermodynamic term of Jackson α factor (also, latent heat and melting point) and use it as a guideline to select a solvent for the liquid formulation to deterministically form the pre-determined pore-characteristics such as pore-type. Deterministically forming the freeze-cast material (i.e., having deterministic internal structure) can include selecting (pre-determining) a concentration of dispersed species to form the desired internal structure. With regard to a lower bound of concentration, it has been reported that even 99.9% porosity can be achieved with carbon aerogels [2], though structural integrity may be a challenge at such porosity levels. As noted earlier, the dispersed species concentration can influence whether each pore of a zone is isolated from each other pore of the zone (e.g., no microscopic porosity within pore wall itself). Challenges associated with having a higher dispersed species concentration (higher solid loading) are that it becomes difficult for crystals to grow as large continuous crystals, hence, pores might lack in connectivity [3]. In case of preceramic polymer solution, it is preferable to avoid gelation during the freezing. In a high preceramic concentration (~30 vol. % in case of our preceramic polymer), the gelation time becomes much shorter. However, this problem can be avoided if the crosslinking agent is reduced or if the polymers are crosslinked after freezing.

References corresponding to Example 9: [1] M. Glicksman, Principles of Solidification: An Introduction to Modern Casting and Crystal Growth Concepts, Chapter 9, Springer New York, 2011. [2] H. Sun, Z. Xu, C. Gao, Multifunctional, Ultra-Flyweight, Synergistically Assembled Carbon Aerogels, Adv. Mater. 25 (2013) 2554-2560. doi:10.1002/adma.201204576. [3] S. W. Sofie, F. Dogan, Freeze Casting of Aqueous Alumina Slurries with Glycerol, J. Am. Ceram. Soc. 84 (2004) 1459-1464. doi:10.1111/j.1151-2916.2001.tb00860.x.

Example 11: Characterization of Pores Types and Pore Surface Shapes

Figure 51:
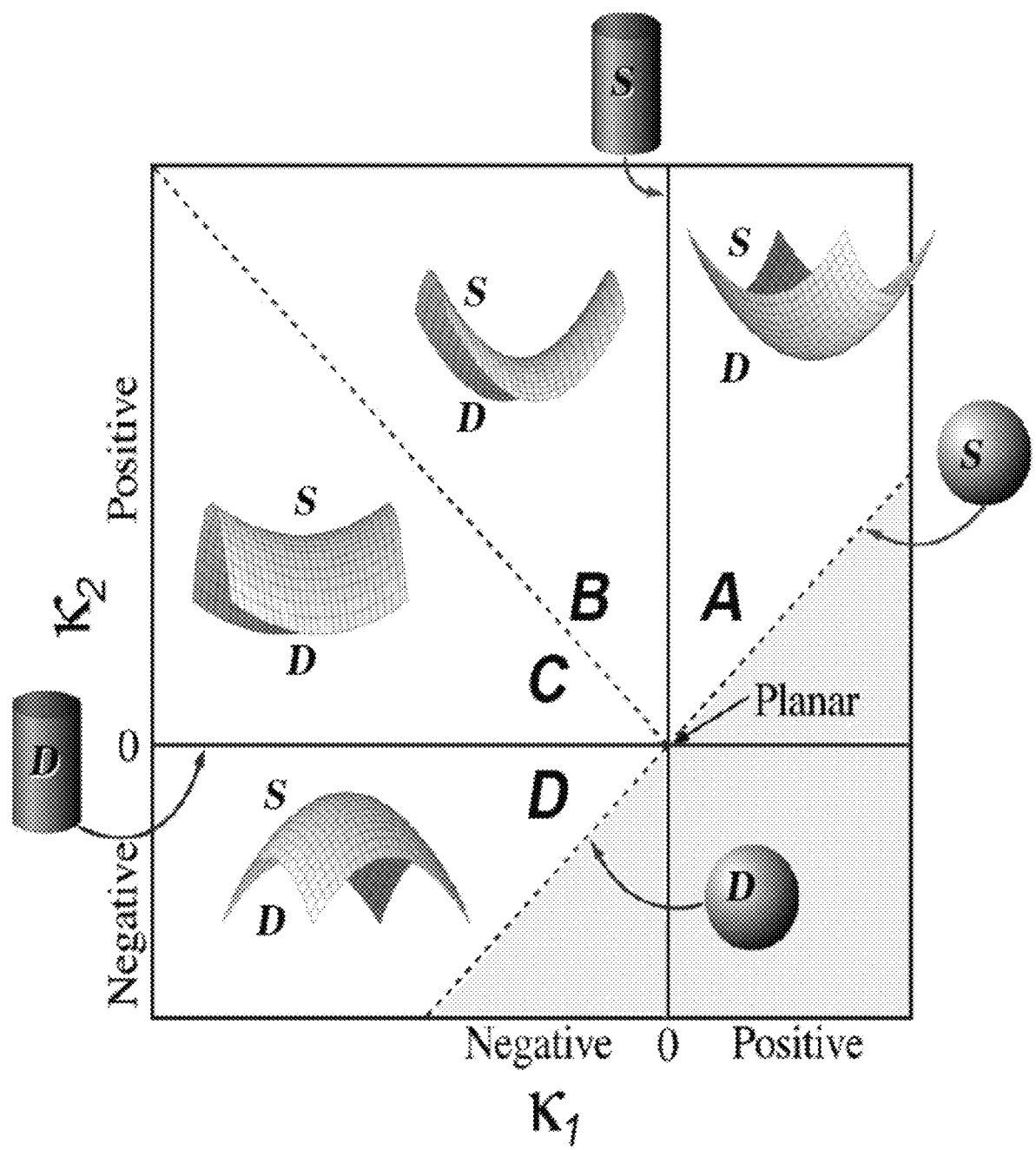
FIG. 51. An interfacial shape distribution (ISD) plot of principal curvature $\kappa_2$ vs principal curvature $\kappa_1$. The plots includes illustrations of pore surface shapes corresponding to different regions of the $\kappa_2$ vs. $\kappa_1$ plot. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall). Different regions of the ISD plot are also labeled as A, B, C, or D.

FIG. 51 shows an annotated interfacial shape distribution (ISD) plot of principal curvature $\kappa_2$ vs principal curvature $\kappa_1$. The plots includes illustrations of pore surface shapes corresponding to different regions of the $\kappa_2$ vs. $\kappa_1$ plot. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall). For example, during freezing, the region 'S' corresponds to the freezing/frozen solvent and the region 'D' corresponds to the excluded dispersed species, which form the pore walls. Different regions of the ISD plot are also labeled as A, B, C, or D.

Figure 19A:
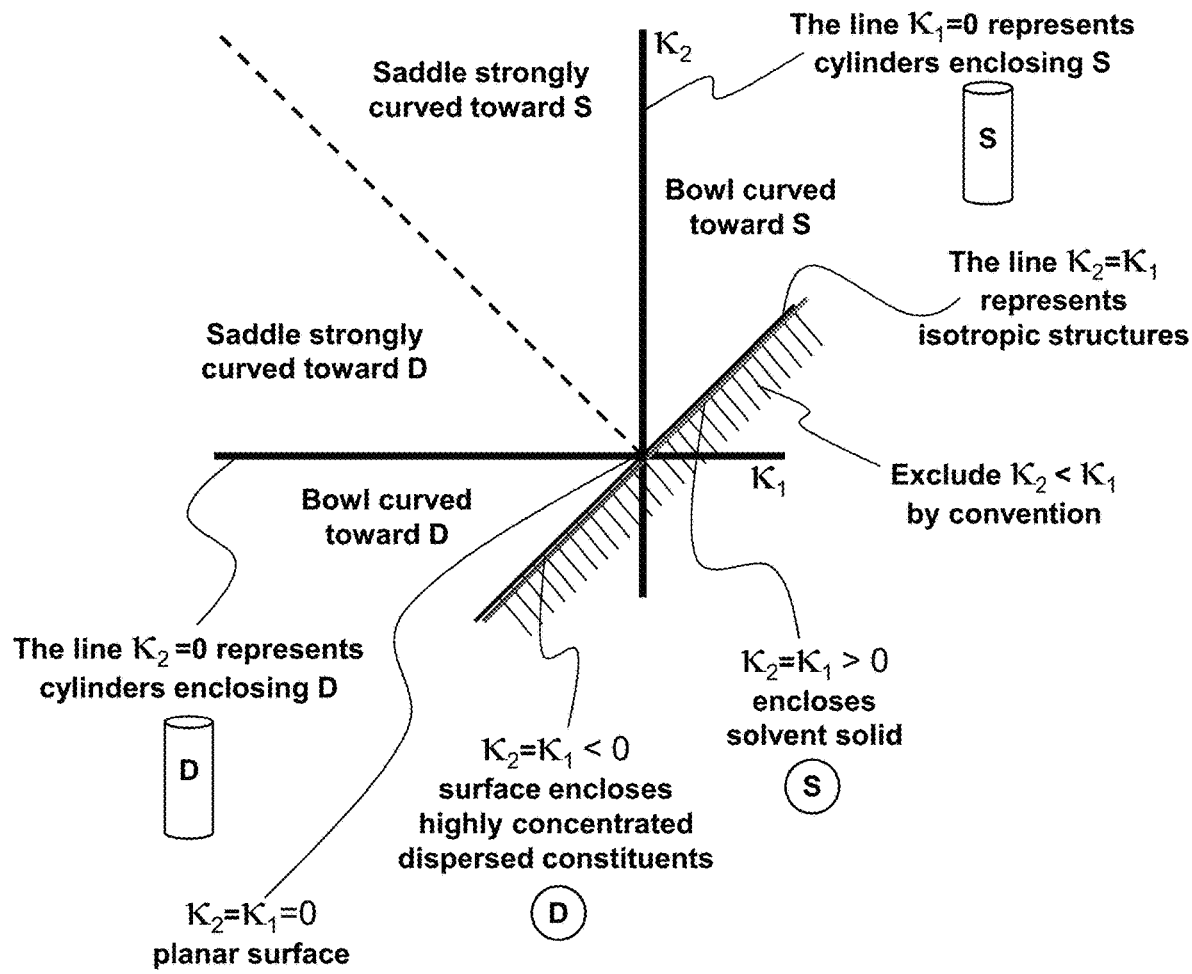
FIGS. 19A-19B.
Figure 19B:
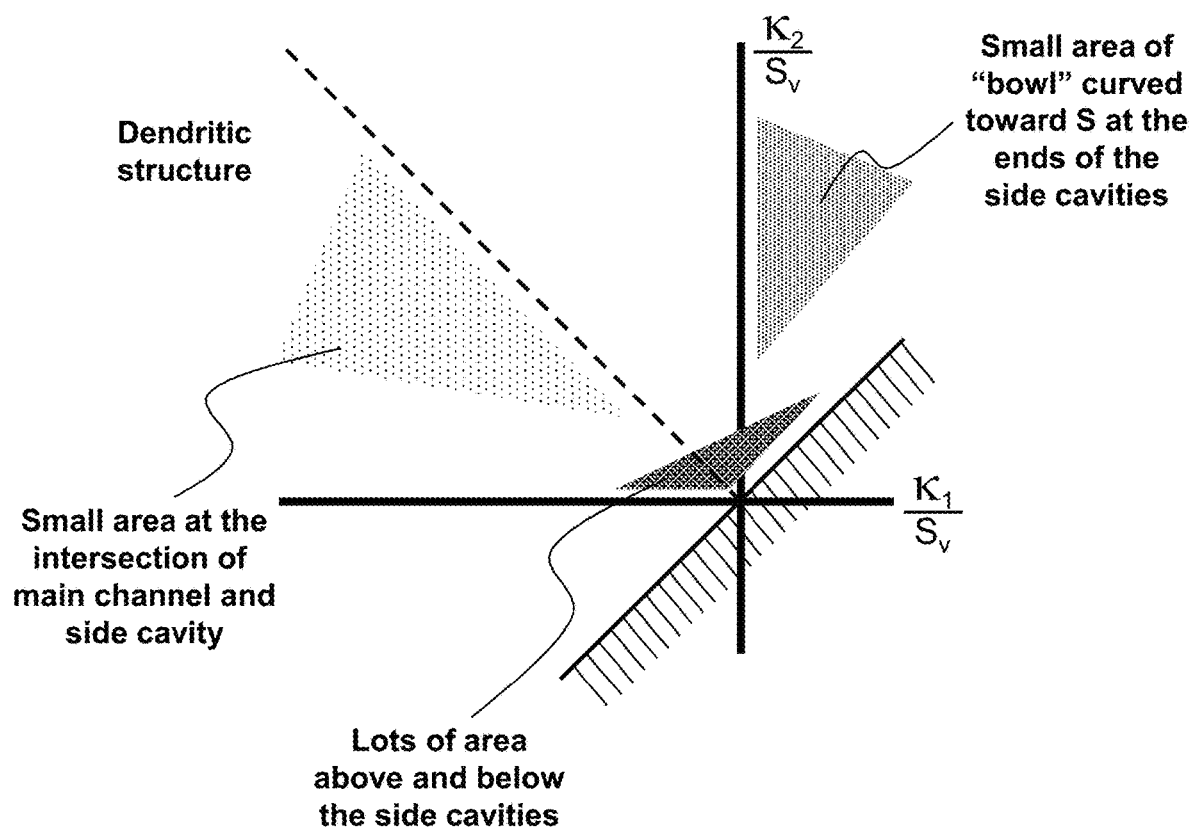

FIG. 19A is a plot of principal curvature $\kappa_2$ vs. $\kappa_1$, with regions of the plot annotated to indicate shape of a pore surface corresponding to the indicated principal curvatures. FIG. 19B is a plot of surface area normalized principal curvatures, or $\kappa_2/S_v$ vs. $\kappa_1/S_v$, with regions of the plot annotated to indicate types of pore surface shapes observed based on corresponding principal curvatures. The principal curvatures can be thus normalized to separate information based on shape from information based on size. Annotation 'S' indicates solvent, fluid, or void inside of the pore (e.g., the volume of the main channel and side arms); and 'D' indicates the pore wall (or, solid portion corresponding to the dispersed species which form the pore wall). Between 'S' and 'D' is the pore surface, which has a shape characterized by the principal curvatures.

Figure 20:
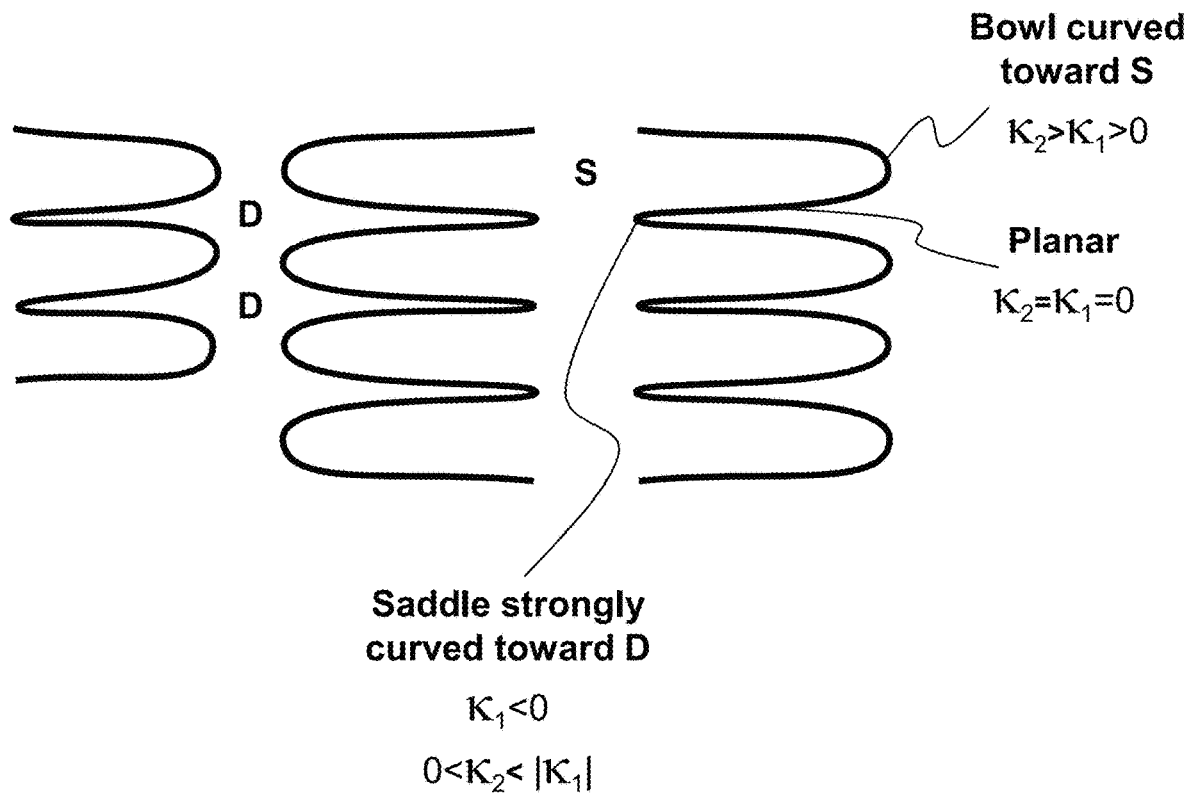
FIG. 20. Illustration of a dendritic pore, with annotations indicating values of principal curvatures $\kappa_1$ and $\kappa_2$ at different portions of the pore surface. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall).

FIG. 20 is an illustration of a dendritic pore, with annotations indicating values of principal curvatures $\kappa_1$ and $\kappa_2$ at different portions of the dendritic pore surface. One can imagine the principal curvatures changing as one follows the pore surface, such as in a secondary arm and in the transition from a secondary arm to the main channel. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall).

FIG. 21 is an illustration of cellular pores, with annotations indicating values of principal curvatures $\kappa_1$ and $\kappa_2$ at the cellular pore surface. As in FIGS. 19A-19B, 'S' indicates solvent, fluid, or void inside of the pore (e.g., the volume of the main channel and side arms); and 'D' indicates the pore wall (or, solid portion corresponding to the dispersed species which form the pore wall).

Example 12: High Constitutional Supercooling

FIG. 54 demonstrates that one can identify which solvent can be used to access high constitutional supercooling. Cyclooctane solutions (FIG. 54, panel a) show a particularly large discrepancy between $T_f$ and $T_f^*$, more than 10° C., indicating that the solvent can experience significant undercooling due to difficulty in locating a suitable nucleation site. In contrast, cyclohexane solutions (FIG. 54, panel b) solidified with the Tf consistently ≥2° C. below the $T_f^*$, and standard deviations of less than 0.7° C."

Solidus and liquidus temperature may decrease as preceramic polymer concentration increases. Higher cooling rate may result in higher undercooling, providing a driving force for freezing.

Example 13: Homogeneity of Internal Structures

Figure 4:
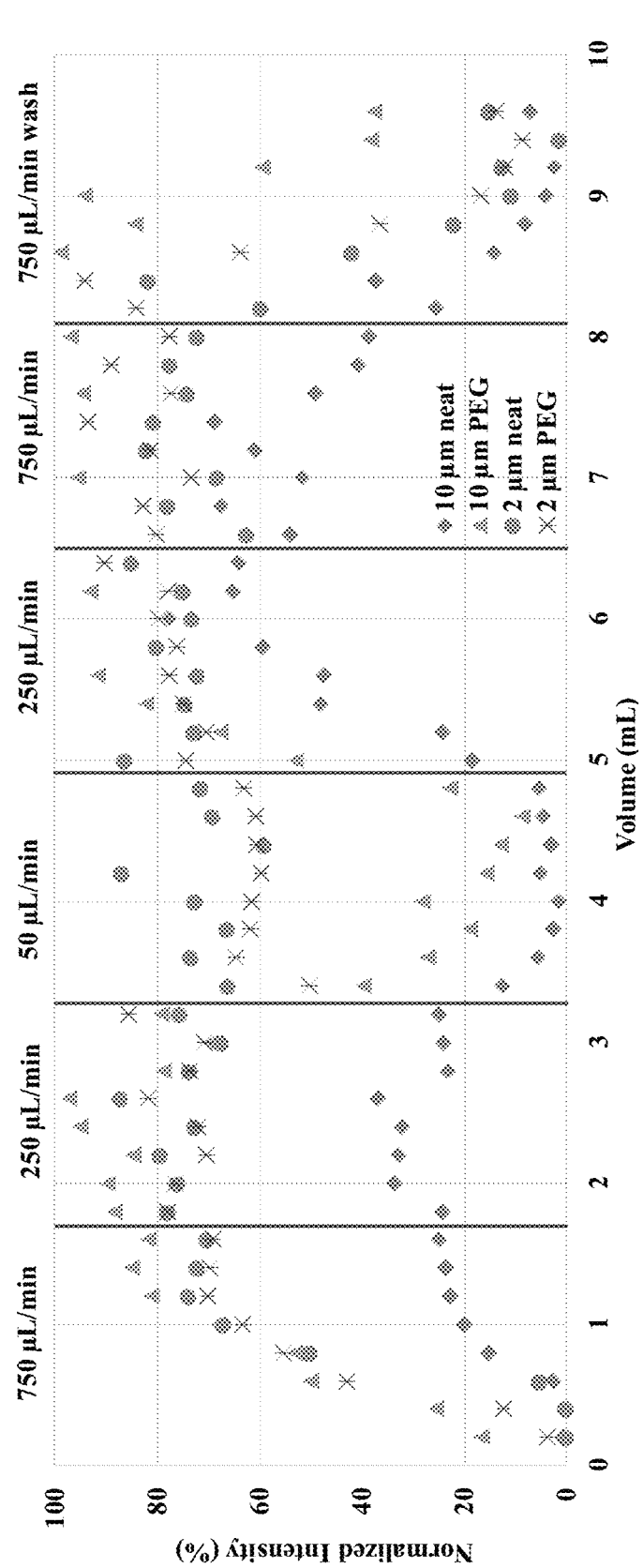
FIG. 4. Particle "filtration" measurements for functionalized (using procedure described above) and non-functionalized membranes. Normalized intensity is equivalent to the percentage of particles which passed through the membrane.

FIGS. 4 and 5 of Kammer (D. Kammer, R. Mendoza, P. W. Voorhees, Cylindrical domain formation in topologically complex structures, Scr. Mater. 55 (2006) 17-22, doi: 10.1016/J.SCRIPTAMAT.2006.02.027), which is incorporated herein by reference in its entirety to the extent not inconsistent herewith, show three-dimensional reconstructions of pores in Al—Cu samples and corresponding interfacial shape distribution (ISD) diagram. These figures show plurality of cellular pores that lack homogeneity because they are polydisperse, or non-uniform, in their size distribution, shape distribution, and the center-to-center distance between each cellular pore. In contrast, the materials disclosed herein, according to some embodiments, have internal structures that are characterized by homogeneity, such as shown in FIG. 17. The hydraulic diameter of the pores, the centroid-to-centroid distances, and the primary growth direction, in FIG. 17, for example, can be characterized as exhibiting homogeneity.

Example 14: Measuring Homogeneity for Dendritic Pore Morphology Shown in FIG. 44, for the Case of Solvent Chosen to be Cyclohexane SEM images of a fracture surface orthogonal to the direction of the main channels and a fracture surface in a plane that contains the axis of orientation of the main channels are analyzed.

The mean center to center distance of the main channels in a plane orthogonal to the direction of the main channels is 86±6 microns; 67% of center-to-center distances are in the range from 71.7 microns to 103.3 microns (from 20% below to above the mean) and 77% of center-to-center distances are in the range from 66.2 microns and 111.8 microns (30% above and below the mean).

The hydraulic diameter of the main channels is evaluated using the cross-sectional area and the perimeter of the openings seen in an SEM image in a plane orthogonal to the direction of the main channels. The hydraulic diameter is defined as 4 (cross sectional area)/(perimeter). The mean hydraulic diameter of the openings in FIG. 44 is 26.4 microns and 50% of the channels have hydraulic diameter in the range from 22.0 microns to 31.8 microns (20% below and above the mean).

Examining SEM images of a fracture surface in the plane that contains the pore orientation direction and include 20 main channels reveals that 80% of main channels deviate from the mean orientation by less than 3°.

Analysis of SEM images of a fracture surface in the plane that contains the pore orientation direction shows that the spatial period for the secondary pores is, on average, 19 microns and 50% of secondary pore heights are within +/−20% of the average (that is, in the range from 16.2 to 23.4 microns).

Example 15: Measuring Homogeneity for Dendritic Pore Morphology Shown in FIG. 1, for the Case of Solvent Chosen to be Cyclohexane Examining SEM images of a fracture surface in the plane that contains the main channel orientation direction shows that the spatial period for the secondary pores is, on average, 9.4 µm and 50% of secondary pore heights are within +/−20% of the average (that is, in the range from 11.0 µm to 15.8 µm).

A collection of SEM images that span 20 main channels show that the individual orientations of the main channels are all within 5° of the average orientation of all of the main channels and that the center to center distance between main channels viewed in the plane is 87 microns and all 20 pores have center-to-center distance within +/−20% of the average (that is, between 72 µm and 104 µm).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a pore" includes a plurality of such pores and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, structure, material, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for making a freeze-cast material having an internal structure, wherein the method comprises steps of:
   determining the internal structure of the material, the internal structure having a plurality of pores, wherein:
   each of the plurality of pores has directionality; and
   the step of determining comprises:
      selecting a temperature gradient and a freezing front velocity to obtain the determined internal structure based on the selected temperature gradient and the selected freezing front velocity;
   directionally freezing a liquid formulation to form a frozen solid, the step of directionally freezing comprising:
      controlling both the temperature gradient and the freezing front velocity to match both the selected temperature gradient and the selected freezing front velocity during directionally freezing;
      wherein the liquid formulation comprises at least one solvent and at least one dispersed species; and
   subliming the at least one solvent out of the frozen solid to form the material.

2. The method of claim 1 further comprising heat treating or curing the material; wherein heat treating comprises sintering or pyrolyzing.

3. The method of claim 1, wherein the step of determining further comprises selecting the solvent to obtain the determined internal structure based on the selected solvent, the selected temperature gradient, and the selected freezing front velocity.

4. The method of claim 1, wherein each of the plurality of pores is characterized as a continuous through-pore.

5. The method of claim 1, wherein the internal structure is configured such that any microscopic fluid path across the internal structure includes a number of pores of the plurality of first pores selected from the range of 1 to 100.

6. The method of claim 1, wherein the plurality of pores correspond to at least 75% of total microscopic porosity of the internal structure.

7. The method of claim 1, wherein the internal structure is formed via exclusion of the at least one dispersed species from the crystalline or crystallizing solvent during directionally freezing.

8. The method of claim 1, further comprising heat treating or curing the material.

9. The method of claim 1, wherein the step of determining comprises determining a pore-type of the plurality of pores; wherein the plurality of pores is selected from the group consisting of dendritic pores, cellular pores, lamellar pores, and prismatic pores.

10. The method of claim 1, wherein the directionality of each of the plurality of pores is characterized by a primary growth direction of each pore being equivalent to or within 30° of the primary growth direction of each other pore.

11. The method of claim 1, wherein the plurality of pores comprise dendritic pores; wherein each dendritic pore is characterized by: a main channel and a plurality of secondary arms each in fluid-communication with the main channel; a length of the main channel being greater than a length of each secondary arms; the main channel of each dendritic pore extending along a primary growth axis which is parallel or within 30° of the primary growth direction, and each secondary arm of each dendritic pore extending along a respective secondary growth axis that is different from the primary growth axis of the main channel.

12. The method of claim 1, wherein the step of determining comprises determining at least one other pore characteristic of the plurality of pores; the at least one other pore characteristic being selected from the group consisting of: a size characteristic, a primary growth direction, a ratio of a primary pore volume to a secondary arm volume, and any combination of these.

13. The method of claim 1, wherein the plurality of pores comprises a plurality of first pores in a first zone of the internal structure and a plurality of second pores in a second zone of the internal structure; wherein the plurality of first pores are in fluid communication with the plurality of second pores; wherein the plurality of first pores are characterized by one or more pore characteristics different from corresponding one or more pore characteristics of the plurality of second pores; and wherein the first zone and the second zone do not overlap and are in physical contact with each other.

14. The method of claim 13, wherein step of determining comprises determining the first pore-type of the plurality of first pores and the second pore-type of the plurality of second pores; wherein the step of selecting comprises selecting a first temperature gradient and a first freezing front velocity to obtain the plurality of first pores, and the step of selecting comprises selecting a second temperature gradient and a second freezing front velocity to obtain the plurality of second pores; wherein the step of controlling comprises controlling the first temperature gradient and the first freezing front velocity to obtain the plurality of first pores, and the step of controlling comprises selecting the second temperature gradient and the second freezing front velocity to obtain the plurality of second pores.

15. The method of claim 1, wherein selecting comprising selecting the temperature gradient and the freezing front velocity based on a pore-structure stability map of temperature gradient and freezing front velocity.

16. The method of claim 1, wherein the temperature gradient is selected from the range of 0.5 K/mm to 20 K/mm, and/or wherein the freezing front velocity is selected from the range of 85 nm/s to 400 μm/s.

17. The method of claim 1, wherein controlling comprises holding the temperature gradient within 30% of a single value and varying the freezing front velocity thereby manipulating an average size characteristic of pores of the internal structure; or wherein controlling comprises holding the freezing front velocity within 30% of a single value and varying the temperature gradient thereby manipulating a pore fraction characteristic of pores of the internal structure.

18. The method of claim 1, further comprising providing a thermally conductive spacer, such that the spacer forms one or more reservoirs of the liquid formulation during the freezing step.

19. The method of claim 1, the step of controlling comprising applying a first heat exchange at a first surface of the liquid formulation or frozen solid and applying a second heat exchange to a second surface of the liquid formulation or frozen solid.

20. The method of claim 19, wherein applying the first heat exchange comprises controlling a temperature of a substrate in thermal-communication with the first surface; and wherein applying the second heat exchange comprises irradiating the second surface with infrared light.

21. The method of claim 19, wherein applying the first heat exchange comprises controlling a temperature of a first substrate in thermal-communication with the first surface; and wherein applying the second heat exchange comprises controlling a temperature of a second substrate in thermal-communication with the second surface.

22. The method of claim 1, further comprising steps of selecting and introducing a functionalization agent to the internal structure of the material; wherein the functionalization agent is at least one of (i) selected such that a selected analyte associates with the selected functionalization agent and (ii) selected such that a selected non-analyte does not associate with the selected functionalization agent.

23. The method of claim 1, wherein the step of directionally freezing comprises using a template to control the directionality of the plurality of pores.

24. The method of claim 1, wherein the step of determining comprises selecting the temperature gradient based on a pre-selected permeability of the internal structure and the step of directionally freezing comprising controlling the temperature gradient to obtain the pre-selected permeability based on the selected temperature gradient.

25. The method of claim 1, wherein the plurality of pores are dendritic pores; wherein the step of determining comprises selecting the temperature gradient based on a pre-selected ratio of a main channel volume to a secondary arm volume of the dendritic pores; and wherein the step of directionally freezing comprising controlling the temperature gradient to obtain the pre-selected ratio based on the selected temperature gradient.

26. The method of claim 1, wherein the material has a composition comprising one or more ceramic materials, one or more metal oxide materials, one or more carbide materials, one or more nitride materials, one or more sulfide materials, and any combination of these.

27. The method of claim 1, wherein a cross-sectional dimension of the plurality of pores is selected from the range of 500 nm to 500 μm.

28. The method of claim 1, wherein the dispersed species is a preceramic polymer or ceramic powders.

29. The method of claim 1, wherein the liquid formulation comprises an additive selected from the group consisting of at least one catalyst, a plurality of nanocrystals, at least one reinforcing agent, at least one metal, metal ions, an electrically conductive additive, at least one zeolite material, at least one mesoporous silica material, and any combination of these species is an additive to the preceramic polymer.

30. The method of claim 1, wherein the internal structure has homogeneity over at least 90% of a volume of the internal structure.

31. The method of claim 1, wherein the internal structure is a deterministic internal structure.

32. The method of claim 19, wherein the first surface and the second surface are opposite of each other.

33. The method of claim 21, wherein the first substrate comprises a first thermoelectric device and the second substrate comprises a second thermoelectric device.

34. The method of claim 1, wherein the step of controlling comprises controllably changing or keeping constant a temperature at a first surface of the liquid formulation or frozen solid and simultaneously and independently controllably changing or keeping constant a temperature at a second surface of the liquid formulation or frozen solid as the liquid formulation is directionally freezing.

35. The method of claim 1, wherein the step of controlling comprises controllably changing a temperature at a first surface of the liquid formulation or frozen solid and controllably keeping constant a temperature at a second surface of the liquid formulation or frozen solid.

* * * * *